US008164612B2

(12) United States Patent
Imai et al.

(10) Patent No.: US 8,164,612 B2
(45) Date of Patent: Apr. 24, 2012

(54) LIGHT SOURCE UNIT, PHASE TYPE OPTICAL ELEMENT, AND LASER BEAM SCANNING DEVICE

(75) Inventors: Shigeaki Imai, Kanagawa (JP); Seizo Suzuki, Chiba (JP)

(73) Assignee: Ricoh Company, Ltd., Tokyo (JP)

( * ) Notice: Subject to any disclaimer, the term of this patent is extended or adjusted under 35 U.S.C. 154(b) by 1006 days.

(21) Appl. No.: 11/774,795

(22) Filed: Jul. 9, 2007

(65) Prior Publication Data
US 2008/0019255 A1 Jan. 24, 2008

(30) Foreign Application Priority Data

Jul. 21, 2006 (JP) ................................. 2006-198984
Sep. 15, 2006 (JP) ................................. 2006-251451
Sep. 19, 2006 (JP) ................................. 2006-252736

(51) Int. Cl.
*B41J 15/14* (2006.01)
(52) U.S. Cl. ...................................................... 347/241
(58) Field of Classification Search .................. 347/241
See application file for complete search history.

(56) References Cited

U.S. PATENT DOCUMENTS

| 5,355,244 | A | * | 10/1994 | Suzuki et al. | 359/212.1 |
| 5,465,220 | A | * | 11/1995 | Haruki et al. | 347/256 |
| 6,384,949 | B1 | | 5/2002 | Suzuki | |
| 6,697,181 | B2 | | 2/2004 | Masuda | |
| 6,847,472 | B2 | | 1/2005 | Masuda | |
| 6,898,216 | B1 | * | 5/2005 | Kleinschmidt | 372/9 |
| 7,751,107 | B2 | * | 7/2010 | Imai | 359/205.1 |
| 2002/0057330 | A1 | * | 5/2002 | Sasaki | 347/253 |
| 2003/0063182 | A1 | * | 4/2003 | Ishihara | 347/233 |
| 2004/0155950 | A1 | * | 8/2004 | Takeuchi et al. | 347/129 |

FOREIGN PATENT DOCUMENTS

| JP | 4-171415 | 6/1992 |
| JP | 7-176072 | 7/1995 |
| JP | 9-64444 | 3/1997 |
| JP | 10-227992 | 8/1998 |
| JP | 2000-249950 | 9/2000 |
| JP | 2002-287062 | 10/2002 |
| JP | 3507244 | 12/2003 |
| JP | 2004-126192 | 4/2004 |
| JP | 2005-129227 | 5/2005 |
| JP | 2005-258392 | 9/2005 |
| JP | 2006-12218 | 1/2006 |

OTHER PUBLICATIONS

U.S. Appl. No. 12/174,899, filed Jul. 17, 2008, Saisho, et al.
U.S. Appl. No. 12/207,739, filed Sep. 10, 2008, Imai.
Office Action issued Jul. 5, 2011, in Japanese Patent Application No. 2006-251451.

* cited by examiner

*Primary Examiner* — Charlie Peng
(74) *Attorney, Agent, or Firm* — Oblon, Spivak, McClelland, Maier & Neustadt, L.L.P.

(57) ABSTRACT

A light source unit is disclosed. The light source unit includes a phase type optical element which modulates a phase distribution of laser beams emitted from a light source. The phase type optical element has a phase distribution so that a first ratio of the peak intensity of side lobe laser beams to the peak intensity of main lobe laser beams in a beam intensity profile at a focal position of the laser beam condensing element is greater than a second ratio of the peak intensity of side lobe laser beams to the peak intensity of main lobe laser beams in the beam intensity profile at the focal position of the laser beam condensing element when it is assumed that the phase type optical element is not disposed.

11 Claims, 51 Drawing Sheets

FIG.9

| PHASE TYPE OPTICAL ELEMENT | SIDE/MAIN INTENSITY RATIO [%] | DEPTH MARGIN [mm] | BEAM SPOT DIAMETER [μm] |
|---|---|---|---|
| NON-PRESENCE | 1.6 | 8.9 | 56.4 |
| $10c_1$ | 10.4 | 18.0 | 48.1 |
| $10c_2$ | 9.6 | 15.0 | 47.7 |
| $10c_3$ | 8.1 | 13.8 | 50.7 |
| $10c_4$ | 5.8 | 12.9 | 51.8 |
| $10c_5$ | 3.8 | 11.2 | 53.3 |
| 10d | 0.6 | 6.4 | 58.4 |

| PHASE TYPE OPTICAL ELEMENT | Isz [%] | d [mm] | w [μm] | $d/w^2 \times 10^3$ |
|---|---|---|---|---|
| NON-PRESENCE | 0.0 | 8.9 | 56.4 | 2.8 |
| $10c_1$ | 8.9 | 18.0 | 48.1 | 7.8 |
| $10c_2$ | 8.0 | 15.0 | 47.7 | 6.6 |
| $10c_3$ | 6.1 | 12.1 | 48.5 | 5.1 |
| $10c_4$ | 4.2 | 12.9 | 51.8 | 4.8 |
| $10c_5$ | 2.2 | 11.2 | 53.3 | 3.9 |
| 10d | -1.0 | 6.4 | 58.4 | 1.9 |

FIG.19

| PHASE TYPE OPTICAL ELEMENT | SIDE/MAIN INTENSITY RATIO [%] | | |
|---|---|---|---|
| | DISTANCE FROM LENS SURFACE | | |
| | 50mm | 57mm | 59mm |
| NON-PRESENCE | 1.6 | 14.9 | 33.6 |
| $10c_1$ | 10.4 | 11.1 | 11.4 |
| $10c_2$ | 9.6 | 10.3 | 13.9 |
| $10c_3$ | 8.1 | 8.1 | 12.1 |
| $10c_4$ | 5.8 | 9.1 | 13.1 |
| $10c_5$ | 3.8 | 10.7 | 19.3 |
| 10d | 0.6 | - | - |

FIG.20

| PHASE TYPE OPTICAL ELEMENT | MAIN INTENSITY RATIO OF NON-FOCAL POSITION TO FOCAL POSITION | | |
|---|---|---|---|
| | DISTANCE FROM LENS SURFACE | | |
| | 50mm | 57mm | 59mm |
| NON-PRESENCE | 1.000 | 0.447 | 0.241 |
| $10c_1$ | 1.000 | 0.691 | 0.534 |
| $10c_2$ | 1.000 | 0.605 | 0.421 |
| $10c_3$ | 1.000 | 0.600 | 0.413 |
| $10c_4$ | 1.000 | 0.553 | 0.359 |
| $10c_5$ | 1.000 | 0.504 | 0.306 |
| 10d | 1.000 | 0.373 | 0.166 |

FIG. 29
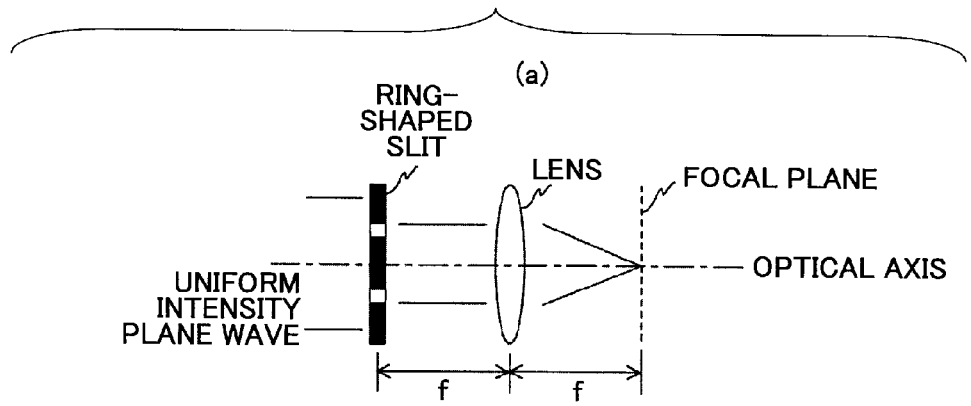
(a)
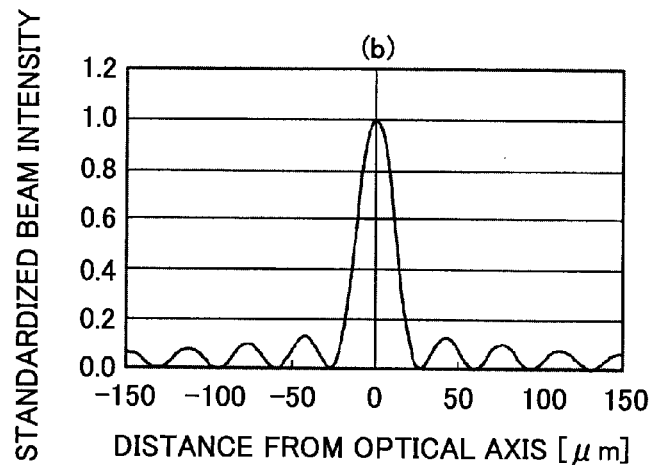
(b)
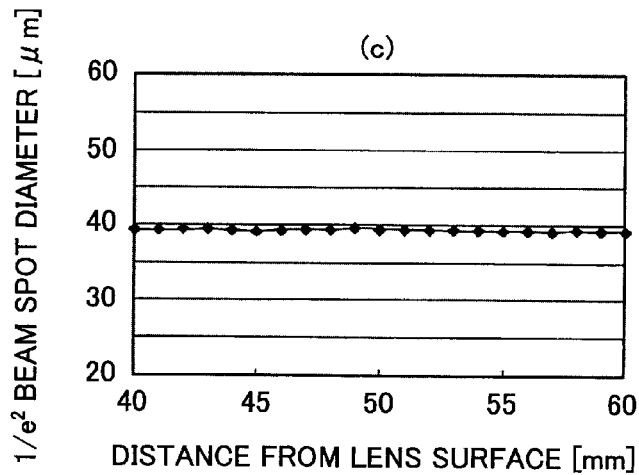 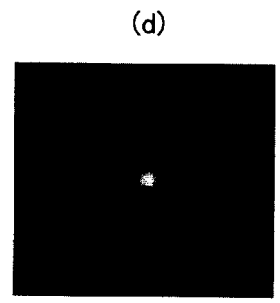

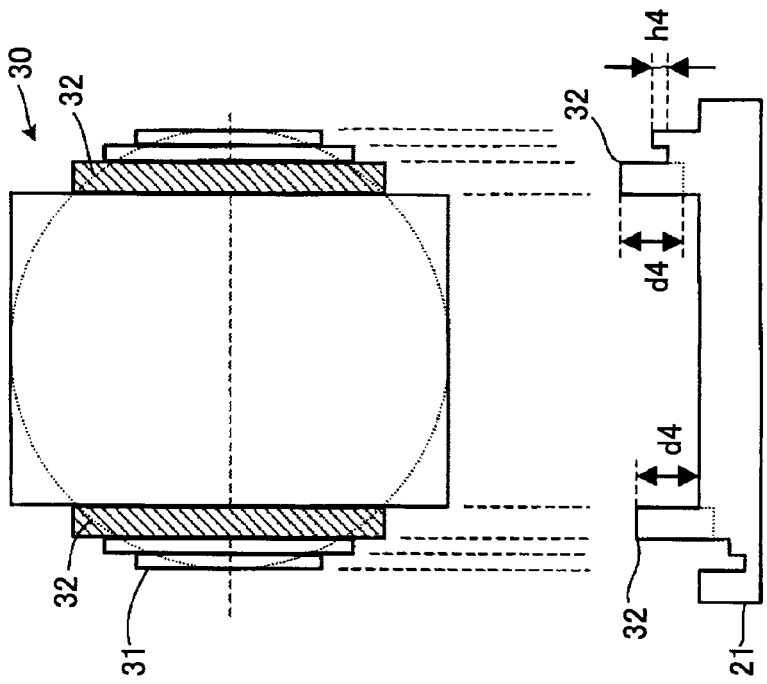
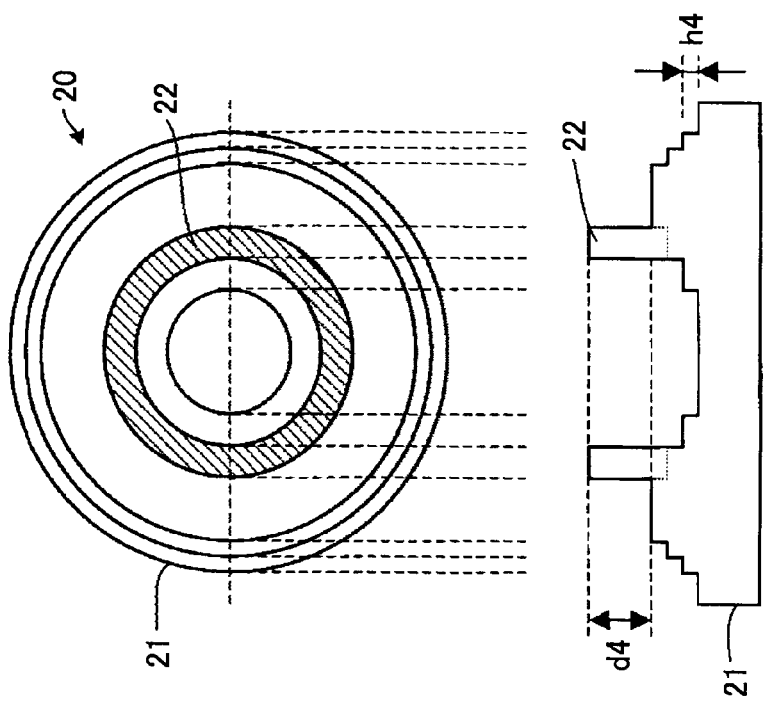

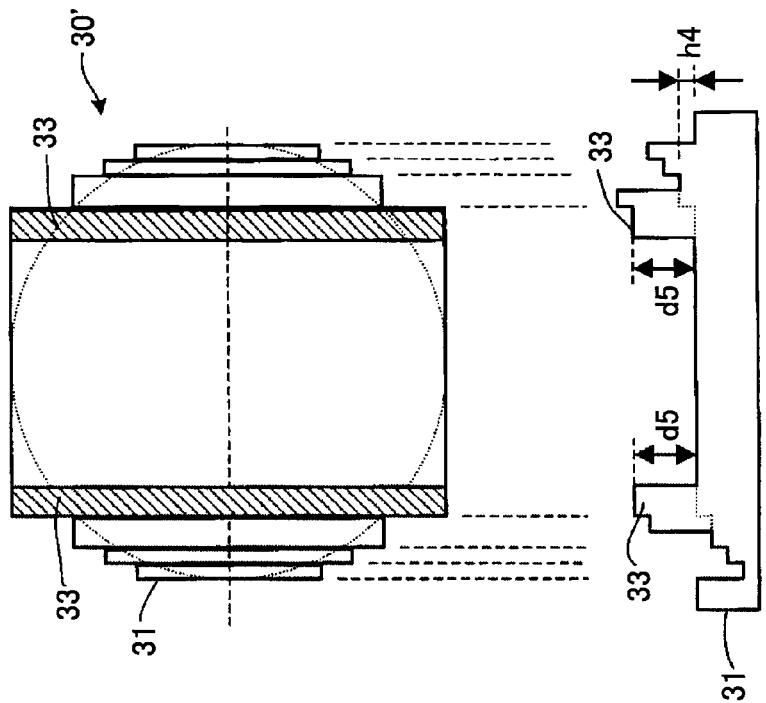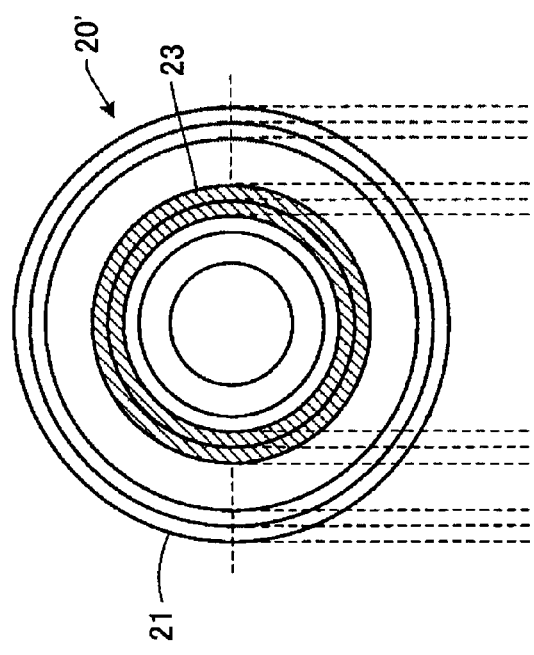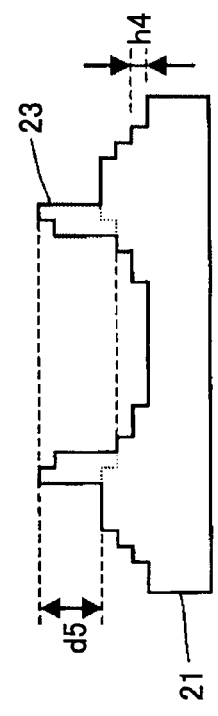
FIG.41A  FIG.41B

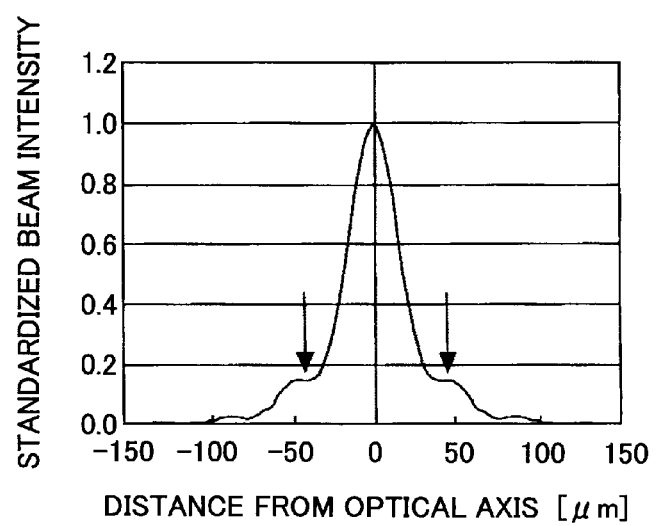
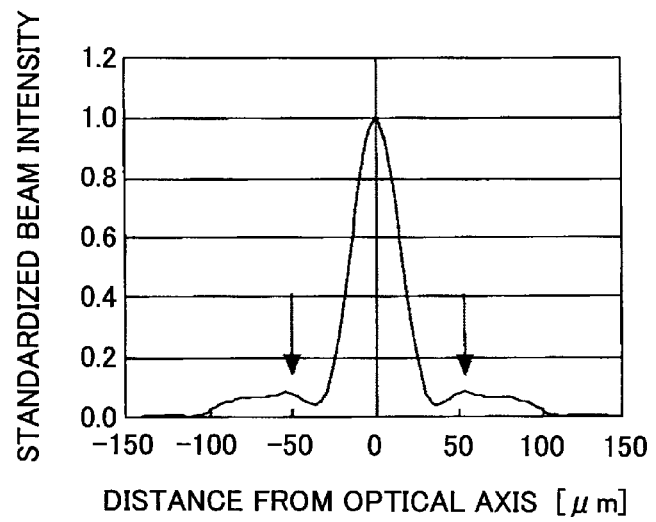
FIG.48

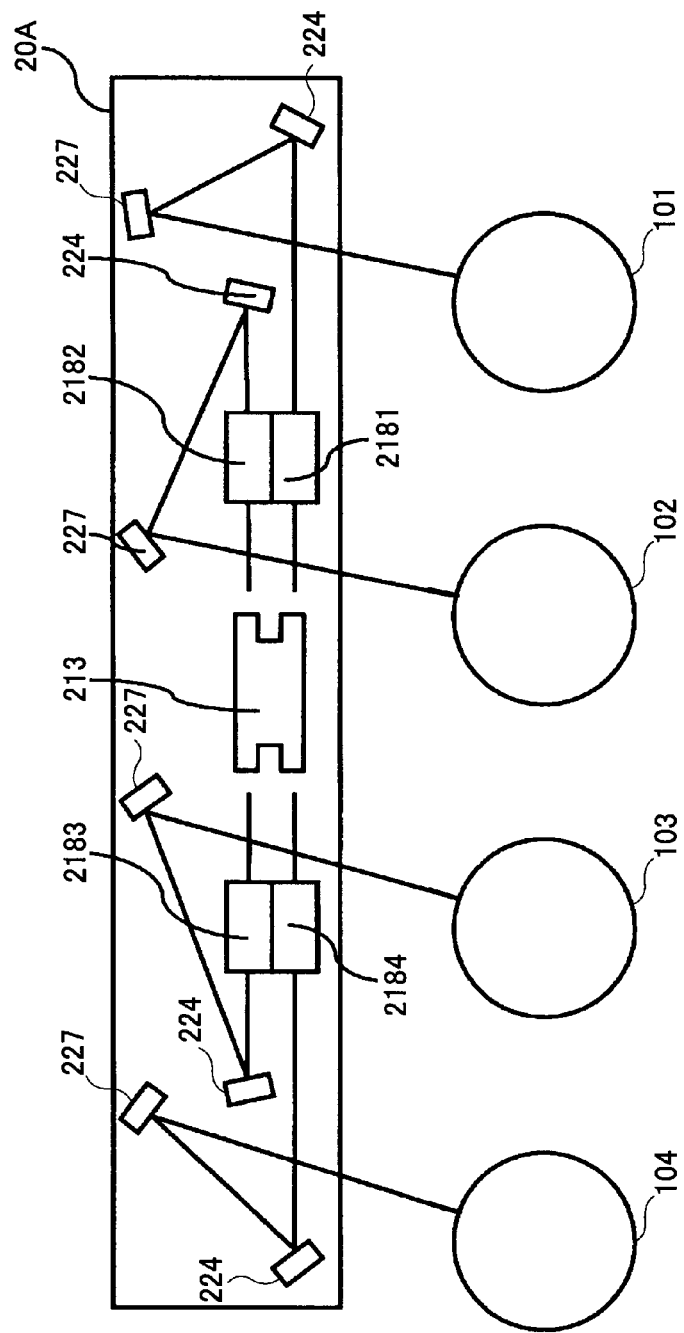

LIGHT SOURCE UNIT, PHASE TYPE OPTICAL ELEMENT, AND LASER BEAM SCANNING DEVICE

BACKGROUND OF THE INVENTION

1. Field of the Invention

The present invention generally relates to a light source unit which irradiates laser beams, a phase type optical element which is used in the light source unit, a laser beam scanning device which scans a surface to be scanned with the laser beams irradiated from the light source unit, an image forming apparatus using the laser beam scanning device, and an optical pickup device using the light source unit.

2. Description of the Related Art

Recently, a laser beam emitted from a laser such as a semiconductor laser has been widely used in optical devices such as an optical pickup device, a laser processing device, a laser beam scanning device which is used in, for example, a copying apparatus and a laser printer. In the optical devices, in many cases, the laser beams are used to form a beam spot and the size of the beam spot is preferably as small as possible.

In addition, it is preferable that an error in the manufacturing process of the optical device be small and a malfunction of the optical device caused by an environmental change be prevented. In order to achieve the above, when the laser beams are condensed by a lens, it is preferable that a range of the lens be as wide as possible in the optical axis direction so that the size of the beam spot is less than an allowable beam spot diameter. In the present invention, the range is called "depth margin". When a using wavelength is $\lambda$, a relationship between the depth margin "d" and the beam spot diameter "w" is shown in Formula (1).

$$d \propto w^2/\lambda \qquad \text{Formula (1)}$$

That is, when the beam spot diameter "w" is determined at the focal position, the depth margin "d" is also determined.

In addition, from Formula (1), the small beam spot diameter and the wide depth margin conflict with each other. Therefore, the optical device must be designed by balancing the beam spot diameter "w" with the depth margin "d". When the beam spot diameter "w" is large, the depth margin "d" becomes wide. However, the performance of the optical device is degraded.

As a method which satisfies both the wide depth margin "d" and the small beam spot diameter "w", a Bessel beam method discovered by J. Durnin can be used. In the Bessel beam method, the amplitude distribution of the beam cross-sections is determined by the first kind zeroth-order Bessel function, and when Bessel beams are transmitted, the amplitude distribution of the beam cross-sections is hardly changed. That is, the Bessel beam is a non-diffraction beam. When it is desired that an exact Bessel beam is generated, an infinitely wide plane wave is required; consequently, it is impossible to generate the exact Bessel beam. However, methods for generating a pseudo Bessel beam are disclosed. In Patent Document 1, an optical scanner is disclosed; in Patent Document 2, a long-focus laser beam generation apparatus is disclosed; in Patent Document 3, a long-focus depth high-resolution irradiating optical system is disclosed; and in Patent Document 4, a Bessel beam generating method is disclosed. In Patent Documents 1 and 2, a method using a ring-shaped slit is disclosed. In Patent Document 3, a method using an axicon prism is disclosed. In Patent Document 4, a method using a binary optical element equivalent to an axicon prism is disclosed.

First, the Bessel beams generated by using the ring-shaped slit are described. FIG. 29 is a diagram showing the Bessel beams generated by using the ring-shaped slit. In FIG. 29, (a) shows an optical system, and (b) through (d) show results by a simulation. In the optical system, a uniform intensity plane wave is input, the plane wave is further input to a ring-shaped slit, and an image is formed by a (perfect) lens having a focal distance of "f". The ring-shaped slit is disposed at the front focal position of the lens.

Parameters used in the simulation are described. In the ring-shaped slit, the inner diameter $\phi$ is 900 μm and the outer diameter $\phi$ is 930 μm. The focal distance "f" of the lens is 50 mm, and the wavelength of the light source is 632.8 nm.

In FIG. 29(b), a beam intensity profile of Bessel beams at the focal position (focal plane) of the lens (50 mm from the lens surface) is shown. The beam intensity is standardized so that the peak intensity of the main lobe laser beams is "1". As shown in FIG. 29(b), the peak intensity of the first-order side lobe laser beams is 13.1% of the peak intensity of the main lobe laser beams, and the peak intensity of the second-order side lobe laser beams is 9.8% of the peak intensity of the main lobe laser beams.

In FIG. 29(c), a relationship between the distance from the lens surface and the beam spot diameter is shown. The beam spot diameter is defined as a diameter of a region where the intensity is $1/e^2$ or more when the center beam intensity is "1". The beam spot diameter is hardly changed even if the laser beams are apart from the focal position; that is, it is understandable that the laser beams are non-diffraction beams. In FIG. 29(d), a two-dimensional image generated by the Bessel beams is shown at the focal position.

In addition, in Patent Document 5, an optical scanner is disclosed in which a method for widening a depth margin is shown.

However, when the ring-shaped slit is used, the center part having a large amount of the laser beams is blocked and the light use efficiency becomes very low.

In addition, when the axicon prism or the binary optical element equivalent to the axicon prism is used, as shown in FIG. 30, since the laser beams are not blocked, the light use efficiency is high. However, since the Bessel beams are generated near optical components, suitable arrangement of the optical components is difficult. For example, when the Bessel beams are used in a laser beam scanning device which is used in an image forming apparatus, an optical system such as a relay optical system is newly required so as to conjugate the Bessel region with a non-scanning surface. Consequently, the number of lenses is increased and the optical system becomes large and the cost is increased. In addition, highly precise positioning of the components is required for the optical axis of the optical system. Therefore, an error may occur in the manufacturing process of the optical device and a malfunction of the optical device caused by an environmental change may occur. FIG. 30 is a diagram showing a part of the optical system which generates the Bessel beams by using the axicon prism.

As shown in FIG. 29(b), the Bessel beams include many side lobe laser beams and the beam intensity of the high-order side lobe laser beams is high. When it is assumed that an ideal amplitude distribution of the Bessel function (of the first kind zeroth-order) is obtained, as described above, the peak intensity of the first-order side lobe laser beams is approximately 13% of the peak intensity of the main lobe laser beams and the peak intensity of the second-order side lobe laser beams is approximately 10% of the peak intensity of the main lobe laser beams. That is, the peak intensity of the side lobe laser beams is high. When the side lobe laser beams are generated, the light amount of the main lobe laser beams is decreased. Especially, an area occupied by the high-order side lobe laser beams is greater than that by the low-order side lobe laser beams; therefore, when the peak intensity of the high-order side lobe laser beams is high, the light amount of the main lobe laser beams is greatly decreased. Since the main lobe laser beams are used as an optical signal, the light use efficiency is actually lowered.

In addition, when the Bessel beams are used in an optical device, since the side lobe laser beams are noise laser beams, too large side lobe laser beams may degrade output image quality of the optical device. Especially, the high-order side lobe laser beams are generated at positions apart from the optical axis and are spatially separated from the main lobe laser beams (highest intensity laser beams); therefore, the noise may affect the output image quality of the optical device. For example, when the Bessel beams are used in an optical device of an image forming apparatus and the peak intensity of the side lobe laser beams is at a position apart from the optical axis, a thin line may be formed to frame a dot formed by the main lobe laser beams. This phenomenon also occurs in a laser processing device.

Next, a case is studied in which the method disclosed in Patent Document 5 is applied to an optical system which uses Gaussian beams as input laser beams. In the Gaussian beams, the beam intensity is high at the optical axis and is lowered at a position apart from the optical axis, so that the Gaussian beams are generally used as the laser beams. Therefore, when the Gaussian beams are transmitted through an aperture, the beam intensity at the four corners of the aperture is lower than that at the center of the aperture. In order to make high the beam intensity at the four corners, since a part of the laser beams in the center must be moved to the four corners, high-order laser beams may be generated and the light use efficiency may be lowered. When only the center part of the Gaussian beams is used, the generation of the high-order side lobe laser beams can be avoided; however, since the amount of the blocked laser beams is increased, the light use efficiency may be lowered.

The inventors of the present invention repeated several experiments (simulations), from which the following result is obtained. In a case where laser beams are condensed by a lens, when a phase distribution of the laser beams which are input to the lens is modulated so that the peak intensity of the side lobe laser beams in the beam intensity profile at the focal position of the lens is slightly increased, the beam spot diameter is prevented from being enlarged at a position apart from the focal position in the optical axis direction of the lens.

In addition to widening the depth margin and not to enlarging the beam spot diameter, a miniaturized digital copying apparatus and a miniaturized laser printer both in monochrome and color have been required. That is, a miniaturized laser beam scanning device used in the digital copying apparatus and the laser printer has been required. Especially, a miniaturized color digital copying apparatus and a miniaturized color laser printer, which have large potential in the market, have been required. When the above apparatuses are miniaturized, the amount of the materials used can be decreased and environmentally friendly products can be realized.

In the color digital copying apparatus and the color laser printer, a tandem type has been mainly developed in which four image forming units such as photoconductor bodies corresponding to four colors are used. A laser beam scanning device has been widely used in which four laser beam scanning devices corresponding to the four image forming units are disposed in one housing.

In addition, in the laser beam scanning device, in many cases, two scanning lenses are used, an optical path is folded by an optical path folding mirror, and the two scanning lenses are contained in the housing. However, one of the two scanning lenses behind the optical path folding mirror obstructs the miniaturization of the laser beam scanning device.

When the scanning lens is disposed behind the optical path folding mirror, a big limitation occurs in arranging the optical path folding mirror in the housing and this limitation results in not being able to miniaturize (to decrease the height of) the laser beam scanning device.

In a case where only one scanning lens is used, or even if plural scanning lenses are used, when the one or more scanning lenses are disposed at the side of a light deflector, the limitation in the arrangement can be solved. However, since the magnification of the scanning lens in the sub scanning direction becomes large, the tolerance of the laser beam scanning device becomes large and an environmental change affects the laser beam scanning device. Consequently, the optical system in the laser beam scanning device becomes unstable with the passage of time. Especially, in a digital copying apparatus and a laser printer capable of processing an A3 size (297 mm×420 mm) sheet, since the range to be scanned becomes large and the distance from the light deflector to a surface to be scanned becomes long, the instability becomes remarkably large with the passage of time.

In addition to the above problems, recently, in a laser beam scanning device which is used in image forming apparatuses such as a digital copying apparatus and a laser printer, in order to prevent displacement of an image on a surface to be formed which displacement is caused by an environmental change, a diffraction lens is used (for example, in Patent Documents 6 through 8).

In Patent Document 6, a laser beam scanning device which is used in a digital copying apparatus, a laser printer, a laser facsimile, and so on is disclosed. In the laser beam scanning device, for a lens whose precise shape is maintained in an optical system, the displacement of the focal position of an image caused by a temperature change is prevented. With this, a low-cost and high-performance laser beam scanning device is realized. The laser beam scanning device provides a light source formed of a semiconductor laser, a coupling optical system which couples laser beams from the light source, a first optical system which makes the laser beams from the coupling optical system parallel laser beams in the main scanning direction and makes the laser beams converge on a deflector in the sub scanning direction, where the deflector deflects the laser beams from the first optical system in the main scanning direction, and a scanning optical system for condensing the laser beams deflected by the deflector. The material of all lenses in the coupling optical system is resin and a diffraction optical surface is formed on at least one surface of the lens.

In Patent Document 7, a low-cost laser beam scanning device whose performance is stable during a temperature change is disclosed. The laser beam scanning device provides a light source for emitting laser beams, a deflector for deflecting input laser beams in the main scanning direction, a light source optical system which makes the laser beams from the light source parallel laser beams in the main scanning direction and makes the laser beams condense near the deflection surface of the deflector in the sub scanning direction, and a scanning optical system for condensing again the laser beams deflected by the deflector. The light source optical system is formed of one optical element made of resin, and the optical element provides at least one reflection surface not having a rotationally symmetric axis and two transmission surfaces.

In Patent Document 8, a compact laser beam scanning device suitable for high-precision printing is disclosed that is tolerant of an ambient temperature change and a wavelength change of a semiconductor laser is disclosed. The laser beam scanning device provides a light source for emitting laser beams, an optical system for guiding the laser beams from the light source to a deflector, and an image forming system for guiding the laser beams from the deflector to a surface where an image is formed. The laser beams scan the surface where the image is formed by rotation of the deflector. The optical system provides a diffraction section on one or more surfaces of the optical system and satisfies a predetermined conditional formula.

In addition, in an optical pickup system, a diffraction optical element is used to achieve compatibility in plural wavelengths (for example, of red, blue, and colors other than the red and blue) and to correct aberration by a single objective lens (for example, in Patent Documents 9 and 10).

In Patent Document 9, a condensing optical element and an optical pickup device which can reduce the degradation of a coma aberration caused by tracking while achieving compatibility in three wavelengths are disclosed. In the condensing optical element which is used in the optical pickup system which executes reproducing/recording information by using laser beams of wavelengths $\lambda1$ through $\lambda3$ for first through third optical disks having protective substrate thicknesses of t1 through t3, at least one optical surface is divided into plural concentric circular areas by making the optical axis the center, when the optical system magnification is determined to be "m3" in reproducing/recording information by a finite common benefit system for the third optical disk, the focal distance "f3" of the condensing optical element for the wavelength "$\lambda3$" satisfies Formula (2).

$$0.01 < |m3| \times (t3-t1)/f3 < 0.07 \quad \text{Formula (2)}$$

In Patent Document 10, a compound objective lens is disclosed. By using the compound objective lens formed of a hologram and an objective lens, stable and high definition compatible reproducing/recording of information is realized in a BD (blue-ray disk) whose substrate thickness is approximately 0.1 mm corresponding to blue laser beams and a DVD (digital versatile disk) whose substrate thickness is approximately 0.6 mm corresponding to red laser beams. The compound objective lens is formed of a hologram and a refraction type lens. The hologram provides a lattice having step-shaped cross sections formed at least at a part of the hologram, where the step difference between the step-shaped cross sections is a value in which a unit step difference "d1" is multiplied by an integer, and the unit step difference "d1" gives an optical path difference of approximately one wavelength for a first laser beam having a wavelength $\lambda1$ within a range of 390 nm to 415 nm. One cycle of the lattice is formed of steps having a height 0 times, two times, one time, and three times the unit step difference "d1" in this order in the direction from the optical axis to the outer side of the hologram.

However, in order to obtain a high-quality image from the image forming apparatus such as a digital copying apparatus and a laser printer, the beam spot diameter must be stable. When a diffraction lens as described above is used, the beam spot diameter becomes stable during a temperature change, and the image quality can be improved. The diffraction lens can correct only influence caused by the temperature change; and a change of the beam spot diameter caused by vibration and deformation of the image forming apparatus cannot be corrected.

In order to further stabilize the beam spot diameter, the depth margin must be wider. That is, it is necessary that the beam spot diameter be made not too much wider than usual.

As described above, the relationship between the depth margin and the beam spot diameter is shown in Formula (1). In the diffraction optical element for achieving compatibility in plural wavelengths (for example, of red, blue, and colors other than the red and blue) and for correcting aberration by a single objective lens, Formula (1) is satisfied for the depth margin.

Recently, the beam spot diameter has been smaller than before due to the progress of high density recording and the depth margin is likely to be narrow. With this, the performance may be decreased and the cost may be increased.

[Patent Document 1] Japanese Patent No. 3507244 (Japanese Laid-Open Patent Application No. 9-243945)
[Patent Document 2] Japanese Laid-Open Patent Application No. 9-064444
[Patent Document 3] Japanese Laid-Open Patent Application No. 4-171415
[Patent Document 4] Japanese Laid-Open Patent Application No. 10-227992
[Patent Document 5] Japanese Laid-Open Patent Application No. 2000-249950
[Patent Document 6] Japanese Laid-Open Patent Application No. 2005-258392
[Patent Document 7] Japanese Laid-Open Patent Application No. 2002-287062
[Patent Document 8] Japanese Laid-Open Patent Application No. 2004-126192
[Patent Document 9] Japanese Laid-Open Patent Application No. 2006-012218
[Patent Document 10] Japanese Laid-Open Patent Application No. 2005-129227

SUMMARY OF THE INVENTION

In a preferred embodiment of the present invention, there is provided a light source unit which irradiates laser beams, a phase type optical element which is used in the light source unit, a laser beam scanning device which scans a surface to be scanned by the laser beams irradiated from the light source unit, an image forming apparatus using the laser beam scanning device, and an optical pickup device using the light source unit. The light source unit can widen a depth margin in high light use efficiency without making a beam spot diameter large when the laser beams are condensed by a condensing optical element. The phase type optical element can further stabilize the beam spot diameter by giving a function which widens a depth margin without making the beam spot diameter large to a diffraction lens and a diffraction optical element for reducing displacement of beam spots on a surface where an image is formed due to an environmental change, for achieving compatibility in plural wavelengths by a single objective lens, and for correcting aberration without increasing cost. The laser beam scanning device can be miniaturized and can have stable performance even with the passage of time. The image forming apparatus can stably form a high quality image. The optical pickup device can accurately irradiate the laser beams onto an optical information recording medium.

Features and advantages of the present invention are set forth in the description that follows, and in part will become apparent from the description and the accompanying drawings, or may be learned by practice of the invention according to the teachings provided in the description. Features and advantages of the present invention will be realized and attained by a light source unit, a phase type optical element, a laser beam scanning device, an image forming apparatus, and an optical pickup device particularly pointed out in the specification in such full, clear, concise, and exact terms as to enable a person having ordinary skill in the art to practice the invention.

To achieve one or more of these and other advantages, according to one aspect of the present invention, there is provided a light source unit which is used together with a laser beam condensing element for condensing laser beams. The light source unit includes a light source which emits the laser beams, a phase type optical element which modulates a phase distribution of the laser beams emitted from the light source, and an aperture which controls the width of the laser beams input to the phase type optical element or output from the phase type optical element. The phase type optical element has a phase distribution so that a first ratio of the peak intensity of side lobe laser beams to the peak intensity of main lobe laser beams in a beam intensity profile at a focal position of the laser beam condensing element is greater than a second ratio of the peak intensity of side lobe laser beams to the peak intensity of main lobe laser beams in a beam intensity profile at the focal position of the laser beam condensing element when it is assumed that the phase type optical element is not disposed.

According to another aspect of the present invention, there is provided a phase type optical element. The phase type optical element includes an optical element whose surface is divided into a plurality of regions including continuous regions and a discontinuous region. A phase difference between adjacent two continuous regions is a value in which $2\pi$ is multiplied by an integer for a using wavelength, a phase difference between the discontinuous region and the continuous region is a value in which $2\pi$ is not multiplied by an integer for the using wavelength, and the discontinuous region is formed at least at a part of the optical element.

According to another aspect of the present invention, there is provided a laser beam scanning device. The laser beam scanning device includes a light source which emits laser beams, a deflection unit which deflects the laser beams emitted from the light source, at least one scanning lens which forms an image on a surface to be scanned by using the laser beams deflected from the deflection unit, at least one folding mirror which folds an optical path of the laser beams, and a phase type optical element which modulates a phase of the laser beams emitted from the light source and widens a depth margin of a beam spot diameter of the laser beams on the surface to be scanned. All the scanning lenses are disposed between the deflection unit and the folding mirror.

EFFECT OF THE INVENTION

According to an embodiment of the present invention, in a phase type optical element in a light source unit, since the phase type optical element has a phase distribution in which a first ratio is greater than a second ratio, the beam spot diameter of laser beams at a focal position of an optical condensing element is restrained from been enlarged. That is, the main lobe laser beams are restrained from being enlarged. Therefore, a depth margin can be widened at high light use efficiency without enlarging the beam spot diameter.

According to an embodiment of the present invention, in a phase type optical element, a diffraction optical element can be added to a depth widening function without increasing cost, which diffraction optical element is used to reduce displacement of an image forming position caused by an environmental change, to be compatible for plural wavelengths (for example, blue, red, and colors other than the blue and red) by a single objective lens, and to correct aberration; the phase type optical element can further stabilize the beam spot diameter. In addition, since the phase type optical element can widen the depth margin, a change of the beam spot diameter caused by a temperature change can be decreased; further, a change of the beam spot diameter caused by deformation and vibration of an apparatus using the phase type optical element can be decreased. In addition, since the phase type optical element can be formed by an existing highly reliable manufacturing process, the phase type optical element can have high reliability with low cost. In addition, since the phase type optical element can restrain the beam spot diameter from being enlarged, an apparatus using the phase type optical element can decrease the beam spot diameter that would be enlarged before delivering the apparatus to a customer even after delivering the apparatus to the customer.

According to an embodiment of the present invention, since a laser beam scanning device includes a phase type optical element and has sufficient space for optical components, the height of the laser beam scanning device can be lowered with the depth margin widening effect of the phase type optical element. That is, the laser beam scanning device can restrain the degradation of optical performance at assembling and at an environmental change by using the phase type optical element, and can decrease the environmental burden by reducing the amount of materials.

According to an embodiment of the present invention, since an image forming apparatus, an optical pickup device, and a laser processing device can use the laser beam scanning deice using the phase type optical element, the image forming apparatus can output a high-quality image, the optical pickup device can detect precise information from an optical disk, and the laser processing device can execute a high-precise process.

BRIEF DESCRIPTION OF THE DRAWINGS

Features and advantages of the present invention will become more apparent from the following detailed description when read in conjunction with the accompanying drawings, in which:

FIG. 9 is a comparison table showing the simulated results in the first through sixth simulations and the comparison example simulation;

FIG. 19 is a comparison table showing the simulated results of the side/main intensity ratios in the simulations shown in FIGS. 12 through 18;

FIG. 20 is a comparison table showing the main intensity ratios of the non-focal position to the focal position in the simulations shown in FIGS. 12 through 18;

FIG. 29 is a diagram showing Bessel beams generated by using a ring-shaped slit;

FIG. 40A is a diagram showing a phase type optical element having steps formed unified with a discontinuous region according to the second embodiment of the present invention;

FIG. 40B is a diagram showing a phase type optical element having steps formed unified with a discontinuous region according to the second embodiment of the present invention;

FIG. 41A is a diagram showing a phase type optical element modified from the phase type optical element shown in FIG. 40A;

FIG. 41B is a diagram showing a phase type optical element modified from the phase type optical element shown in FIG. 40B;

FIG. 48 is a diagram showing beam intensity profiles at a non-focal position of a lens in a simulation according to the second embodiment of the present invention;

FIG. 53 is a diagram showing a laser beam scanning device according to the third embodiment of the present invention.

DESCRIPTION OF THE PREFERRED EMBODIMENTS

Best Mode of Carrying Out the Invention

The best mode of carrying out the present invention is described with reference to the accompanying drawings.

First Embodiment

[Light Source Unit]

Figure 1:
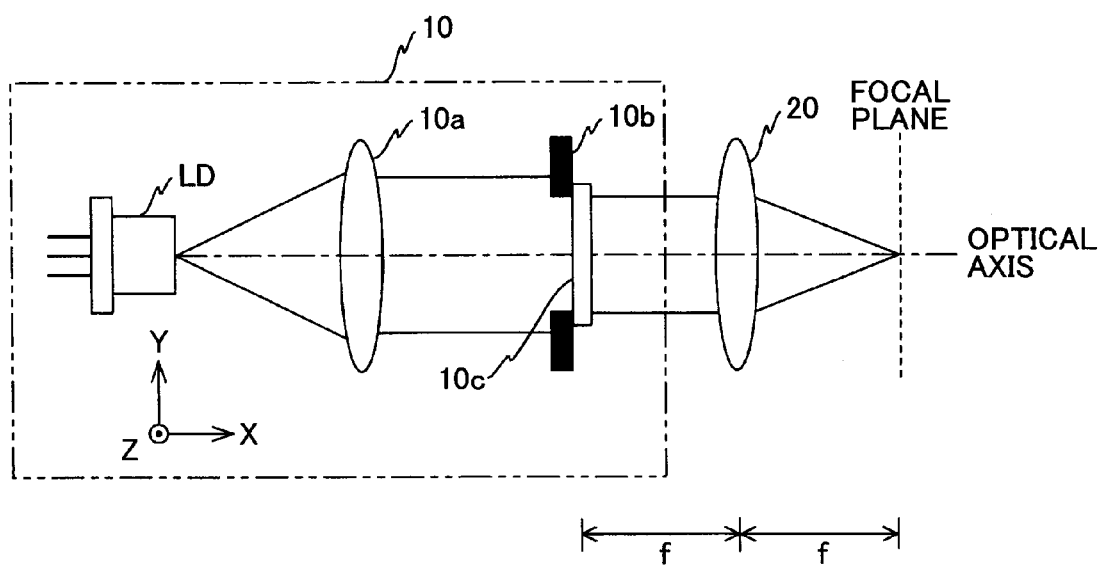
FIG. 1 is a schematic diagram showing a light source unit according to a first embodiment of the present invention.

First, referring to FIGS. 1 through 23, a light source unit according to a first embodiment of the present invention is described. FIG. 1 is a schematic diagram showing a light source unit 10 according to the first embodiment of the present invention. In FIG. 1, in addition to the light source unit 10, a condenser lens 20, a focal plane, and an optical axis are shown.

As shown in FIG. 1, the light source unit 10 includes a semiconductor laser LD (laser diode) which is a light source, a coupling lens 10a, an aperture 10b, and a phase type optical element 10c. In the present embodiment, the optical axis direction of the coupling lens 10c is the X axis direction, the direction orthogonal to the X direction is the Y direction, and the direction orthogonal to the X and Y directions is the Z direction.

The semiconductor laser LD emits laser beams in the +X direction. In this, the wavelength of the laser beam is, for example, 632.8 nm.

The coupling lens 10a is disposed at the +X side of the semiconductor laser LD and makes the laser beams emitted from the semiconductor laser LD almost parallel laser beams.

The aperture 10b is disposed at the +X side of the coupling lens 10a and controls the width of the laser beams transmitted through the coupling lens 10a. The opening part of the aperture 10c is, for example, a circle whose diameter is 930 μm.

Generally, an aperture is disposed to prevent a beam spot diameter from being changed caused by dispersion of divergence angles of the laser beams and with the passage of time at a focal position of the laser beams by a condenser lens, and the aperture makes the width of the laser beams input to the condenser lens constant. Therefore, since the aperture can largely prevent the beam spot diameter from being changed at the focal position of the condenser lens, the aperture is an essential component in optical devices. However, when a part of the laser beams is cut by the aperture, the beam intensity profile at the focal position includes side lobe laser beams.

The phase type optical element 10c is disposed at the +X side of the aperture 10b and modulates the phase distribution of the laser beams transmitted through the opening part of the aperture 10b. The light source unit 10 irradiates the laser beams via the phase type optical element 10c. The aperture 10b and the phase type optical element 10c are disposed so that their center YZ coordinate values are almost equal to each other.

Next, the phase type optical element 10c is described in detail. As shown in FIG. 1, the condenser lens 20 is disposed at the +X side of the light source unit 10. The condenser lens 20 condenses the laser beams irradiated from the light source unit 10 at the focal plane. The focal distance "f" of the condenser lens 20 is, for example, 50 mm, and the phase type optical element 10c is disposed at the position where the distance from the condenser lens 20 is approximately 50 mm in the X axis direction. That is, the phase type optical element 10c is disposed at the front side focal position of the condenser lens 20. In the present embodiment, a position where the beam spot diameter becomes a minimum value is called the focal position. In addition, the beam spot diameter is allowable within, for example, 105% of a predetermined beam spot diameter, and the width in the optical axis direction where the beam spot diameter is the allowable beam spot diameter or less is defied as "depth margin".

The actual intensity distribution of the laser beams emitted from a semiconductor laser has a Gaussian distribution. However, in order to make the description simple, for the sake of convenience, it is defined that the intensity of the laser beams emitted from the semiconductor laser is uniform. However, the following description can also pertain when the intensity of the laser beams input to the phase type optical element $10c$ has the Gaussian distribution.

[First Simulation]

Figure 2A:
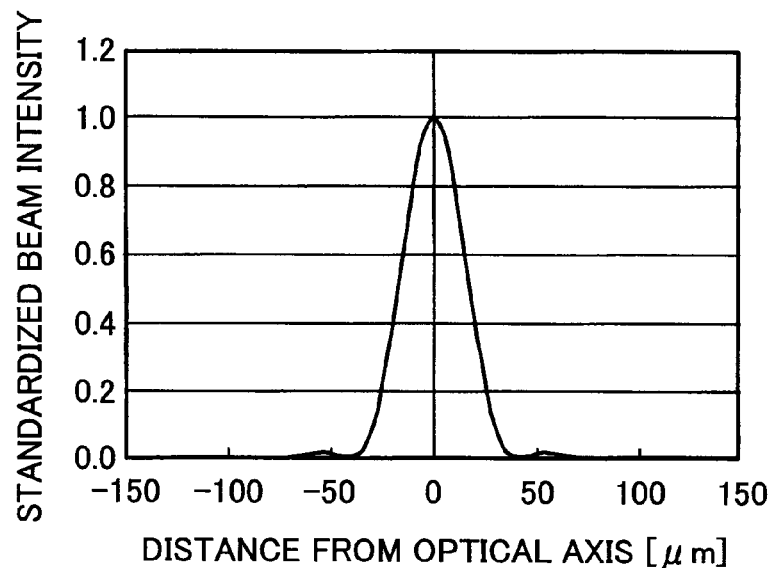
FIG. 2A is a beam intensity profile at the focal position in a first simulation according to the first embodiment of the present invention.
Figure 2B:
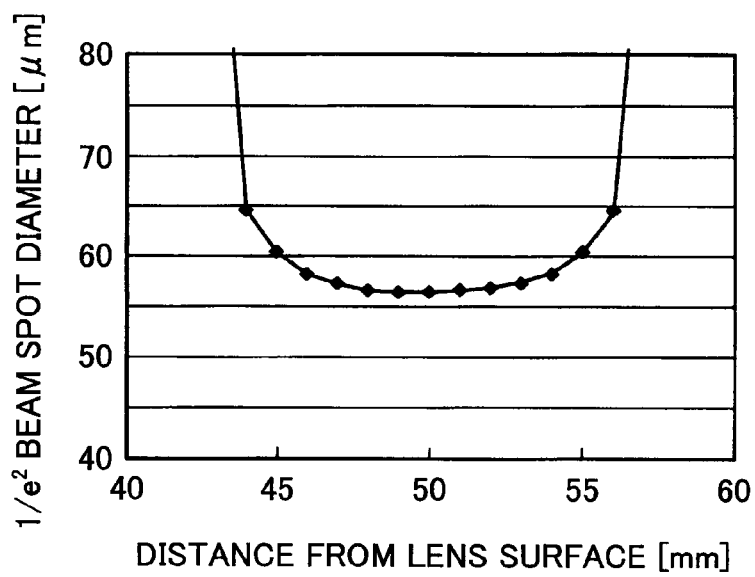
FIG. 2B is a graph showing a relationship between the distance from a lens surface of a condenser lens in the +X direction and a beam spot diameter in the first simulation.

Referring to FIGS. 2A and 2B, a first simulation is described in which the phase type optical element $10c$ does not exist. FIG. 2A is a beam intensity profile at the focal position in the first simulation. In FIG. 2A, the simulated result is shown, the vertical axis shows the standardized beam intensity so that the maximum value (the peak intensity of the main lobe laser beams) is "1", and the horizontal axis shows the distance (μm) from the optical axis on the YZ plane at the focal position of the condenser lens 20. As shown in FIG. 2A, from the simulated result, the ratio of the peak intensity of the side lobe laser beams to the peak intensity of the main lobe laser beams is 1.6% in the beam intensity profile at the focal position. The ratio is also called "side/main intensity ratio".

FIG. 2B is a graph showing a relationship between the distance from the lens surface of the condenser lens 20 in the +X direction and the beam spot diameter in the first simulation. In FIG. 2B, the simulated result is shown. In the present embodiment, the beam spot diameter is defined as a diameter of a region where the intensity is $1/e^2$ or more when the center beam intensity is "1". From the simulated result, the beam spot diameter at the focal position is 56.4 μm and the depth margin is 8.9 mm.

[Second Simulation]

Figure 3A:
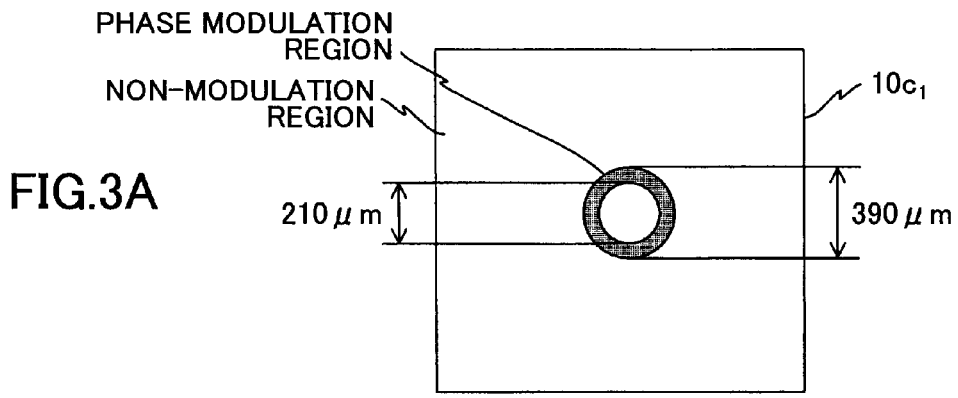
FIG. 3A is a diagram showing a phase type optical element in a second simulation according to the first embodiment of the present invention.
Figure 3B:
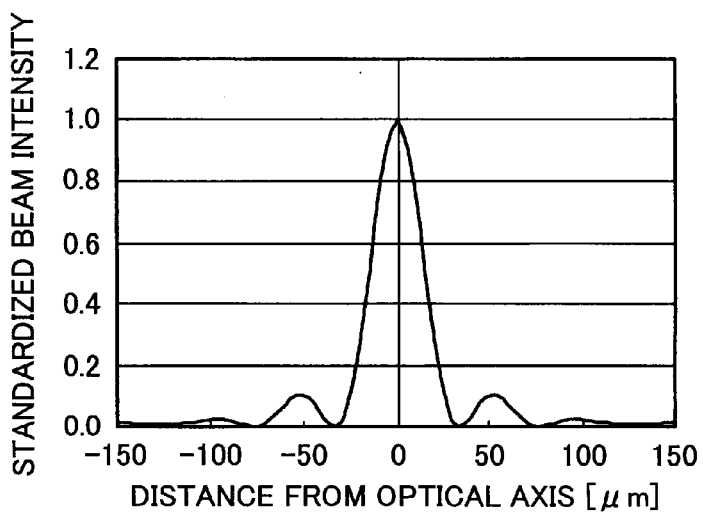
FIG. 3B is a beam intensity profile at the focal position in the second simulation.
Figure 3C:
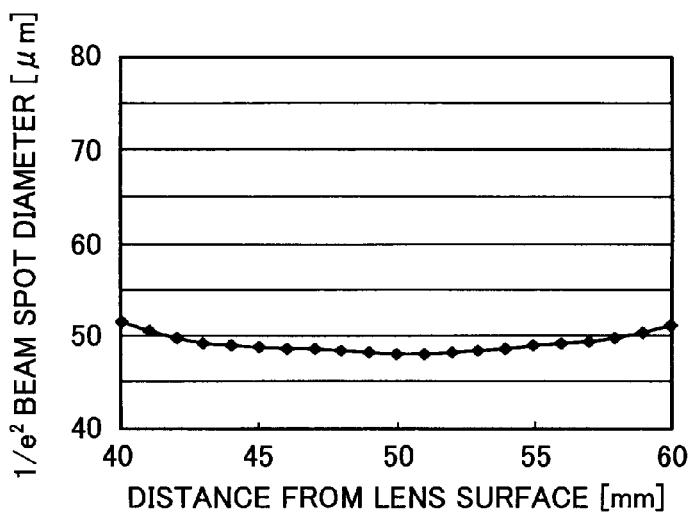
FIG. 3C is a graph showing a relationship between the distance from the lens surface of the condenser lens in the +X direction and the beam spot diameter in the second simulation.

Referring to FIGS. 3A through 3C, a second simulation is described in which a phase type optical element $10c_1$ is used. FIG. 3A is a diagram showing the phase type optical element $10c_1$ in the second simulation. FIG. 3B is a beam intensity profile at the focal position in the second simulation. FIG. 3C is a graph showing a relationship between the distance from the lens surface of the condenser lens 20 in the +X direction and the beam spot diameter in the second simulation. In FIGS. 3B and 3C, the simulated results are shown.

As shown in FIG. 3A, the phase type optical element $10c_1$ has a phase modulation region at the center and the phase modulation region has the shape of a ring whose inner circumference has a diameter of 210 μm and outer circumference has a diameter of 390 μm. An optical phase difference of phase π is given to a laser beam input to the phase modulation region, and a laser beam input to one of non-modulation regions is transmitted through as it is. In this case, as shown in FIG. 3B, from the simulated result, the side/main intensity ratio at the focal position is 10.4%. In addition, as shown in FIG. 3C, from the simulated result, the beam spot diameter at the focal position is 48.1 μm and the depth margin is 18.0 mm.

[Third Simulation]

Figure 4A:
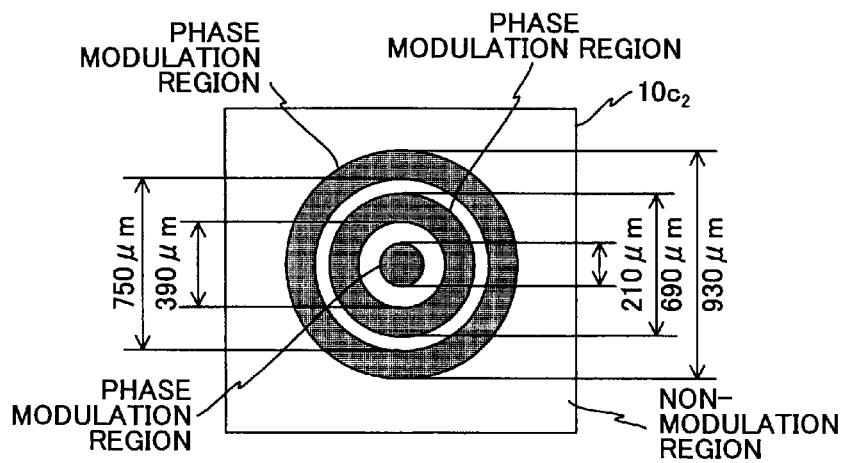
FIG. 4A is a diagram showing a phase type optical element in a third simulation according to the first embodiment of the present invention.
Figure 4B:
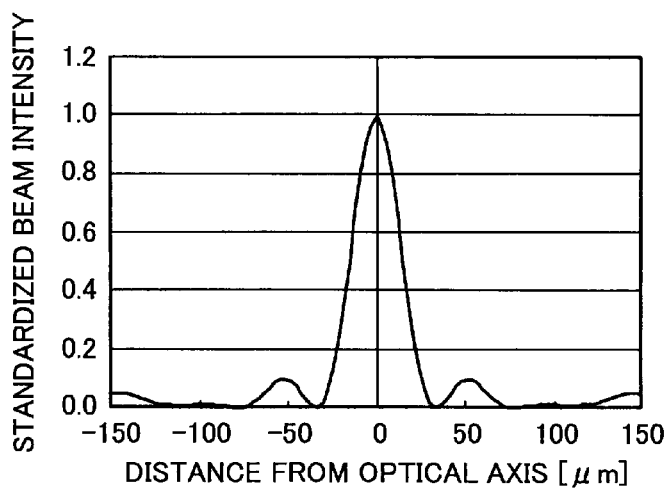
FIG. 4B is a beam intensity profile at the focal position in the third simulation.
Figure 4C:
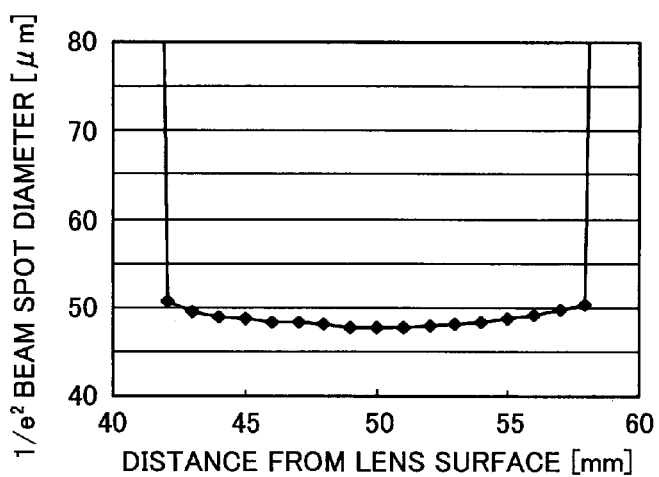
FIG. 4C is a graph showing a relationship between the distance from the lens surface of the condenser lens in the +X direction and the beam spot diameter in the third simulation.

Referring to FIGS. 4A through 4C, a third simulation is described in which a phase type optical element $10c_2$ is used. FIG. 4A is a diagram showing the phase type optical element $10c_2$ in the third simulation. FIG. 4B is a beam intensity profile at the focal position in the third simulation. FIG. 4C is a graph showing a relationship between the distance from the lens surface of the condenser lens 20 in the +X direction and the beam spot diameter in the third simulation. In FIGS. 4B and 4C, the simulated results are shown.

As shown in FIG. 4A, the phase type optical element $10c_2$ has three phase modulation regions. The first phase modulation region has a shape of a circle having a diameter of 210 μm, the second phase modulation region has a shape of a ring whose inner circumference has a diameter of 390 μm and outer circumference has a diameter of 690 μm, and the third phase modulation region has a shape of a ring whose inner circumference has a diameter of 750 μm and outer circumference has a diameter of 930 μm. An optical phase difference of phase π is given to a laser beam input to these phase modulation regions, and a laser beam input to one of non-modulation regions is transmitted through as it is. In this case, as shown in FIG. 4B, from the simulated result, the side/main intensity ratio at the focal position is 9.6%. In addition, as shown in FIG. 4C, from the simulated result, the beam spot diameter at the focal position is 47.7 μm and the depth margin is 15.0 mm.

[Fourth Simulation]

Figure 5A:
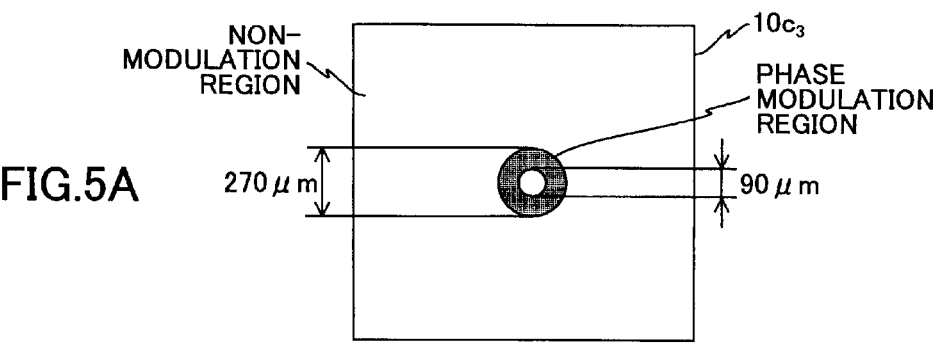
FIG. 5A is a diagram showing a phase type optical element in a fourth simulation according to the first embodiment of the present invention.
Figure 5B:
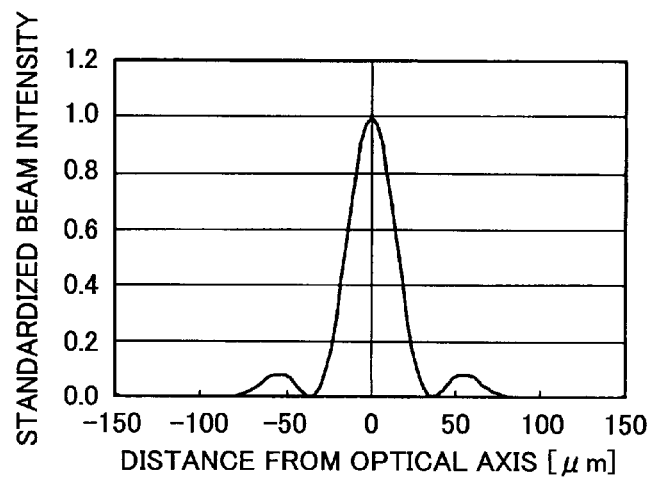
FIG. 5B is a beam intensity profile at the focal position in the fourth simulation.
Figure 5C:
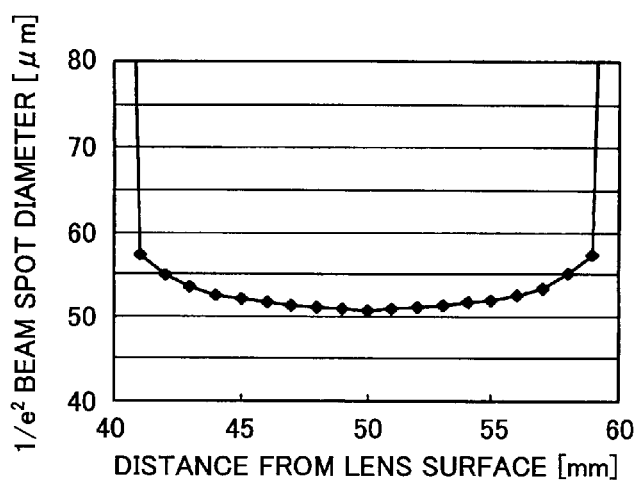
FIG. 5C is a graph showing a relationship between the distance from the lens surface of the condenser lens in the +X direction and the beam spot diameter in the fourth simulation.

Referring to FIGS. 5A through 5C, a fourth simulation is described in which a phase type optical element $10c_3$ is used. FIG. 5A is a diagram showing the phase type optical element $10c_3$ in the fourth simulation. FIG. 5B is a beam intensity profile at the focal position in the fourth simulation. FIG. 5C is a graph showing a relationship between the distance from the lens surface of the condenser lens 20 in the +X direction and the beam spot diameter in the fourth simulation. In FIGS. 5B and 5C, the simulated results are shown.

As shown in FIG. 5A, the phase type optical element $10c_3$ has a phase modulation region at the center and the phase modulation region has a shape of a ring whose inner circumference has a diameter of 90 μm and outer circumference has a diameter of 270 μm. An optical phase difference of phase π is given to a laser beam input to the phase modulation region, and a laser beam input to one of non-modulation regions is transmitted through as it is. In this case, as shown in FIG. 5B, from the simulated result, the side/main intensity ratio at the focal position is 8.1%. In addition, as shown in FIG. 5C, from the simulated result, the beam spot diameter at the focal position is 50.7 μm and the depth margin is 13.8 mm.

[Fifth Simulation]

Figure 6A:
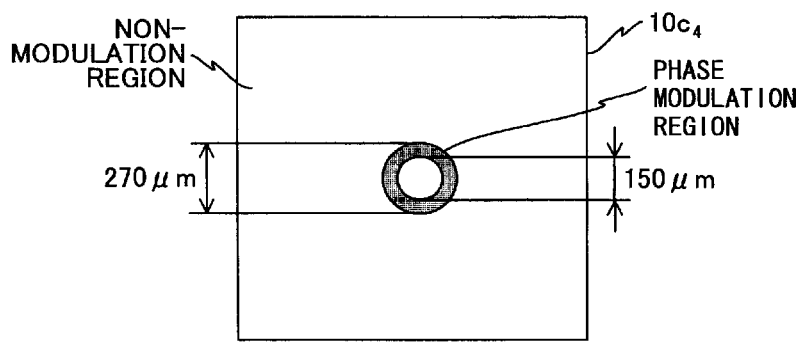
FIG. 6A is a diagram showing a phase type optical element in a fifth simulation according to the first embodiment of the present invention.
Figure 6B:
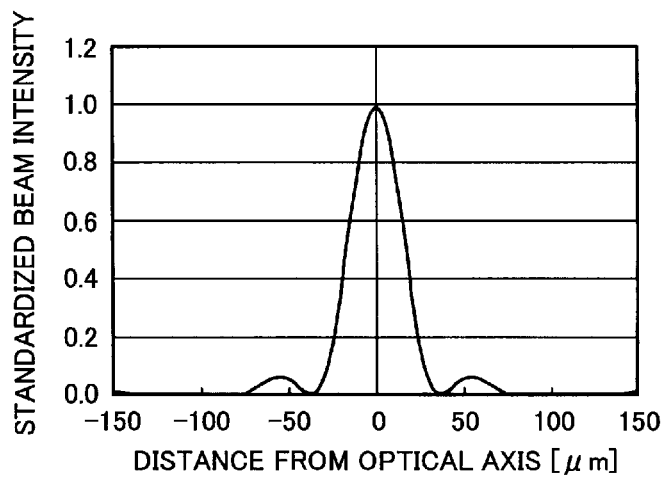
FIG. 6B is a beam intensity profile at the focal position in the fifth simulation.
Figure 6C:
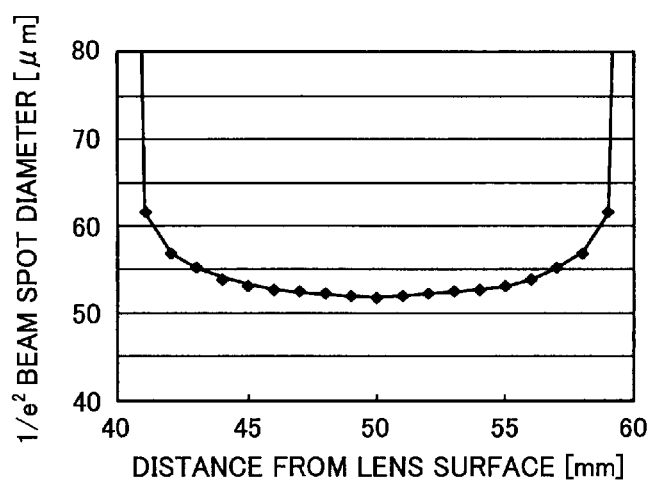
FIG. 6C is a graph showing a relationship between the distance from the lens surface of the condenser lens in the +X direction and the beam spot diameter in the fifth simulation.

Referring to FIGS. 6A through 6C, a fifth simulation is described in which a phase type optical element $10c_4$ is used. FIG. 6A is a diagram showing the phase type optical element $10c_4$ in the fifth simulation. FIG. 6B is a beam intensity profile at the focal position in the fifth simulation. FIG. 6C is a graph showing a relationship between the distance from the lens surface of the condenser lens 20 in the +X direction and the beam spot diameter in the fifth simulation. In FIGS. 6B and 6C, the simulated results are shown.

As shown in FIG. 6A, the phase type optical element $10c_4$ has a phase modulation region at the center and the phase modulation region has a shape of a ring whose inner circumference has a diameter of 150 μm and outer circumference has a diameter of 270 μm. An optical phase difference of phase π is given to a laser beam input to the phase modulation region, and a laser beam input to one of non-modulation regions is transmitted through as it is. In this case, as shown in FIG. 6B, from the simulated result, the side/main intensity ratio at the focal position is 5.8%. In addition, as shown in FIG. 6C, from the simulated result, the beam spot diameter at the focal position is 51.8 μm and the depth margin is 12.9 mm.

[Sixth Simulation]

Figure 7A:
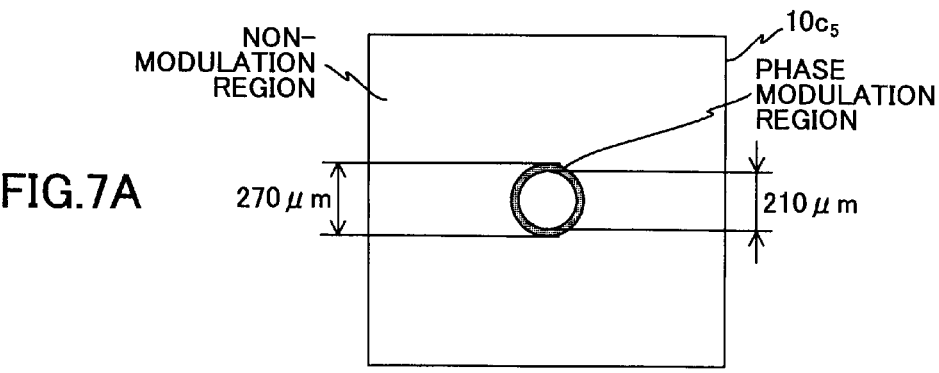
FIG. 7A is a diagram showing a phase type optical element in a sixth simulation according to the first embodiment of the present invention.
Figure 7B:
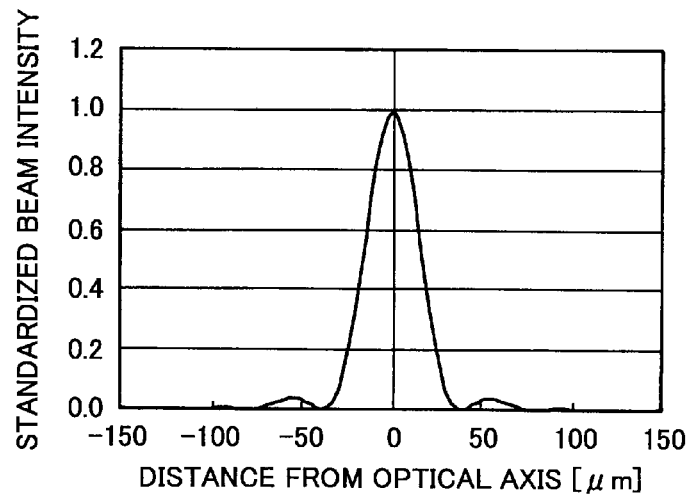
FIG. 7B is a beam intensity profile at the focal position in the sixth simulation.
Figure 7C:
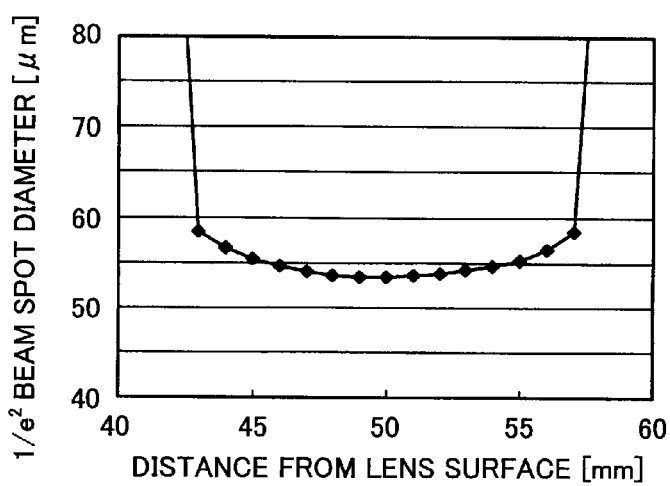
FIG. 7C is a graph showing a relationship between the distance from the lens surface of the condenser lens in the +X direction and the beam spot diameter in the sixth simulation.

Referring to FIGS. 7A through 7C, a sixth simulation is described in which a phase type optical element $10c_5$ is used. FIG. 7A is a diagram showing the phase type optical element $10c_5$ in the sixth simulation. FIG. 7B is a beam intensity profile at the focal position in the sixth simulation. FIG. 7C is a graph showing a relationship between the distance from the lens surface of the condenser lens 20 in the +X direction and the beam spot diameter in the sixth simulation. In FIGS. 7B and 7C, the simulated results are shown.

As shown in FIG. 7A, the phase type optical element $10c_5$ has a phase modulation region at the center and the phase modulation region has a shape of a ring whose inner circumference has a diameter of 210 μm and outer circumference has a diameter of 270 μm. An optical phase difference of phase π is given to a laser beam input to the phase modulation region, and a laser beam input to one of non-modulation regions is transmitted through as it is. In this case, as shown in FIG. 7B, from the simulated result, the side/main intensity ratio at the focal position is 3.8%. In addition, as shown in FIG. 7C, from the simulated result, the beam spot diameter at the focal position is 53.3 μm and the depth margin is 11.2 mm.

[Comparison Example Simulation]

Figure 8A:
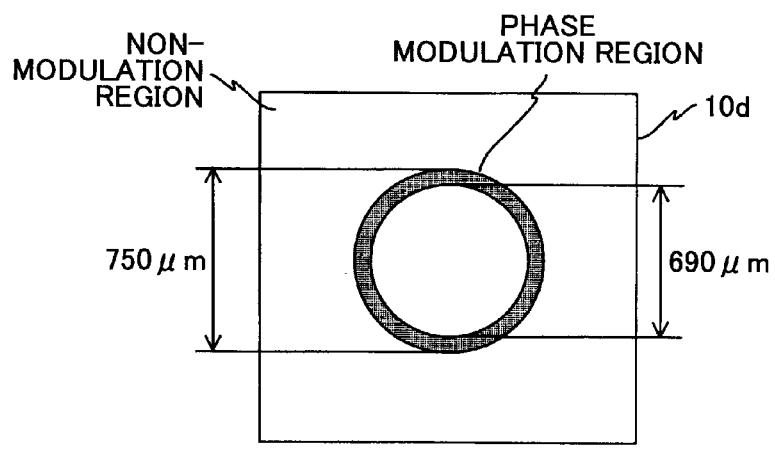
FIG. 8A is a diagram showing a phase type optical element in a comparison example simulation according to the first embodiment of the present invention.
Figure 8B:
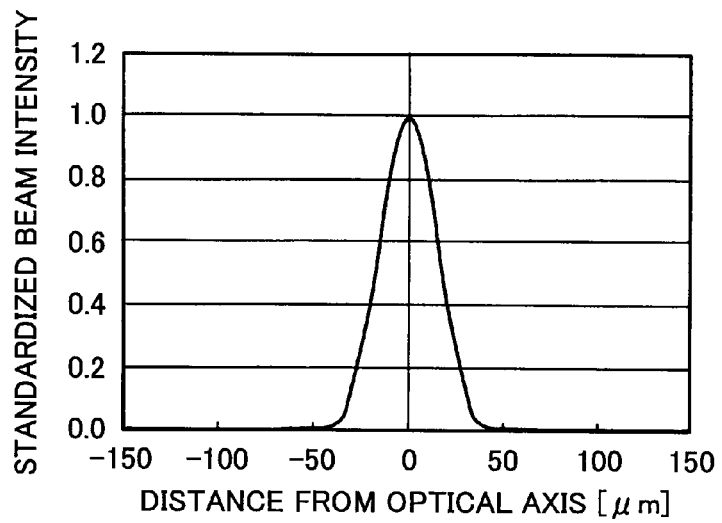
FIG. 8B is a beam intensity profile at the focal position in the comparison example simulation.
Figure 8C:
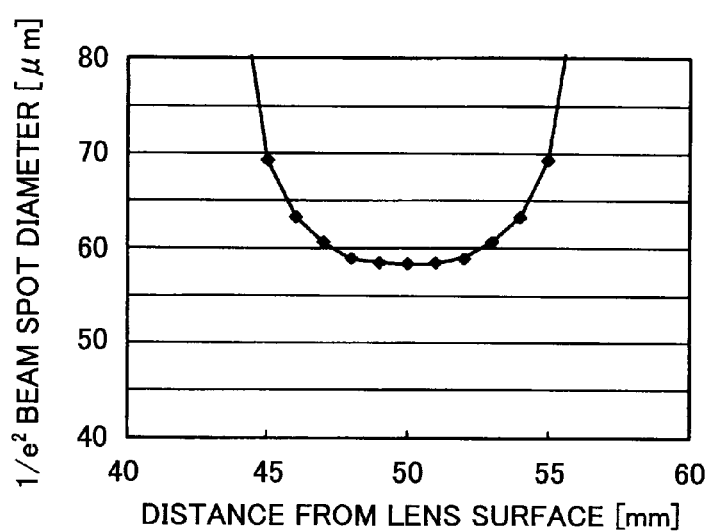
FIG. 8C is a graph showing a relationship between the distance from the lens surface of the condenser lens in the +X direction and the beam spot diameter in the comparison example simulation.

In order to compare the above simulated results in the present embodiment with a comparison example simulation, a phase type optical element $10d$ which is not a phase type optical element in the present embodiment is used. Referring to FIGS. 8A through 8C, the comparison example simulation is described. FIG. 8A is a diagram showing the phase type optical element $10d$ in the comparison example simulation. FIG. 8B is a beam intensity profile at the focal position in the comparison example simulation. FIG. 8C is a graph showing a relationship between the distance from the lens surface of the condenser lens 20 in the +X direction and the beam spot diameter in the comparison example simulation. In FIGS. 8B and 8C, the simulated results are shown.

As shown in FIG. 8A, the phase type optical element $10d$ has a phase modulation region at the center and the phase modulation region has a shape of a ring whose inner circumference has a diameter of 690 μm and outer circumference has a diameter of 750 μm. An optical phase difference of phase π is given to a laser beam input to the phase modulation region, and a laser beam input to one of non-modulation regions is transmitted through as it is. In this case, as shown in FIG. 8B, from the simulated result, the side/main intensity ratio at the focal position is 0.6%. In addition, as shown in FIG. 8C, from the simulated result, the beam spot diameter at the focal position is 58.4 μm and the depth margin is 6.4 mm.

[Comparison Table]

FIG. 9 is a comparison table showing the simulated results in the first through sixth simulations and the comparison example simulation. As shown in FIG. 9, when any one of the phase type optical elements $10c_1$ through $10c_5$ in the present embodiment is used, the side/main intensity ratio at the focal position is greater than that at non-presence of a phase type optical element.

In addition, as shown in FIG. 9, when any one of the phase type optical elements $10c_1$ through $10c_5$ in the present embodiment is used, the beam spot diameter at the focal position is less than that at the non-presence of the phase type optical element and the depth margin is greater than that at the non-presence of the phase type optical element. Further, when the side/main intensity ratio becomes large, the depth margin becomes wide.

In addition, when any one of the phase type optical elements $10c_1$ through $10c_5$ is used, the peak intensity of the high-order side lobe laser beams is small enough for actual practice from the simulated results.

In the present embodiment, since a light blocking region which is provided in Patent Documents 1 and 2 is not disposed inside the aperture, the depth margin can be widened with high light use efficiency. In addition, in the present embodiment, since the depth margin can be widened near the light condensing position when the laser beams are condensed, the component arranging restriction which Patent Documents 3 and 4 have does not occur.

Next, the phase type optical elements $10c_1$ through $10c_5$ in the present embodiment are compared with the phase type optical elements $10d$ which is not in the present embodiment. As shown in FIG. 9, the side/main intensity ratio at the focal position in the phase type optical elements $10d$ is less than that at the phase type optical elements $10c_1$ through $10c_5$ and the non-presence of the phase type optical element.

In addition, as shown in FIG. 9, the beam spot diameter at the focal position in the phase type optical element $10d$ is greater than that in any one of the phase type optical elements $10c_1$ through $10c_5$ and the non-presence of the phase type optical element, and the depth margin in the phase type optical element $10d$ is less than that in any one of the phase type optical elements $10c_1$ through $10c_5$ and the non-presence of the phase type optical element.

As shown in FIG. 9, the side/main intensity ratio at the focal position when any one of the phase type optical elements $10c_1$ through $10c_5$ is used is greater than that of the non-presence of the phase type optical element.

That is, the phase type optical element $10c$ has a phase distribution so that a first ratio of the peak intensity of the side lobe laser beams to the peak intensity of the main lobe laser beams in a beam intensity profile at the focal position of the condenser lens 20 is greater than a second ratio of the peak intensity of the side lobe laser beams to the peak intensity of the main lobe laser beams in a beam intensity profile at the focal position of the condenser lens 20 when it is assumed that the phase type optical element $100c$ is not disposed.

When the peak intensity of the side lobe laser beams is high, the peak intensity of the main lobe laser beam is lowered. In addition, in many optical devices, only the main lobe laser beams are actually used and the side lobe laser beams are noise. For example, in a laser beam scanning device which is used in an image forming apparatus, since a dot is formed by using the main lobe laser beams, when the side lobe laser beams are too high, a ring-shaped line is formed around the dot. Consequently, the output image quality is degraded.

The first-order side lobe laser beams which are generated adjacent to the main lobe laser beams hardly generate noise while the high-order side lobe laser beams generate noise; however, when the first-order side lobe laser beams have too high intensity, there is a risk that the output image quality will be degraded. In an optical pickup device, when the side lobe laser beams have too high intensity, the side lobe laser beams may detect a signal from a pit adjacent to a normal pit and noise may be increased in an output signal. Therefore, it is preferable that the side/main intensity ratio at the focal position be less than 13% in the Bessel beams.

Figures 10A, 10B:
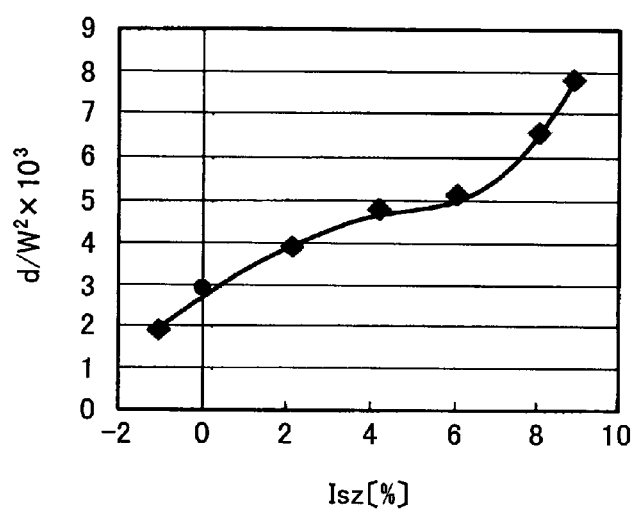
FIG. 10A is a comparison table modified the comparison table shown in FIG. 9 including the calculated results of the "$d/w^2 \times 10^3$" and the "Isz [%]"
FIG. 10B is a graph showing a relationship between the value of "$d/w^2 \times 10^3$" and the value of "Isz [%]"

As shown in FIG. 9, the beam spot diameters at the focal position are different among the phase type optical elements in the simulations. Therefore, as described in Formula (1), by using that the depth margin "d" is proportional to the second power of the beam spot diameter "w", as shown in FIG. 10A, "$d/w^2 \times 10^3$" is calculated. As shown in FIG. 10A, the greater the "$d/w^2 \times 10^3$" is, the greater the widening effect of the depth margin "d" is. In addition, a changing amount of the side/main intensity ratio "Isz [%]" at the phase type optical elements $10c_1$ through $10c_5$ and $10d$ from the side/main intensity ratio at the non-presence of the phase type optical element is shown in FIG. 10A. The value of "Isz [%]" is obtained by subtracting the side/main intensity ratio at the non-presence of the phase type optical element from the side/main intensity ratio at each of the phase type optical elements $10c_1$ through $10d$. FIG. 10A is a comparison table modified the comparison table shown in FIG. 9 including the calculated results of the "$d/w^2 \times 10^3$" and the "Isz [%]".

FIG. 10B is a graph showing a relationship between the value of "$d w^2 \times 10^3$" and the value of "Isz [%]". As shown in FIG. 10B, when "Isz [%]" is approximately from 4.2% to 6.1%, the increment of the "$d/w^2 \times 10^3$" is small for the increment of the "Isz [%]". Therefore, when the phase type optical element in the present invention is used in an optical device whose performance may be degraded at too high side lobe laser beam intensity, even if the widening effect of the depth margin is lowered, it is preferable that the "Isz [%]" be 4.2% or less.

Figure 11:
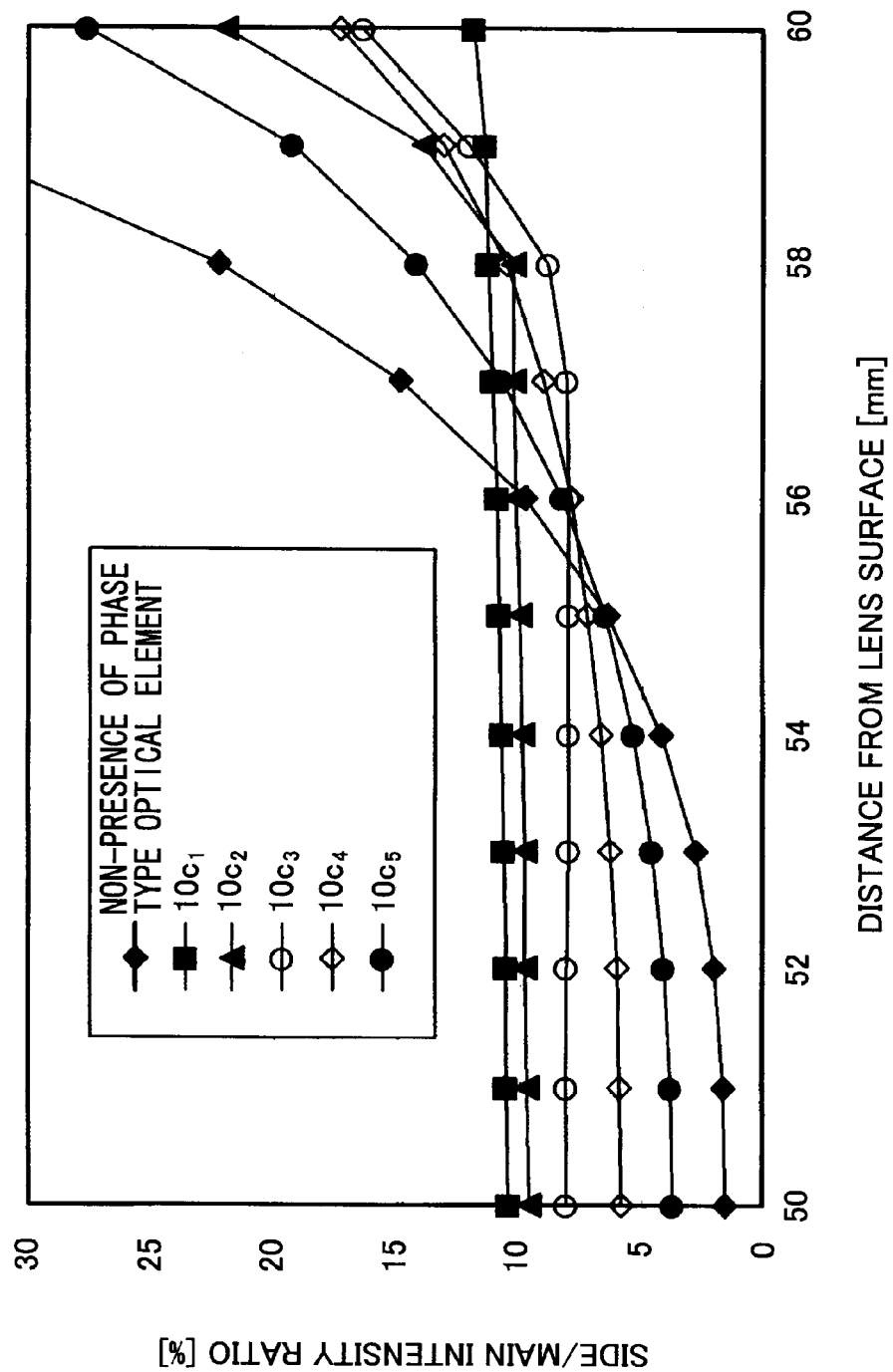
FIG. 11 is a graph showing a relationship between a side/main intensity ratio and the distance from the lens surface of the condenser lens in the phase type optical elements in the first through sixth simulations.

FIG. 11 is a graph showing a relationship between the side/main intensity ratio and the distance from the lens surface of the condenser lens 20 in the phase type optical elements $10c_1$ through $10c_5$ and the non-presence of the phase type optical element. In FIG. 11, the distance is measured in the +X direction from the lens surface. When the phase type optical element $10d$ is used, since the beam intensity profile is largely degraded at positions other than the focal position and the side lobe laser beams overlap the main lobe laser beams, the data of the phase type optical element $10d$ are not shown. As shown in FIG. 11, when the distance from the condenser lens 20 is 57 mm or more, the side/main intensity ratio at the non-presence of the phase type optical element is greater than that at each of the phase type optical elements $10c_1$ through $10c_5$.

Simulated results of the beam intensity profiles are shown in FIGS. 12 through 18 in three cases where the distances from the lens surface are 50 mm, 57 mm, and 59 mm in each of the non-presence of the phase type optical element, the phase type optical elements $10c_1$ through $10c_5$, and the phase type optical element $10d$. In FIGS. 12 through 18, (a) shows a case where the distance from the lens surface is 50 mm (focal position), (b) shows a case where the distance from the lens surface is 57 mm, and (c) shows a case where the distance from the lens surface is 59 mm.

Figure 12:
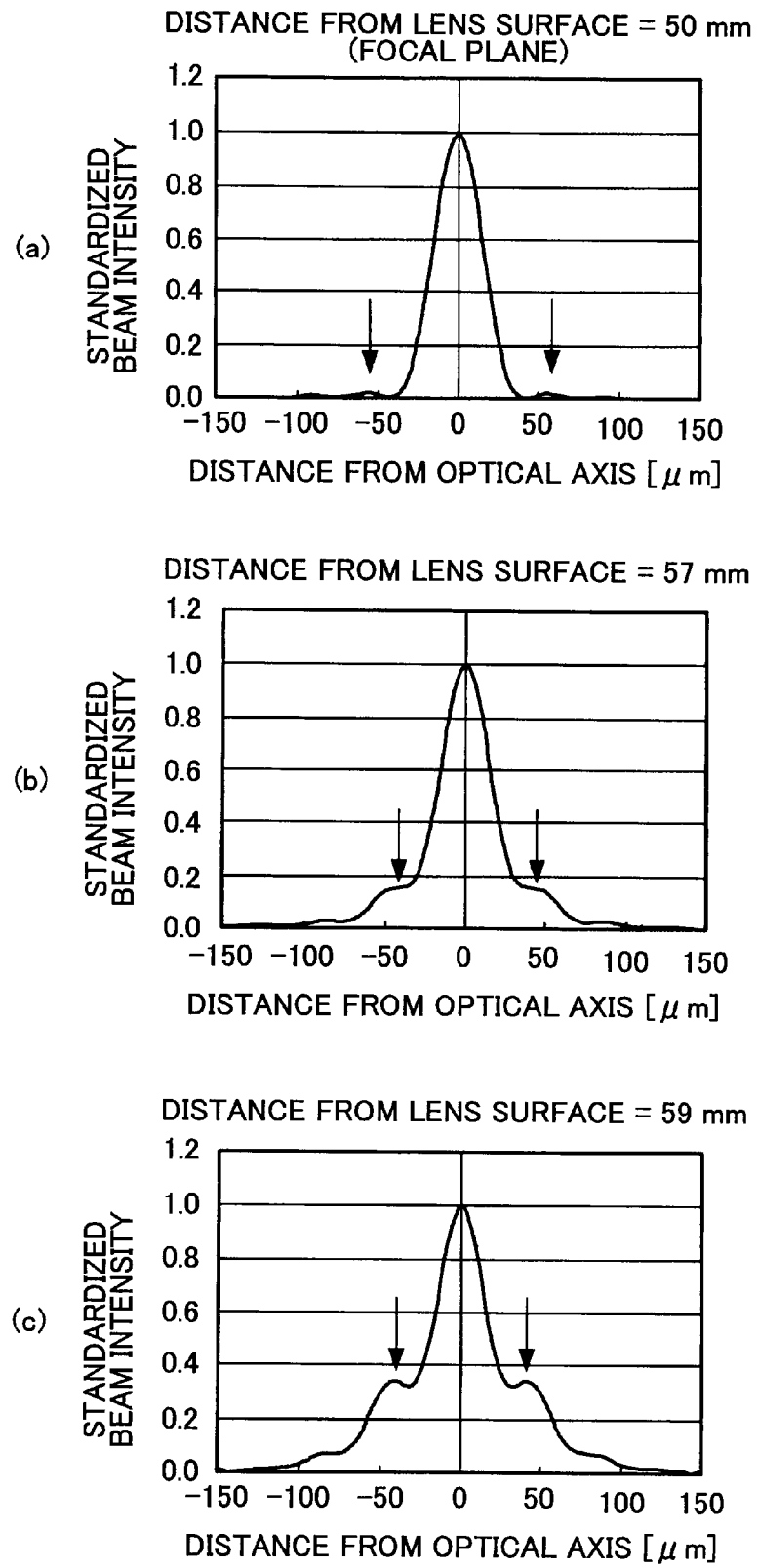
FIG. 12 contains graphs showing beam intensity profiles in the non-presence of the phase type optical element.
Figure 13:
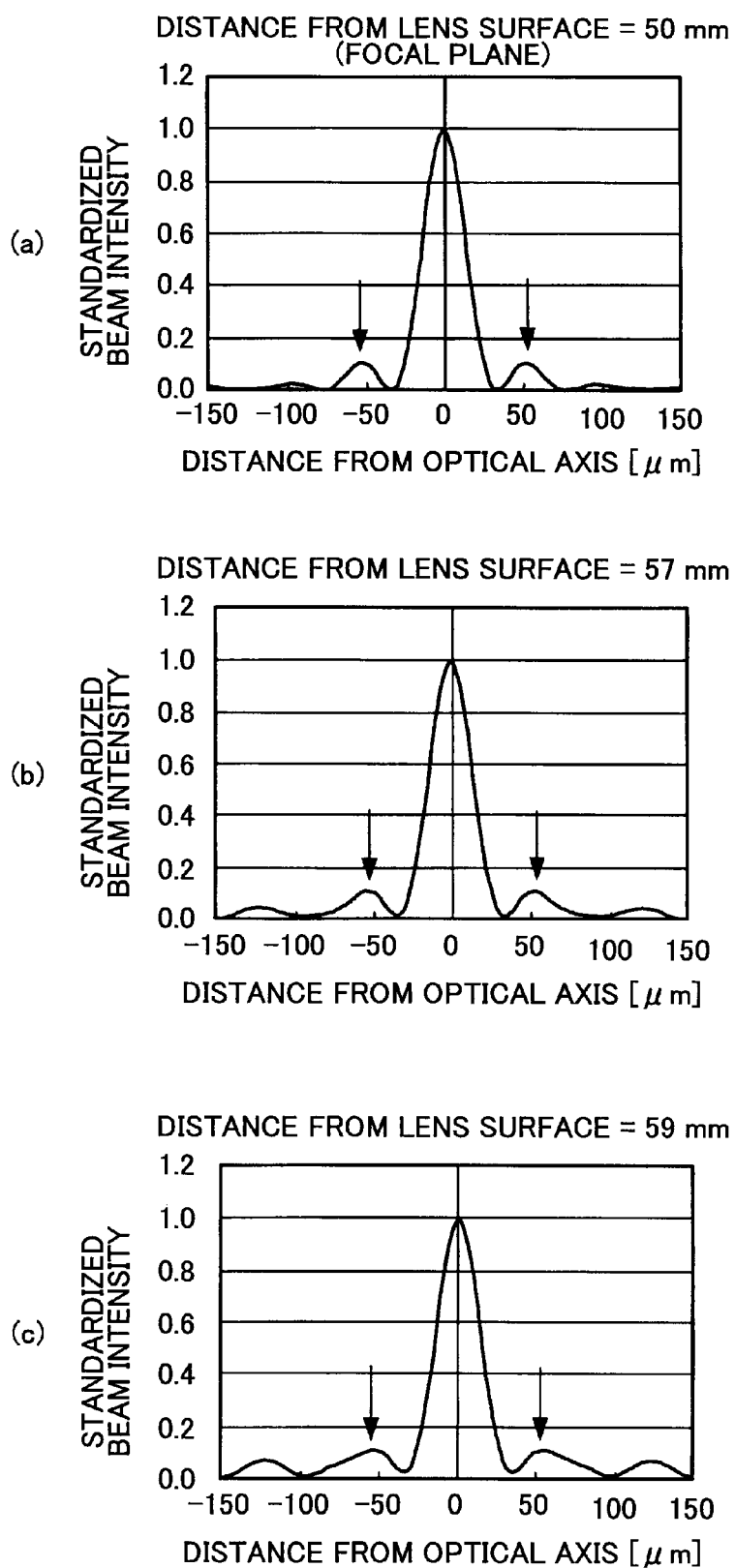
FIG. 13 contains graphs showing beam intensity profiles in the phase type optical element in the second simulation.
Figure 14:
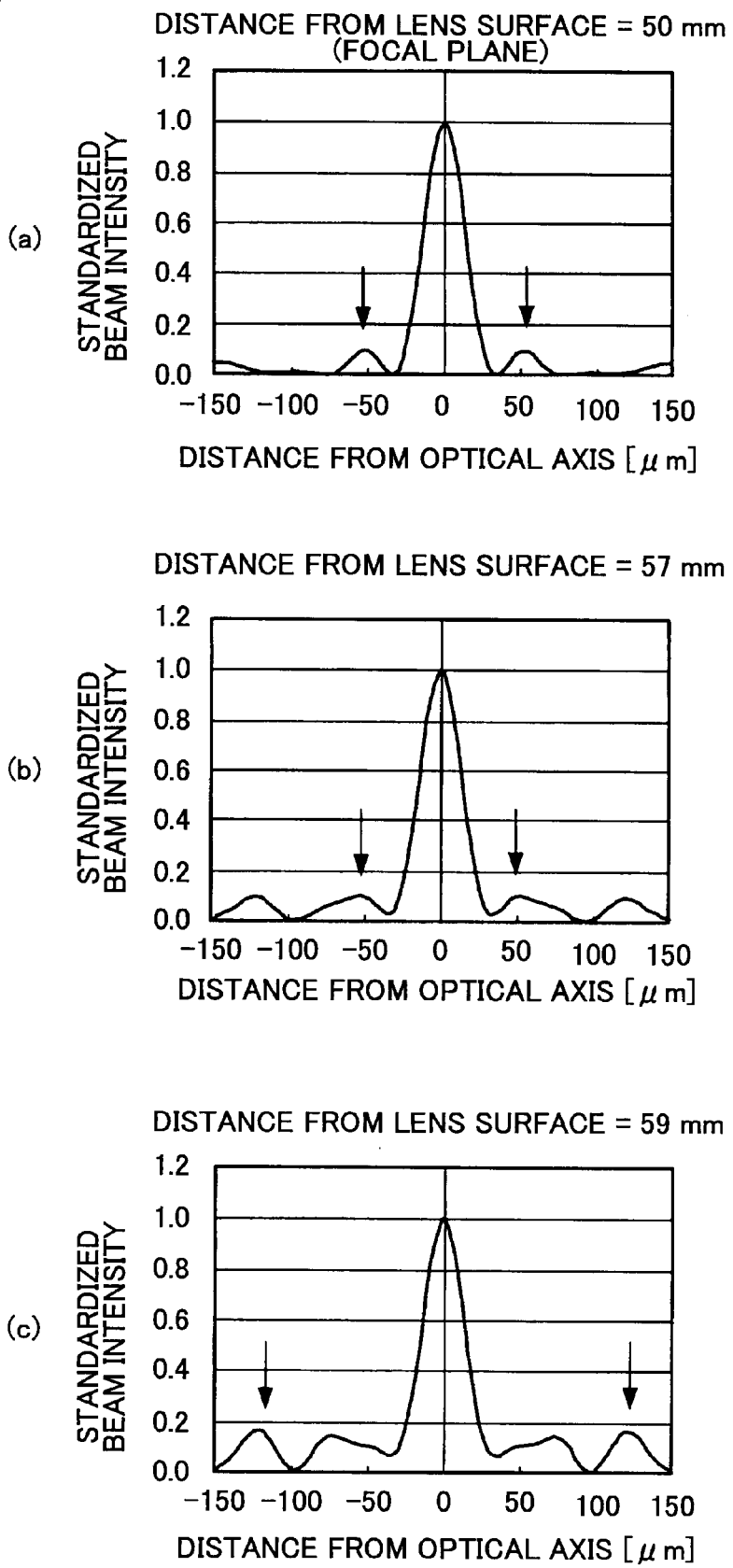
FIG. 14 contains graphs showing beam intensity profiles in the phase type optical element in the third simulation.
Figure 15:
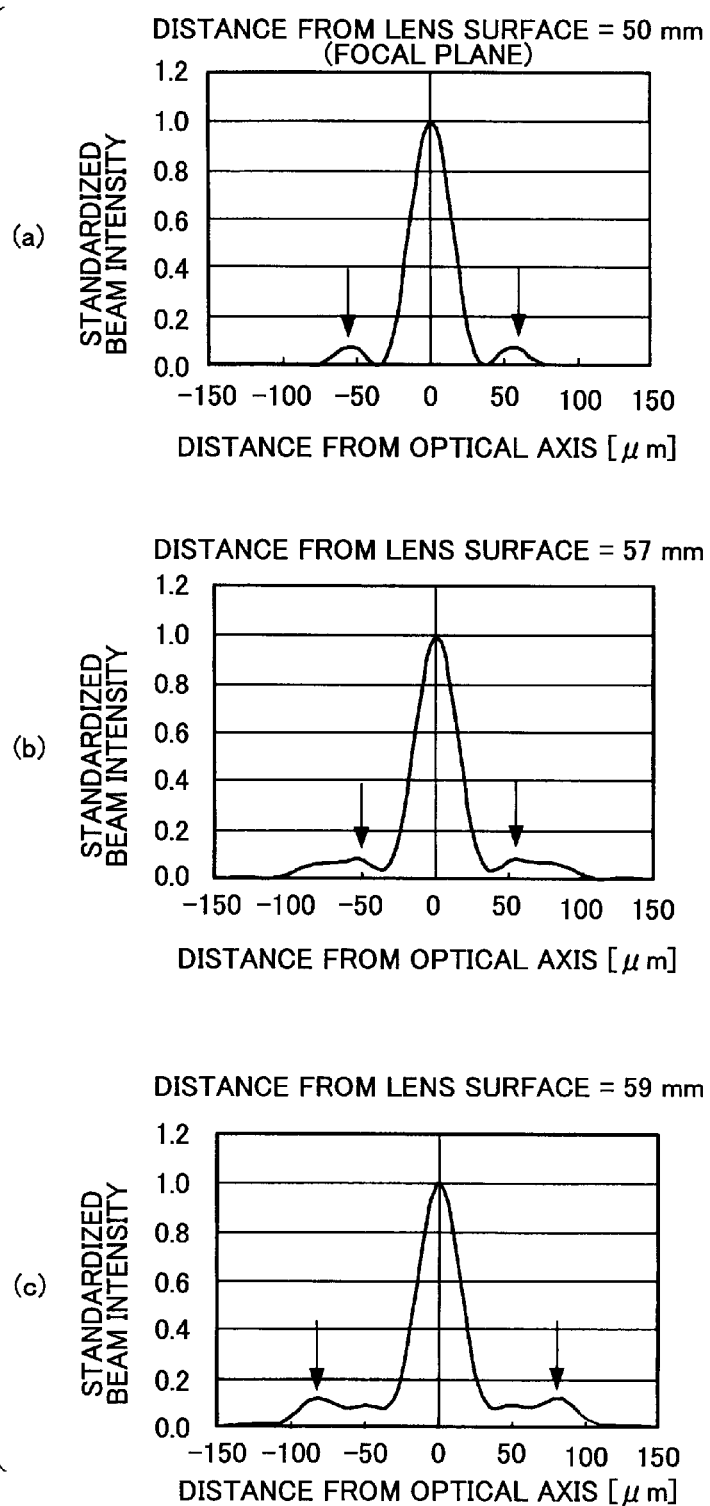
FIG. 15 contains graphs showing beam intensity profiles in the phase type optical element in the fourth simulation.
Figure 16:
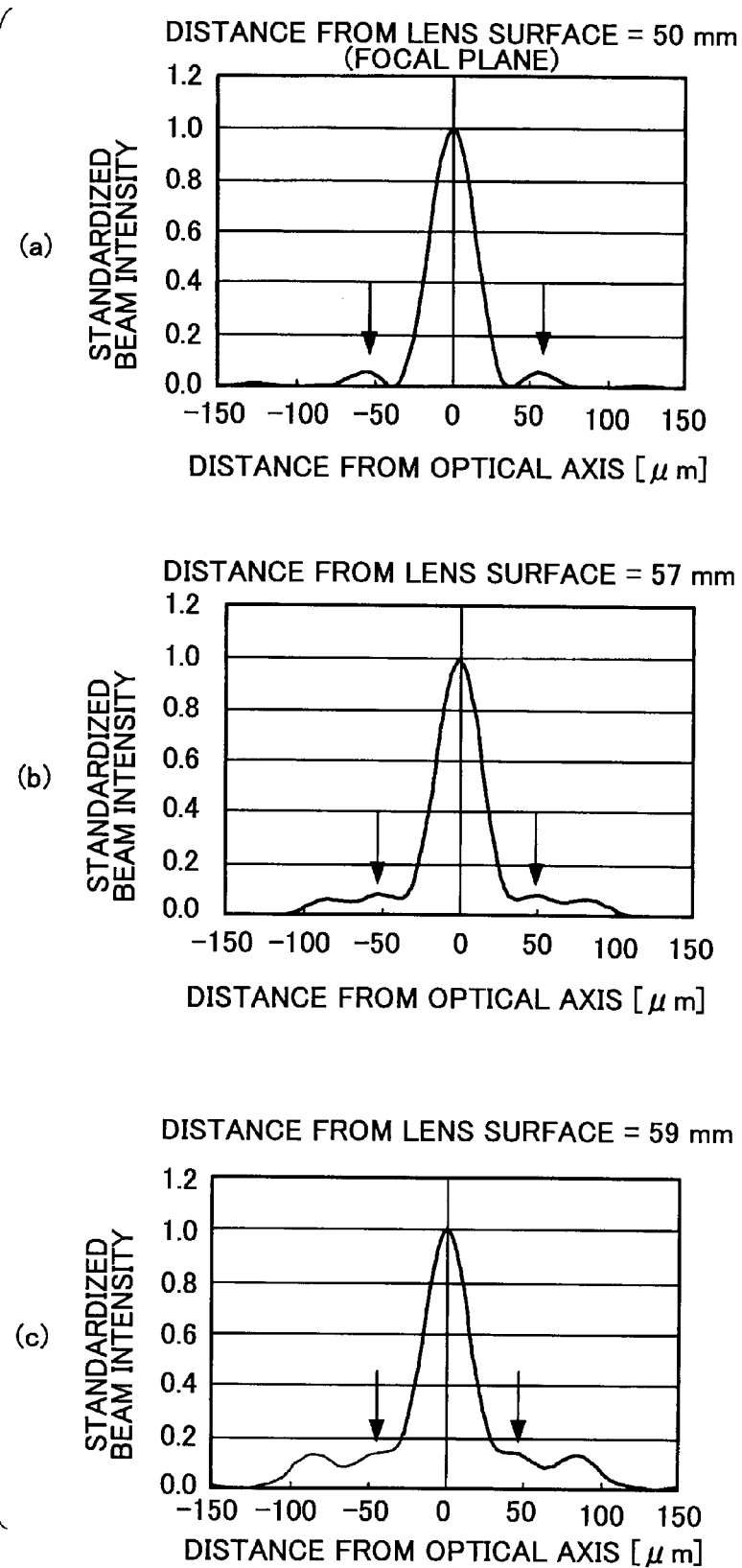
FIG. 16 contains graphs showing beam intensity profiles in the phase type optical element in the fifth simulation.
Figure 17:
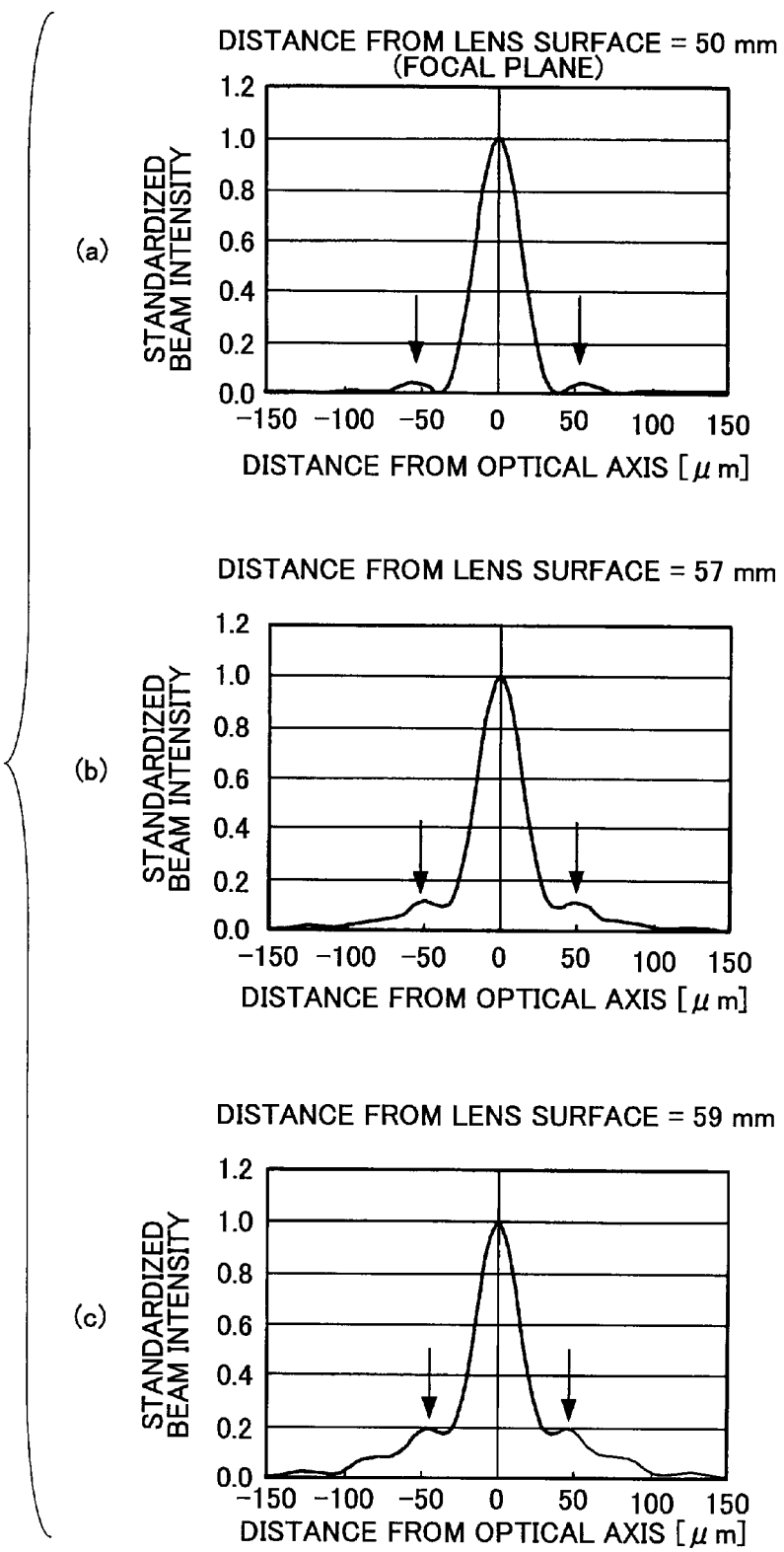
FIG. 17 contains graphs showing beam intensity profiles in the phase type optical element in the sixth simulation.
Figure 18:
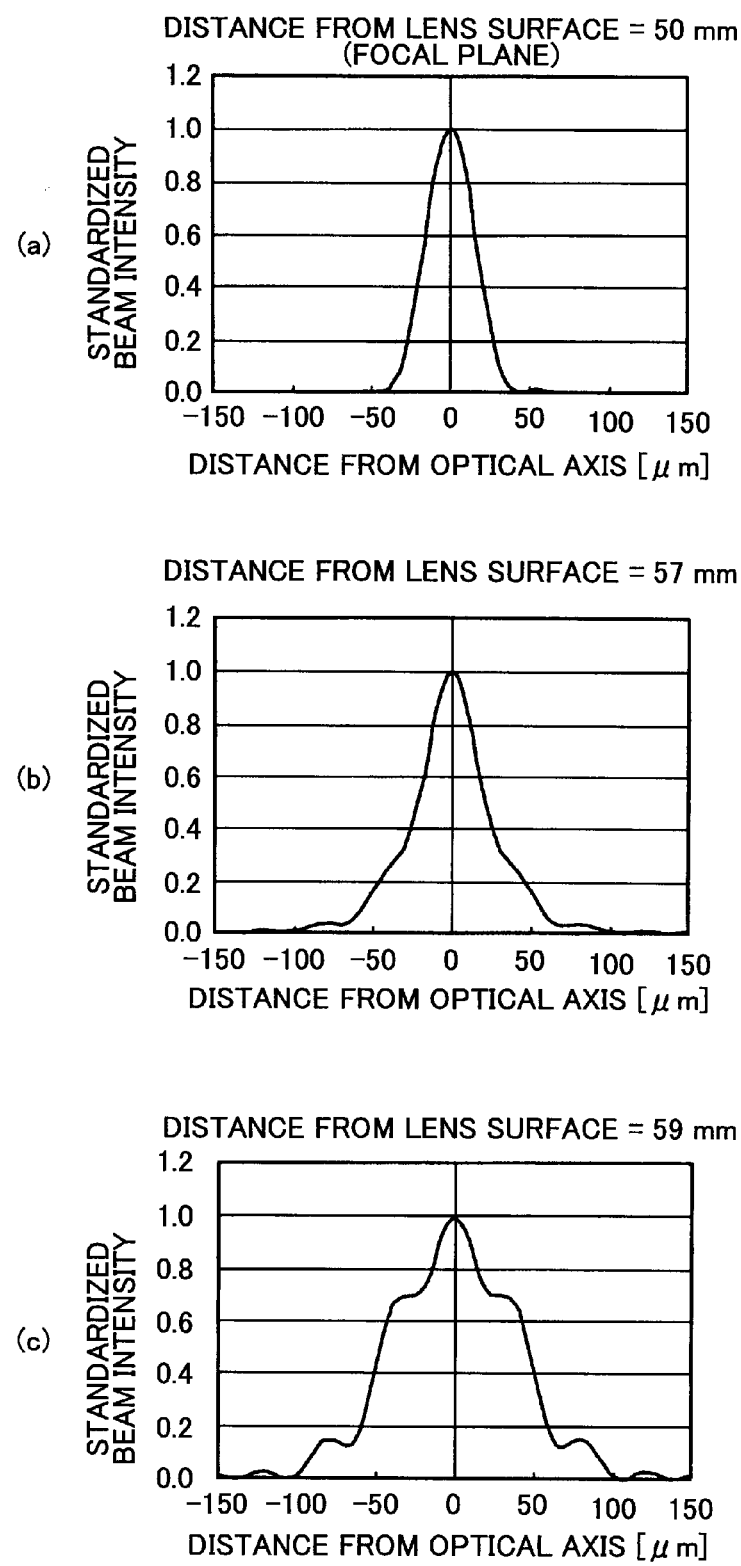
FIG. 18 contains graphs showing beam intensity profiles in the phase type optical element in the comparison example simulation.

FIG. 12 contains graphs showing beam intensity profiles in the non-presence of the phase type optical element. FIG. 13 contains graphs showing beam intensity profiles in the phase type optical element $10c_1$. FIG. 14 contains graphs showing beam intensity profiles in the phase type optical element $10c_2$. FIG. 15 contains graphs showing beam intensity profiles in the phase type optical element $10c_3$. FIG. 16 contains graphs showing beam intensity profiles in the phase type optical element $10c_4$. FIG. 17 contains graphs showing beam intensity profiles in the phase type optical element $10c_5$. FIG. 18 contains graphs showing beam intensity profiles in the phase type optical element $10d$.

FIG. 19 is a comparison table showing the simulated results of the side/main intensity ratios in the simulations shown in FIGS. 12 through 18. As shown in FIG. 19, in any one of the phase type optical elements $10c_1$ through $10c_5$, the side/main intensity ratio at the non-focal position 57 mm or 59 mm is less than that in the non-presence of the phase type optical element. In the simulation, when a connection between the side lobe laser beams and the main lobe laser beams and the peak position of the side lobe laser beams are hardly to be taken, the peak position of the side lobe laser beams is estimated from the beam intensity profile at positions before and behind in the optical axis direction.

FIG. 20 is a comparison table showing the peak intensity ratio of the main lobe laser beams at the non-focal position to at the focal position in the non-presence of the phase type optical element, the phase type optical elements $10c_1$ through $10c_5$, and the phase type optical element $10d$. In FIG. 20, the peak intensity of the main lobe laser beams at positions of 57 mm and 59 mm are shown when the peak intensity of the main lobe laser beam at the position of 50 mm (focal position) is determined as "1". As shown in FIG. 20, when any one of the phase type optical elements $10c_1$ through $10c_5$ is used, the peak intensity ratio of the main lobe laser beams in the beam intensity profile at the positions of 57 mm and 59 mm (the non-focal positions) is greater than that in the non-presence of the phase type optical element. The ratio is called "the main intensity ratio of the non-focal position to the focal position".

On the other hand, the main intensity ratio of the non-focal position to the focal position when the phase type optical element $10d$ is used is less than that when the non-presence of the phase type optical element is used at the non-focal positions.

Generally, in the optical axis direction, the peak intensity of the laser beams at the non-focal position is less than that at the focal position. However, when any one of the phase type optical elements $10c_1$ through $10c_5$ is used, the decrease of the peak intensity of the laser beams at the non-focal position can be restrained. In a case where the decrease of the peak intensity of the laser beams at the non-focal position is restrained, when the phase type optical element of the present embodiment is used, for example, in an image forming apparatus, even if the position of a photoconductor body is changed with the passage of time, the decrease of the light energy amount for exposing the photoconductor body can be restrained. Therefore, the change of a dot size caused by the change of the exposing energy can be decreased and a high quality image can be output. In addition, when the phase type optical element of the present embodiment is used in an optical pickup device, the S/N ratio can be increased by restraining the generation of noise. Further, when the phase type optical element of the present embodiment is used in a laser processing device, an unevenness surface in the process caused by the surface roughness of an object to be processed can be restrained.

Each of the phase type optical elements $10c_1$ through $10c_5$ which are used as the phase type optical element $10c$ gives a two-dimensional phase distribution to the laser beams. The phase distribution of the phase type optical element is determined by a height distribution and a refractive index distribution of the phase type optical element. When it is assumed that the refractive index of the phase type optical element is constant and the refractive index distribution does not exist, the phase distribution of the phase type optical element corresponds to the height distribution. In the following, the phase distribution of the phase type optical element is described without the refractive index distribution. However, the phase type optical elements $10c_1$ through $10c_5$ can be realized with the refractive index distribution.

The two-dimensional phase distribution has three types.

Type 1: Phase Distribution corresponding to Aspherical Lens

Type 2: Phase Distribution including Discontinuous Phase Distribution

Type 3: Phase Distribution in which Type 1 or Type 2 is formed by binary values or multiple values The phase distribution in Type 1 is a height distribution in the optical axis direction from a reference surface orthogonal to the optical axis. The phase distribution in Type 2 includes a region where a phase distribution is discontinuously (largely) changed in a phase distribution of laser beams transmitted through a phase type optical element. The phase distribution in Type 3 is formed by approximating Type 1 or Type 2 to two-height steps or multiple-height steps.

Figure 21:
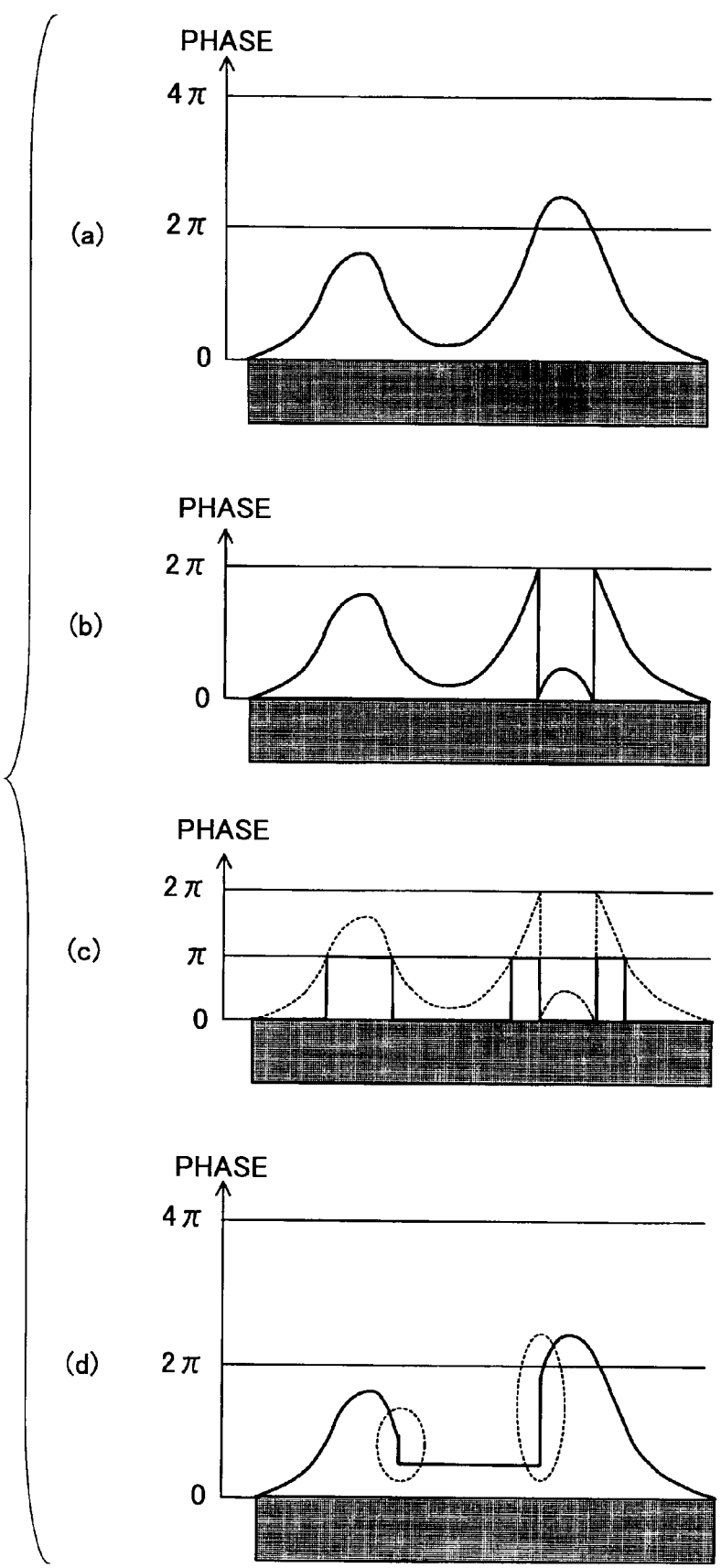
FIG. 21 contains schematic diagrams showing phase distributions of the phase type optical element according to the first embodiment of the present invention.

FIG. 21 contains schematic diagrams showing phase distributions of the phase type optical element $10c$. In FIG. 21, (a) shows a phase distribution corresponding to an aspherical lens (Type 1), (b) shows a phase distribution in which a phase that $2\pi$ is multiplied by an integer is removed from the phase distribution shown in FIG. 21(a) and is equivalent to that shown in FIG. 21(a), (c) shows a phase distribution in which the phase distribution shown in FIG. 21(b) is expressed by binary values of a "0" phase and a "$\pi$" phase (Type 3), and (d)

shows a phase distribution (Type 2) including the regions where the phase is discontinuously changed (the regions are surrounded by dotted lines).

The phase type optical element 10c can have a continuous phase distribution; however, it is difficult to form the continuous phase distribution in the manufacturing process and it is likely to have an error in the manufacturing process. Therefore, it is preferable that the phase distribution of the phase type optical element 10c be formed of two-step heights (phases) or multiple-step heights (phases); with this, the phase type optical element 10c can be easily formed with decreasing the error in the manufacturing process. When the phase type optical element 10c is formed of the two-step phases, it is suitable that the phases are set as "0" and "$\pi$". When the phase type optical element 10c is formed of the multiple-step phases, the degree of freedom in designing can be increased.

In the phase type optical element 10c, the depth margin can be widened by determining so that all regions are the phase modulation region. However, the high-order side lobe laser beams are likely to occur. As described above, the high-order side lobe laser beams degrade the performance of the optical device. Therefore, in the present embodiment, the non-modulation region is provided where the laser beams transmitted through the aperture 10b are transmitted as they are without being modulated. With this, the generation of the high-order side lobe laser beams may be prevented. The phase modulation region is preferably 50% or less than the area of the opening part of the aperture 10b, and more preferably, 30% or less.

Figure 22:
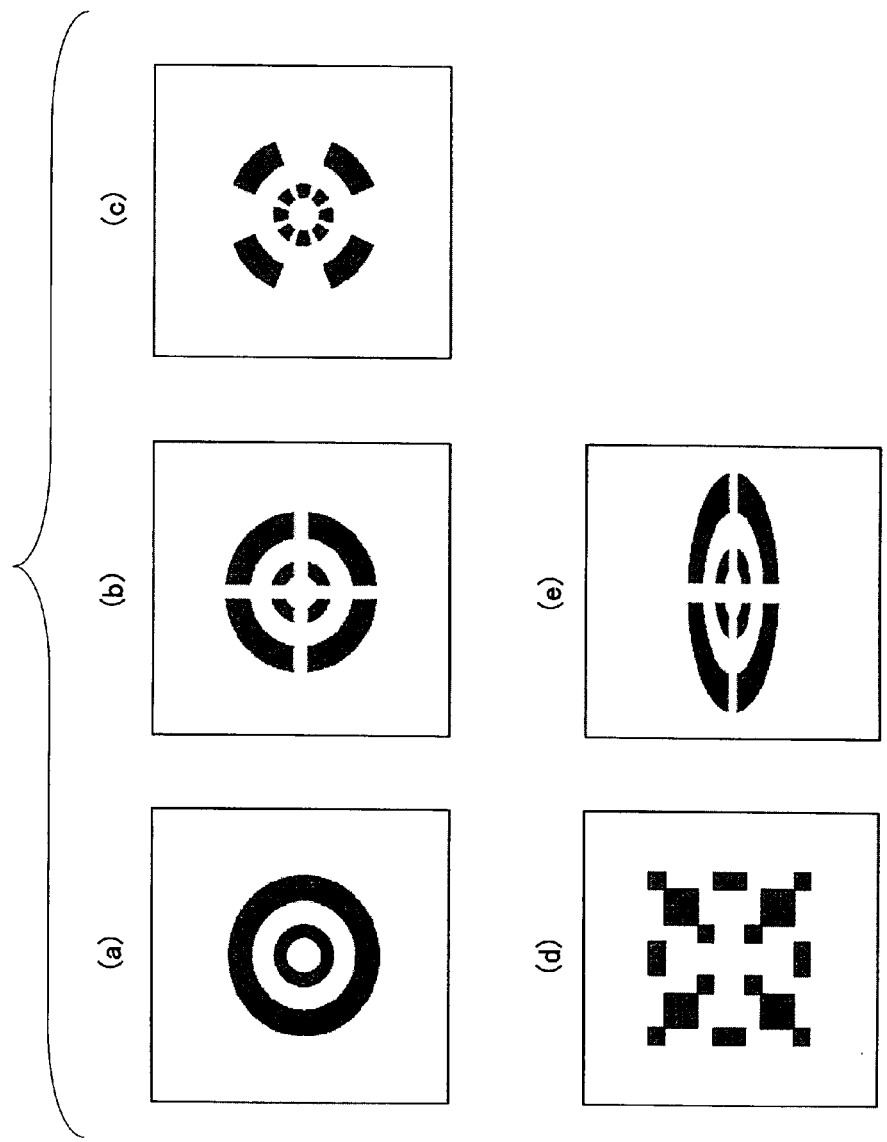
FIG. 22 is a diagram showing phase modulation regions in the phase distributions of the phase type optical element according to the first embodiment of the present invention.

In a desirable phase distribution of the phase type optical element 10c, a phase modulation region having a symmetric shape is formed at least in a part of the phase distribution as the center of the phase type optical element 10c is the reference. The symmetry includes point symmetry (including rotational symmetry) and line symmetry for a center line. FIG. 22 is a diagram showing phase modulation regions in the phase distributions of the phase type optical element 10c. In FIG. 22, (a) through (c) show point symmetry shapes of the phase modulation regions for the center of the phase type optical element 10c, and (d) shows a phase modulation region having a symmetry shape formed of pixels. The phase modulation regions shown in FIG. 22($a$) through ($d$) can be the line symmetry for a line passing through the center. FIG. 22($e$) shows a phase modulation region having a line symmetry shape for the vertical/horizontal center line. As shown in FIG. 22, it is most preferable that the phase modulation region be the point symmetry or the line symmetry for the center.

Figure 23:
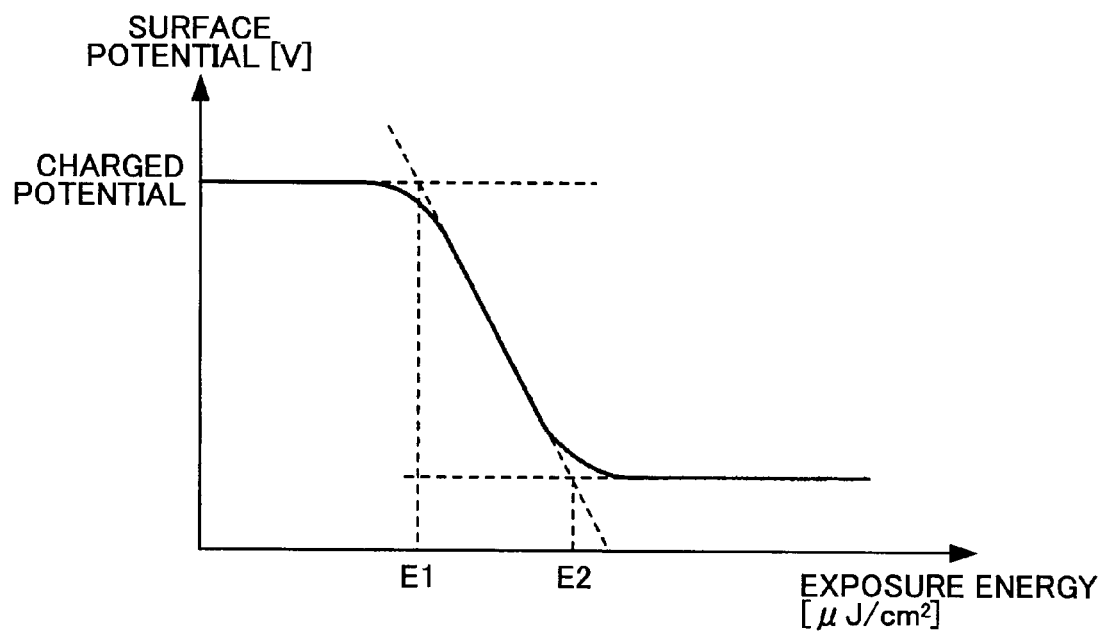
FIG. 23 is a diagram showing a relationship between the amount of laser beams irradiating onto a photoconductor body and the attenuating amount of the surface potential on the photoconductor body.

Next, a case is described in which the light source unit 10 is used in a laser beam scanning device of an image forming apparatus. In the image forming apparatus, laser beams are irradiated on a photoconductor body which is charged beforehand, surface potential of the photoconductor body is attenuated, a potential distribution is generated on the photoconductor body, and the potential distribution is developed by toner. FIG. 23 is a diagram showing a relationship between the amount of laser beams irradiating onto the photoconductor body and the attenuating amount of the surface potential on the photoconductor body. That is, in FIG. 23, a so-called light attenuating curve is shown, and the amount of laser beams irradiating onto the photoconductor body is shown as an exposing energy. In FIG. 23, a photoconductor body which has an inclination approximated by a straight line that is steep is called a high-$\gamma$ photoconductor body and that is gentle is called a low-$\gamma$ photoconductor body. When a high-$\gamma$ photoconductor body of "$0<E2/E1 \leq 5$" is used, the photoconductor body is hardly exposed by the side lobe laser beams. However, when a high-gradation image is desired to be obtained, the low-$\gamma$ photoconductor body is suitable. In a case where a low-$\gamma$ photoconductor body of "E2/E1>5" is used, when the side/main intensity ratio is set to 10% or less, preferably, 8% or less, the photoconductor body can be hardly exposed by the side lobe laser beams. With this, the depth margin can be widened while preventing the degradation of the image quality caused by the side lobe laser beams.

The phase type optical element 10c is designed by considering diffraction of the laser beams by the aperture 10b. Therefore, when a positional relationship between the aperture 10b and the phase type optical element 10c is displaced, the beam intensity profile at the focal position is degraded and the depth margin widening effect is decreased. Therefore, in the present embodiment, as an example, the aperture 10b and the phase type optical element 10c are unified. With this, a process to adjust the positional relationship can be simplified in the manufacturing process. In addition, the positional relationship can be maintained with the passage of time. In the manufacturing process, the aperture 10b and the phase type optical element 10c can be separately manufactured and are adhered afterward. When the aperture 10b and the phase type optical element 10c are unified on a substrate, highly precise positioning of the aperture 10b and the phase type optical element 10c can be realized and the change of the positional relationship between the aperture 10b and the phase type optical element 10c with the passage of time can be decreased.

As described above, according to the first embodiment of the present invention, the light source unit 10 includes the phase type optical element 10c for modulating the phase distribution of the laser beams emitted from the semiconductor laser LD. When the condenser lens 20 for condensing the laser beams transmitted through the phase type optical element 10c is disposed, the phase type optical element 10c has the phase distribution which makes the side/main intensity ratio at the focal position greater than that in a case where the phase type optical element is not disposed. Therefore, enlarging the beam spot diameter (enlarging the main lobe laser beams) at the non-focal position of the condenser lens 20 in the optical axis can be restrained.

In addition, according to the first embodiment of the present invention, the light source unit 10 can make the side/main intensity ratio less than that when the Bessel beams are used, and can make the peak intensity of the main lobe laser beams large. That is, the light use efficiency in the light source unit 10 can be greater than that in the unit using the Bessel beams.

Therefore, according to the first embodiment of the present invention, the light source unit 10 can widen the depth margin without making the beam spot diameter large in high light use efficiency when the condenser lens 20 condenses the laser beams on the focal plane.

In addition, according to the light source unit 10 of the first embodiment of the present invention, since an optical system such as a relay optical system does not need to be newly disposed, the optical system is simple and the degree of freedom in arranging components can be increased and a miniaturized light source unit can be realized with low cost.

In the first embodiment of the present invention, the phase modulation region in the phase type optical element 10c has a point symmetry shape or a line symmetry shape of a circle, a ring, or formed of pixels; however, the shape is not limited to have a symmetry shape.

In addition, in the first embodiment of the present invention, the opening part of the aperture 10b has a circle shape; however, the shape is not limited to the circle shape and can be an elliptic shape or a rectangular shape including a square. In a case where the phase type optical element does not exist, when the opening part of the aperture is a rectangular shape having corners, the peak intensity of the side lobe laser beams is greater than that in a case where the opening part has no corners such as a circle-shaped opening and an elliptic-shaped opening. When the peak intensity of the side lobe laser beams is too great, bad influence on image quality occurs; therefore, the peak intensity of the side lobe laser beams must be controlled. Since the aperture having no corners can control the amount of the side lobe laser beams, when the phase type optical element is used with the aperture having no corners, the amount of the side lobe laser beams can be controlled and the depth margin widening effect can be increased. Therefore, when the phase type optical element $10c$ is used, in the aperture having no corners, the peak intensity of the side lobe laser beams, which is increased by the phase type optical element $10c$, can be less than that in the aperture having corners and the depth margin can be widened.

In addition, in the present embodiment, the laser beams input to the non-modulation region of the phase type optical element $10c$ are transmitted through the phase type optical element $10c$ as they are. However, for example, an optical phase difference of $2\pi$ can be given to the laser beams transmitted through the non-modulation region by designing the height of the non-modulation region.

In addition, in the present embodiment, the aperture $10b$ is disposed at the $-X$ side of the phase type optical element $10c$. However, the aperture $10b$ can be disposed at the $+X$ side of the phase type optical element $10c$.

In addition, in the present embodiment, a structure having equivalent to the function of the phase type optical element $10c$ can be formed on the surface of the coupling lens $10a$ or the surface of the condenser lens $20$ without using the phase type optical element $10c$.

In addition, in the present embodiment, when the laser beams output from the light source unit $10$ are not needed to be almost parallel laser beams, the coupling lens $10a$ is not needed.

[Image Forming Apparatus]

Figure 24:
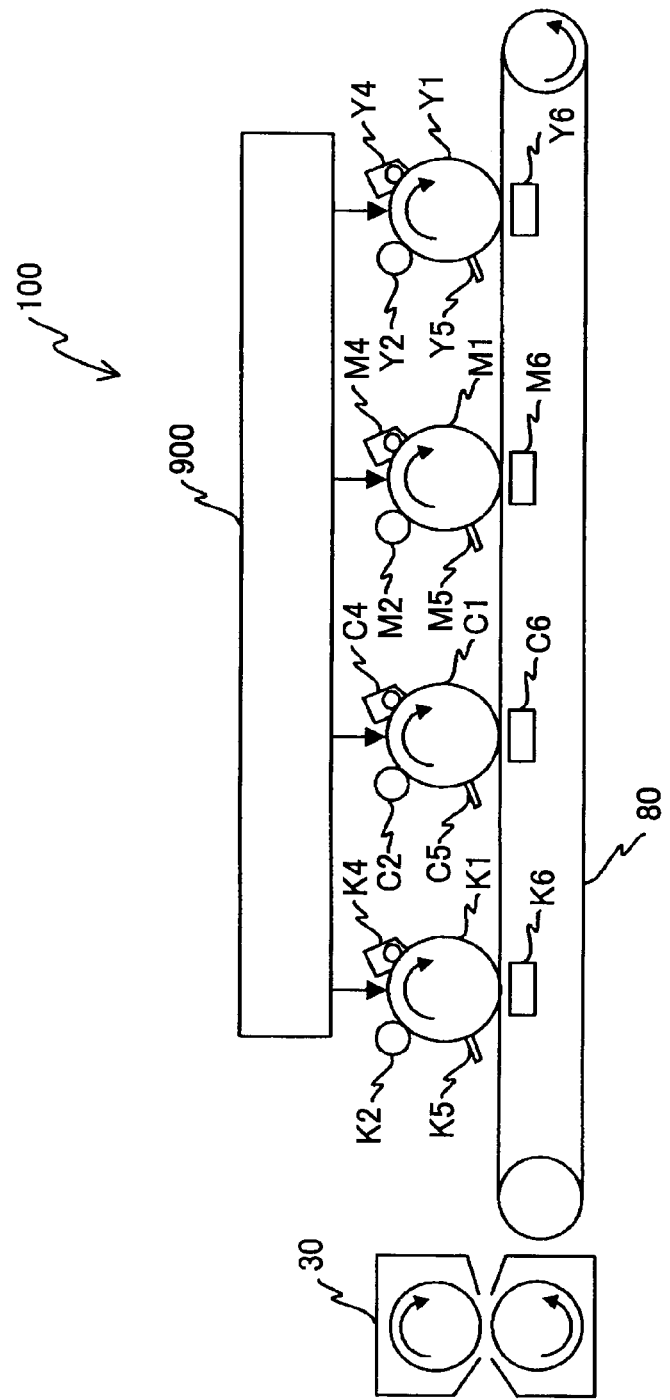
FIG. 24 is a schematic diagram showing a part of a tandem type color image forming apparatus according to the first embodiment of the present invention.

Next, referring to FIG. 24, a tandem type color image forming apparatus 100 having plural photoconductor drums is described. The tandem type color image forming apparatus 100 includes the light source unit 10.

FIG. 24 is a schematic diagram showing a part of the tandem type color image forming apparatus 100 according to the first embodiment of the present invention. The tandem type color image forming apparatus 100 includes a photoconductor drum K1, a charger K2, a developer K4, a cleaning unit K5, and a transfer charger K6 for black (K); a photoconductor drum C1, a charger C2, a developer C4, a cleaning unit C5, and a transfer charger C6 for cyan (C); a photoconductor drum M1, a charger M2, a developer M4, a cleaning unit M5, and a transfer charger M6 for magenta (M); a photoconductor drum Y1, a charger Y2, a developer Y4, a cleaning unit Y5, and a transfer charger Y6 for yellow (Y); a laser beam scanning device 900, a transfer belt 80, and a fixing unit 30.

In the following, when a prefix or a suffix is not attached to a reference number of an element, the reference number represents the set of elements. For example, the photoconductor drum 1 represents the photoconductor drums K1, C1, M1, and Y1.

The photoconductor drum 1 rotates in the arrow direction shown in FIG. 24, and the charger 2, the developer 4, the transfer charger 6, and the cleaning unit 5 are disposed in this order around the photoconductor drum 1. The charger 2 uniformly charges the surface of the photoconductor drum 1. The laser beam scanning device 900 irradiates laser beams onto the surface of the photoconductor drum 1 which surface is charged by the charger 2, and an electrostatic latent image is formed on the photoconductor drum 1. A toner image is formed on the surface of the photoconductor drum 1 by developing the electrostatic latent image by the developer 4. The toner image is transferred on a sheet (recording medium) by the transfer charger 6, and the toner image is fixed on the sheet by the fixing unit 30.

In the tandem type color image forming apparatus 100, a transfer unit is formed of the transfer charger 6 and the transfer belt 80.

[Laser Beam Scanning Device]

Figure 25:
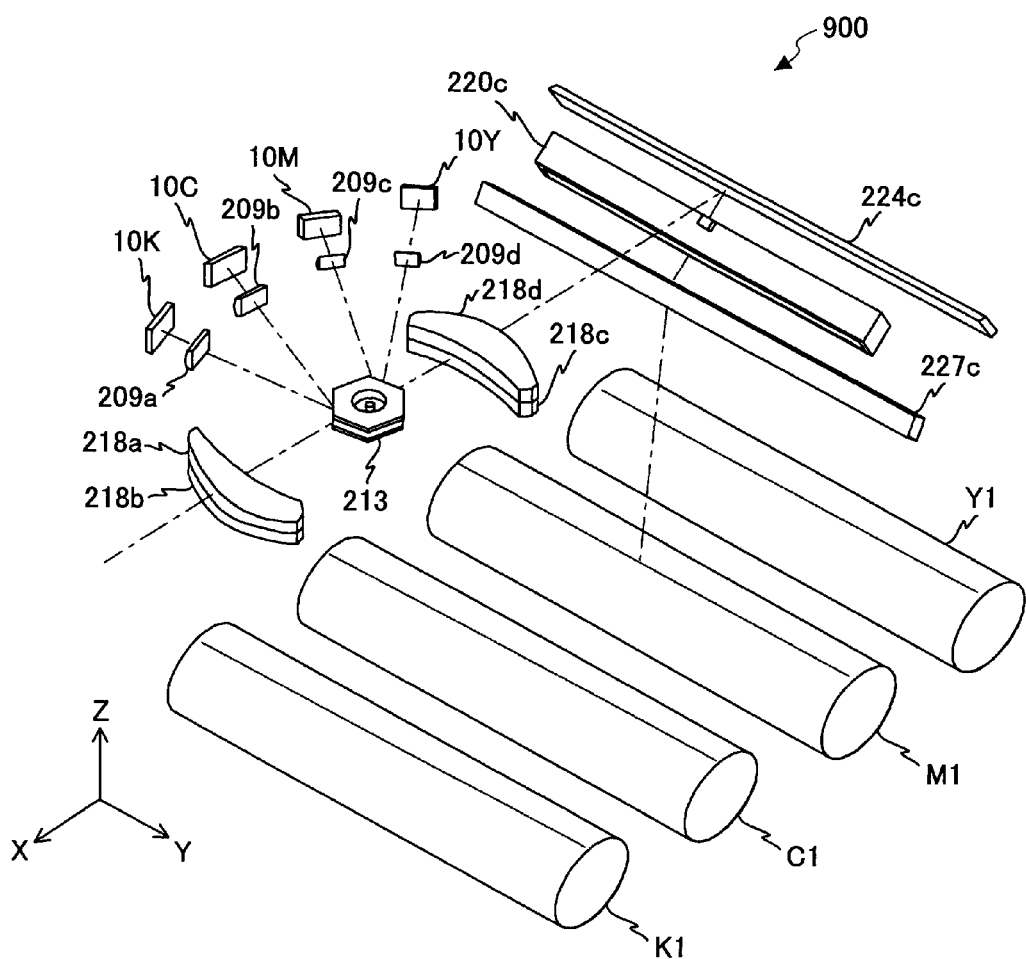
FIG. 25 is a perspective view of a part of a laser beam scanning device according to the first embodiment of the present invention.
Figure 26:
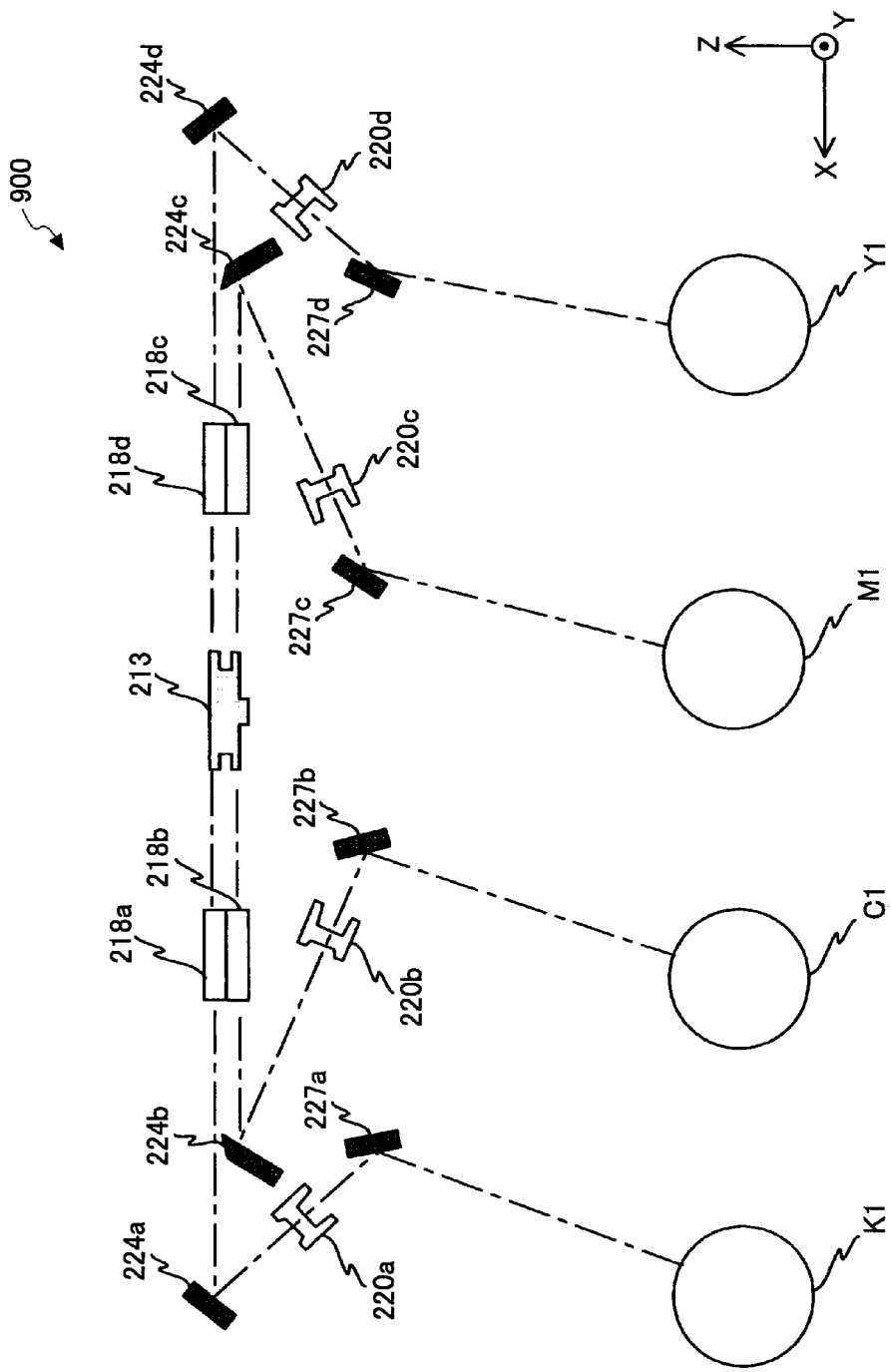
FIG. 26 is a schematic diagram of a part of the laser beam scanning device shown in FIG. 25.

Next, referring to FIGS. 25 and 26, the laser beam scanning device 900 is described in detail. FIG. 25 is a perspective view of a part of the laser beam scanning device 900. FIG. 26 is a schematic diagram of a part of the laser beam scanning device 900.

As shown in FIGS. 25 and 26, the laser beam scanning device 900 includes four light source units 10K, 10C, 10M, and 10Y; four cylindrical lenses $209a$, $209b$, $209c$, and $209d$; a polygon mirror 213, four fθ lenses $218a$, $218b$, $218c$, and $218d$; eight folding mirrors $224a$, $224b$, $224c$, $224d$, $227a$, $227b$, $227c$, and $227d$; four toroidal lenses $220a$, $220b$, $220c$, and $220d$, and a controller (not shown). In FIG. 25, only the toroidal lens $220c$, the folding mirrors $224c$ and $227c$ are shown.

Each of the four light source units 10K, 10C, 10M, and 10Y has a structure equivalent to the structure of the light source unit 10 shown in FIG. 1.

The light source unit 10K irradiates laser beams modulated corresponding to black image information (the laser beams may be referred to as black laser beams). The light source unit 10C irradiates laser beams modulated corresponding to cyan image information (the laser beams may be referred to as cyan laser beams). The light source unit 10M irradiates laser beams modulated corresponding to magenta image information (the laser beams may be referred to as magenta laser beams). The light source unit 10Y irradiates laser beams modulated corresponding to yellow image information (the laser beams may be referred to as yellow laser beams).

In the cylindrical lens 209, one surface is a plane and the other surface has a curvature common in the sub scanning direction.

The cylindrical lens $209a$, the fθ lens $218a$, the folding mirror $224a$, the toroidal lens $220a$, and the folding mirror $227a$ correspond to the black laser beams.

The cylindrical lens $209b$, the fθ lens $218b$, the folding mirror $224b$, the toroidal lens $220b$, and the folding mirror $227b$ correspond to the cyan laser beams.

The cylindrical lens $209c$, the fθ lens $218c$, the folding mirror $224c$, the toroidal lens $220c$, and the folding mirror $227c$ correspond to the magenta laser beams.

The cylindrical lens $209d$, the fθ lens $218d$, the folding mirror $224d$, the toroidal lens $220d$, and the folding mirror $227d$ correspond to the yellow laser beams.

The laser beams irradiated from the light source unit 10 converge on the deflection surface of the polygon mirror 213 in the sub scanning direction to form a line shape by the cylindrical lens 209. The deflecting point in the polygon mirror 213 and the condensing point on the surface of the photoconductor drum 1 are conjugated in the sub scanning direction.

The polygon mirror 213 is formed of a two-step structure and each step has a six-surface mirror. The black and yellow laser beams from the corresponding cylindrical lenses $209a$ and $209d$ are deflected at the first step six-surface mirror, and the cyan and magenta laser beams from the corresponding cylindrical lenses 209b and 209c are deflected at the second step six-surface mirror. That is, all the laser beams are deflected by the single polygon mirror 213. The polygon mirror 213 has a groove at a position that is not used for deflection so that windage loss is reduced and the thickness of the one step is approximately 2 mm.

The fθ lens 218 has a non-arc-shaped surface so that a laser beam spot moves at a constant velocity in the main scanning direction on the surface of the photoconductor drum 1 corresponding to the rotation of the polygon mirror 213. The fθ lenses 218a and 218b are disposed at one side (+X side) of the polygon mirror 213 and the fθ lenses 218c and 218d are disposed at the other side (−X side) of the polygon mirror 213. The fθ lenses 218a and 218b are stacked in the direction corresponding to the sub scanning direction (Z axis direction) and also the fθ lenses 218c and 218d are stacked in the direction corresponding to the sub scanning direction. A tangle error of the deflection surface of the polygon mirror 213 is corrected by the cylindrical lens 209, the fθ lens 218, and the toroidal lens 220.

The black laser beams from the fθ lens 218a forms a laser beam spot on the surface of the photoconductor drum K1 via the folding mirror 224a, the toroidal lens 220a, and the folding mirror 227a.

The cyan laser beams from the fθ lens 218b forms a laser beam spot on the surface of the photoconductor drum C1 via the folding mirror 224b, the toroidal lens 220b, and the folding mirror 227b.

The magenta laser beams from the fθ lens 218c forms a laser beam spot on the surface of the photoconductor drum M1 via the folding mirror 224c, the toroidal lens 220c, and the folding mirror 227c.

The yellow laser beams from the fθ lens 218d forms a laser beam spot on the surface of the photoconductor drum Y1 via the folding mirror 224d, the toroidal lens 220d, and the folding mirror 227d.

The folding mirrors 224 and 227 are disposed so that an optical path length from the polygon mirror 213 to each of the photoconductor drums K1, C1, M1, and Y1 is the same and the input position and the input angle of the laser beams onto the surface of each of the photoconductor drums K1, C1, M1, and Y1 are the same.

In addition, the laser beam scanning device 900 can simultaneously scan on the surfaces of the four photoconductor drums K1, C1, M1, and Y1.

In the laser beam scanning device 900, since a long line-shaped image is formed on the polygon mirror 213 in the main scanning direction, the optical magnification is different between the directions corresponding to the main scanning direction and the sub scanning direction. Therefore, the widths of the aperture 10b (refer to FIG. 1) in the light source unit 10 must be different between the directions corresponding to the main scanning direction and the sub scanning direction. That is, an elliptic aperture or a rectangular aperture is used as the aperture 10b. In addition, in the phase type optical element 10c of the light source unit 10, the cross-sectional shapes passing through the center of the phase type optical element 10c are different between the directions corresponding to the main scanning direction and the sub scanning direction. In this, the center of the phase type optical element 10c is the center of the laser beams inputting to the phase type optical element 10c.

In the laser beam scanning device 900 of the present invention, the polygon mirror 213 forms a laser beam deflecting unit; and the fθ lens 218, the folding mirrors 224 and 227, and the toroidal lens 220 forms a scanning optical system. The fθ lens 218 corresponds to the condenser lens 20 shown in FIG. 1.

As described above, according to the laser beam scanning device 900 in the first embodiment of the present invention, since the plural light source units 10K, 10C, 10M, and 10Y equivalent to the light source unit 10 shown in FIG. 1 are provided, the depth margin of the laser beams can be widened on the surface of the photoconductor drum 1 and the increase of the beam spot diameter caused by an environmental change can be restrained. Therefore, the laser beams can be precisely and stably scanned on the surface of the photoconductor drum 1.

In addition, according to the tandem type color image forming apparatus 100 of the first embodiment of the present invention, since the laser beam scanning device 900 is provided, a high-quality image can be stably formed.

In addition, according to the tandem type color image forming apparatus 100 of the first embodiment of the present invention, since the beam spot diameter on the surface of the photoconductor drum 1 can be stable, one of the plural process control conditions can be stable. Therefore, the number of times of the process control can be decreased and power saving can be realized. That is, an environmental burden can be decreased.

In the first embodiment of the present invention, the tandem type color image forming apparatus 100 is described. However, the laser beam scanning device 900 including the light source unit 10 can be used in a color image forming apparatus other than the tandem type and a single color image forming apparatus.

In the present embodiment, one light source unit 10 is used for one color; however, plural light source units 10 can be used for one color, in this case, the image forming velocity can be higher.

[Optical Pickup Device]

Figure 27:
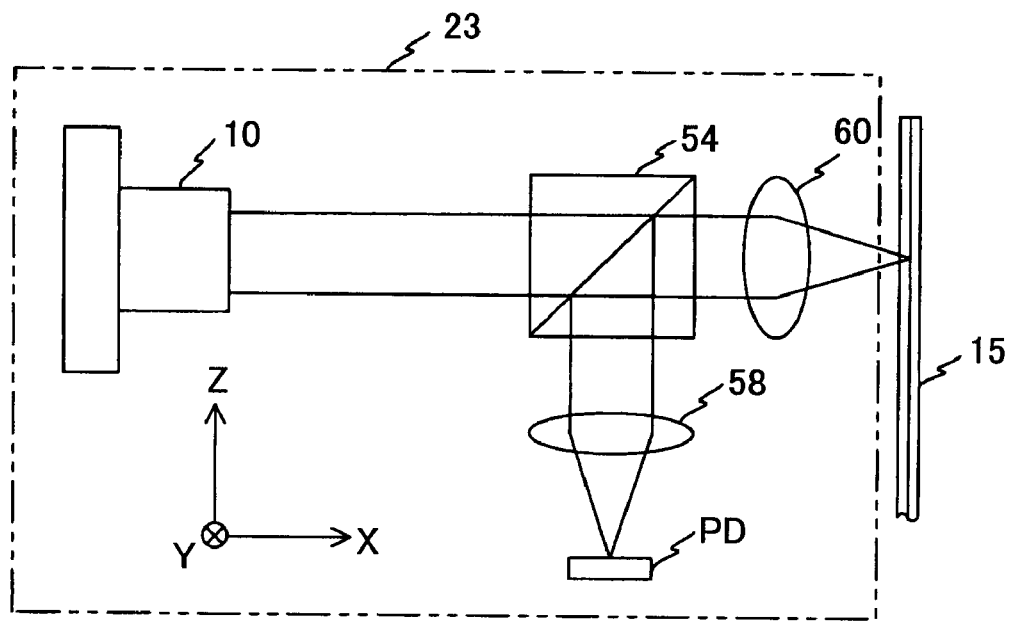
FIG. 27 is a schematic diagram showing an optical pickup device according to the first embodiment of the present invention.

Next, referring to FIG. 27, an optical pickup device 23 according to the first embodiment of the present invention is described. FIG. 27 is a schematic diagram showing the optical pickup device 23. In FIG. 27, in addition to the optical pickup device 23, an optical disk 15 is shown. The optical pickup device 23 irradiates a laser beam onto a record layer of the optical disk 15 and receives light reflected form the optical disk 15.

As shown in FIG. 27, the optical pickup device 23 includes the light source unit 10, a beam splitter 54, an objective lens 60, a condenser lens 58, an optical receiver PD, and a driving system (not shown) for driving the objective lens 60.

The light source unit 10 irradiates laser beams having a wavelength corresponding onto the optical disk 15. In the present embodiment, the maximum intensity output direction of the laser beams irradiated from the light source unit 10 is the +X direction.

The beam splitter 54 is disposed at the +X side of the light source unit 10 and transmits the laser beams from the light source unit 10 as they are and reflects the light reflected from the optical disk 15 in the −Z direction. The objective lens 60 is disposed at the +X side of the beam splitter 54 and condenses the laser beams transmitted through the beam splitter 54 on the record layer of the optical disk 15.

The condenser lens 58 is disposed at the −Z side of the beam splitter 54 and condenses the light reflected by the beam splitter 54 in the −Z direction on the light receiving surface of the optical receiver PD. The light reflected by the beam splitter 54 is light returned from the optical disk 15. Similar to in a general optical disk device, the optical receiver PD includes plural light receiving elements for outputting signals including wobble signal information, reproduction data information, servo information (focus error information and track error information), and so on. Each of the light receiving elements generates a signal corresponding to the received amount of information by photoelectric conversion.

The driving system includes a focusing actuator which finely drives the objective lens 60 in the focusing direction (the optical axis direction of the objective lens 60), and a tracking actuator which finely drives the objective lens 60 in the tracking direction (the direction orthogonal to the tangent direction of tracks of the optical disk 15).

Next, operations of the optical pickup device 23 are simply described. The laser beams irradiated from the light source unit 10 are transmitted through the beam splitter 54 and are condensed onto a record surface of the optical disk 15 via the objective lens 60 as a fine spot. The light reflected (light returned) from the record surface of the optical disk 15 is made to be almost parallel light by the objective lens 60 and is input to the beam splitter 54. The light reflected by the beam splitter 54 in the −Z direction is received by the optical receiver PD via the condenser lens 58.

In the optical pickup device 23 according to the present embodiment, an optical system is formed of the beam splitter 54, the objective lens 60, and the condenser lens 58. The optical receiver PD forms a light detection system. The objective lens 60 corresponds to the condenser lens 20 shown in FIG. 1.

As described above, since the optical pickup device 23 includes the light source unit 10, the depth margin of the laser beams can be widened at the record layer of the optical disk 15. Therefore, the laser beams can be stably and precisely irradiated on the optical disk 15.

[Laser Processing Device]

Figure 28:
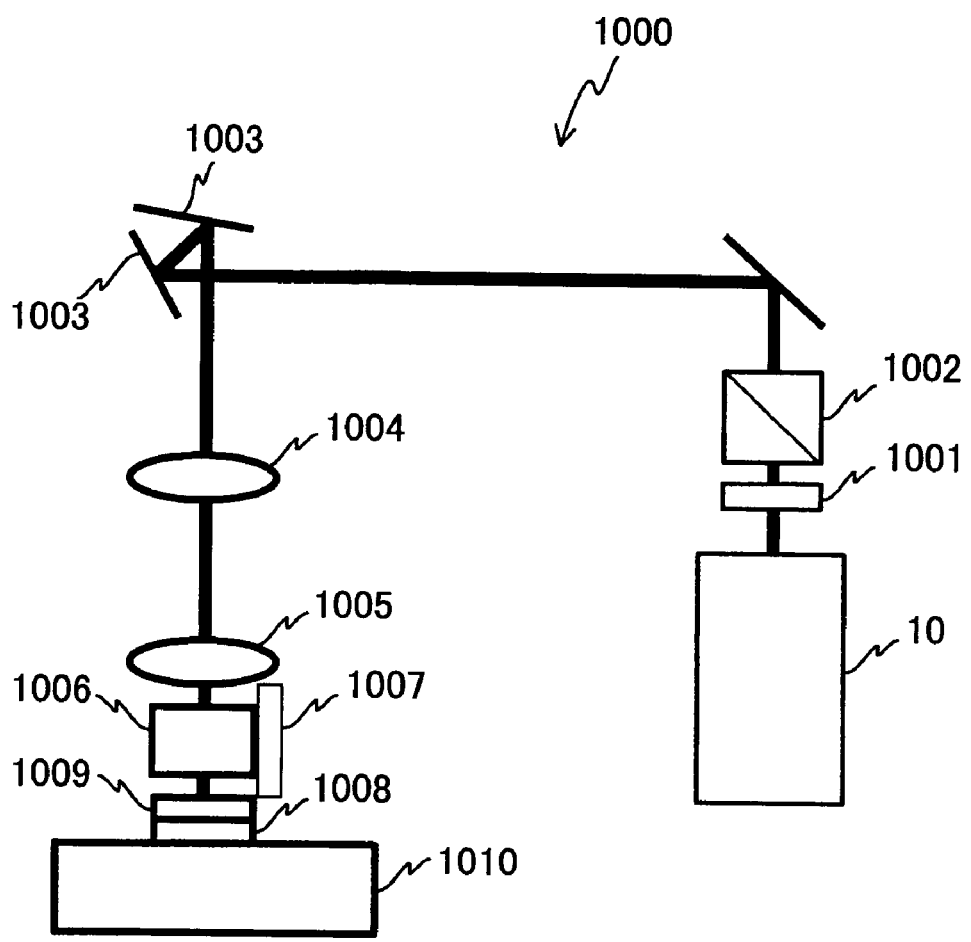
FIG. 28 is a schematic diagram showing a laser processing device according to the first embodiment of the present invention.
Figure 30:
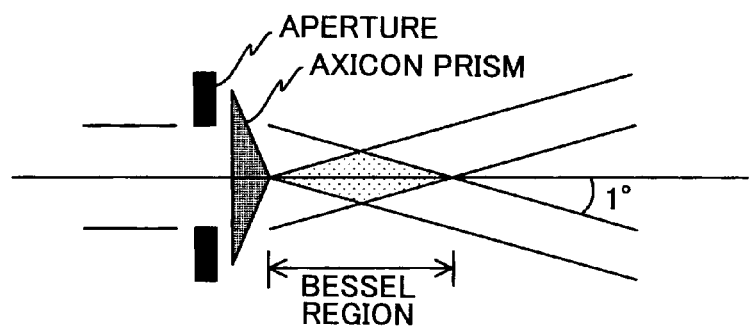
FIG. 30 is a diagram showing a part of an optical system which generates the Bessel beams by using an axicon prism.

Next, referring to FIG. 28, a laser processing device 1000 according to the first embodiment of the present invention is described. FIG. 28 is a schematic diagram showing the laser processing device 1000. The laser processing device 1000 uses a light hardening method.

In the light hardening method, laser beams are condensed on a light hardening material 1009, and the light hardening material 1009 is hardened at a laser beam condensed position by a multi-photon absorbing process. When the laser beams are three-dimensionally scanned, a fine structure such as a fine grating can be formed. The laser beams are emitted from a semiconductor laser LD (not shown), for example, an Nd:YAG laser or a Ti:Sapphire laser, of the light source unit 10. The beam intensity of the laser beams is adjusted by a ½ wavelength plate 1001 and a Glan-Thompson prism 1002 and the optical path of the laser beams is changed by galvano mirrors 1003. Then the laser beams are condensed on the light hardening material 1009 on a substrate 1008 via a relay lens 1004, an image forming lens 1005, and an objective lens 1006. The condensing point of the laser beams can be moved in the direction orthogonal to the substrate 1008 by a piezo stage 1007. The substrate 1008 is fixed on a table 1010. The light hardening material 1009 can be formed into a three-dimensional structure having a fine concave-convex surface by the combination of the galvano mirrors 1003 and the piezo stage 1007. As the light hardening material, a light hardening resin and a light hardening organic and non-organic hybrid material can be used, and an optical element can be formed of the light hardening material.

Since the laser processing device 1000 includes the light source unit 10, the laser processing device 1000 can stably and precisely form a fine structure.

The light source unit 10 can be used in a laser processing device which cuts a material or forms a hole by using laser beams. In this case, even if the surface of the material to be processed is rough, cutting the material or forming the hole can be stably and precisely executed.

As described above, the light source unit 10 in the first embodiment of the present invention can widen the depth margin without making the beam spot diameter large in the high light use efficiency when the laser beams are condensed by the condenser lens 20. In addition, the laser beam scanning device 900 using the light source unit 10 can stably and precisely scan a surface to be scanned, and the image forming apparatus using the laser beam scanning device 900 having the light source unit 10 can stably form a high quality image. Further, the optical pickup device 23 using the light source unit 10 can stably and precisely irradiate the laser beams on a light information recording medium.

As described above, according to the first embodiment of the present invention, the phase type optical element 10c gives a two-dimensional phase distribution to the laser beams emitted from the semiconductor laser LD (light source).

In addition, the phase type optical element 10c is a binary optical element having a phase distribution formed of at least two-step phases.

In addition, the side/main intensity ratio of the phase type optical element 10c is less than approximately 10%. Further, the side/main intensity ratio of the phase type optical element 10c is preferably less than 8%.

In addition, the difference between the side/main intensity ratio when the phase type optical element 10c is used and that when the phase type optical element 10c is not used is preferably 4.2% or less.

In addition, as described above, according to the first embodiment of the present invention, the optical pickup device 23, which irradiates laser beams on a light information recording medium and receives light reflected from the light information recording medium, is realized. The optical pickup device 23 includes the light source unit 10, the objective lens 60 for guiding the laser beams irradiated from the light source unit 10 to the light information recording medium, an optical system for guiding the light reflected from the light information recording medium to a light receiving position, and an light detecting system disposed at the light receiving position for detecting information from the light from the light information recording medium.

Second Embodiment

Next, referring to the drawings, a second embodiment of the present invention is described.

In the second embodiment, a reference number of an element is different from that in the first embodiment. For example, in the first embodiment, the phase type optical element 10c is used; however, in the second embodiment, a phase type optical element 2 is used.

First, a method is described in which the depth margin is widened without making the beam spot diameter large.

When diffraction of laser beams is suitably controlled, the depth margin is widened without making the beam spot diameter large. That is, a diffraction optical element is used. The diffraction optical element controls a phase distribution of laser beams by using a concave-convex surface and a refractive index distribution of the diffraction optical element. In the second embodiment of the present invention, a phase type optical element is formed by unifying with the diffraction lens (the diffraction optical element).

Figure 31:
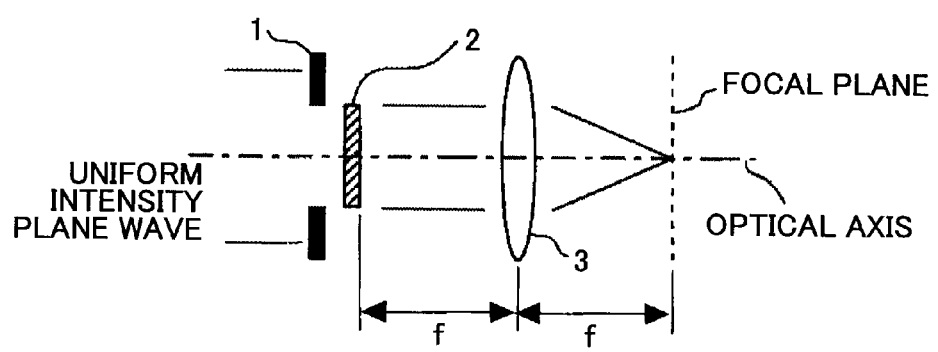
FIG. 31 is a schematic diagram showing an optical system for widening a depth margin according to a second embodiment of the present invention.

FIG. 31 is a schematic diagram showing an optical system for widening the depth margin in the second embodiment of the present invention.

In FIG. 31, an aperture 1 cuts an input wave (plane wave) having uniform intensity input from a light source (not shown) to laser beams having a desirable width. A phase type optical element 2 attached to the aperture 1 gives a desirable phase distribution to the laser beams. Then an image is formed on the focal plane (focal position) of a (perfect) lens 3 by the laser beams being condensed by the lens 3 having the focal distance "f". The aperture 1 is disposed at the front side focal position of the lens 3. The aperture 1 can be replaced by the effective diameter of the phase type optical element 2. The aperture 1 has a shape of a circle whose diameter is 930 μm, the focal distance "f" of the lens 3 is 50 mm, and the wavelength of the plane wave is 632.8 nm. In FIG. 31, a focal plane of the laser beams and an optical axis are also shown.

In the following, in order to make the description simple, the input wave is assumed to have uniform intensity; however, an actual intensity distribution of the laser beams emitted from, for example, a semiconductor laser has a Gaussian distribution. However, the following description can be used in a case of the Gaussian distribution.

Figure 32A:
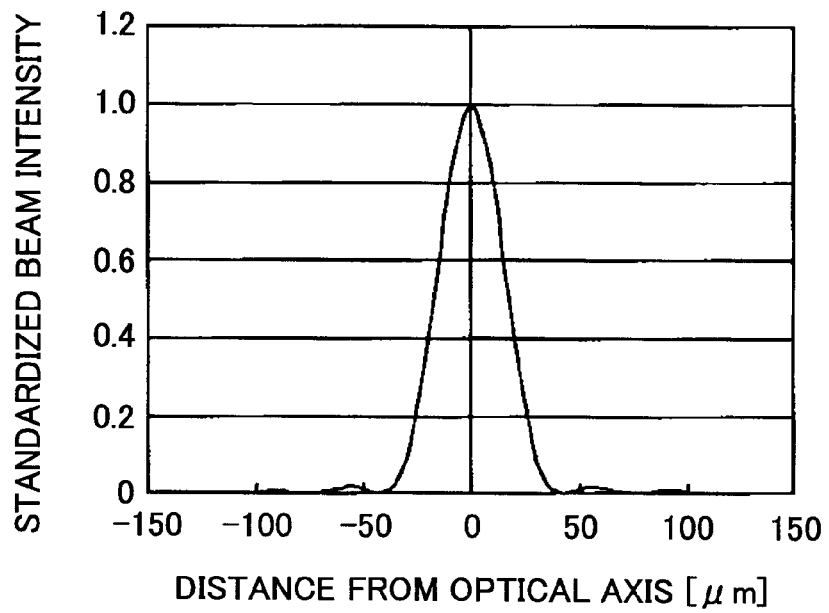
FIG. 32A is a beam intensity profile at the focal position when a phase type optical element is not used according to the second embodiment of the present invention.
Figure 32B:
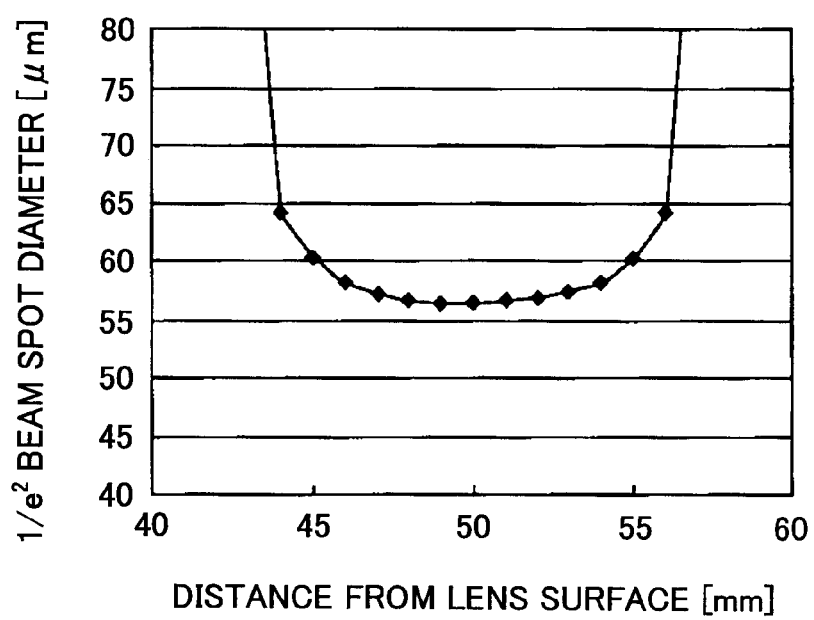
FIG. 32B is a graph showing a relationship between the distance from the lens surface of a lens and the beam spot diameter when the phase type optical element is not used according to the second embodiment of the present invention.

First, a beam intensity profile at the focal position is described when the phase type optical element 2 is not used. As described in FIGS. 2A and 2B of the first embodiment of the present invention, FIG. 32A is the beam intensity profile at the focal position when the phase type optical element 2 is not used, and FIG. 32B is a graph showing a relationship between the distance from the lens surface of the lens 3 and the beam spot diameter when the phase type optical element 2 is not used. In FIG. 32A, the beam intensity is standardized by making the peak intensity "1" in the vertical axis, and in FIG. 32B, the vertical axis shows a $1/e^2$ beam spot diameter. In the present embodiment, the beam spot diameter is defined as a diameter of a region where the intensity has $1/e^2$ or more when the center beam intensity is "1". In FIGS. 32A and 32B, simulated results are shown. As shown in FIG. 32A, from the simulated result, the ratio of the peak intensity of the side lobe laser beams to the peak intensity of the main lobe laser beams is 0.016 (1.6%) in the beam intensity profile at the focal position. The ratio is called the side/main intensity ratio. As shown in FIG. 32B, from the simulated result, the beam spot diameter at the focal position is 56.4 μm and the depth margin is 8.9 mm when the beam spot diameter is allowed to 105% of the minimum beam spot diameter.

Figure 33C:
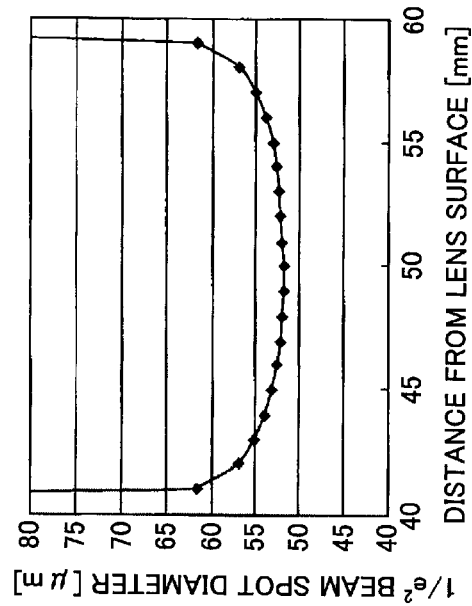
FIG. 33C is a graph showing a relationship between the distance from the lens surface of the lens and the beam spot diameter in the phase type optical element shown in FIG. 33A.
Figure 33A:
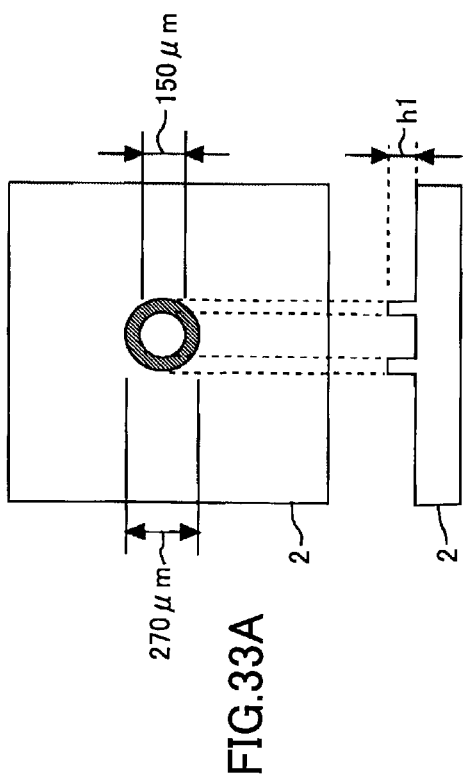
FIG. 33A is a diagram showing the phase type optical element according to the second embodiment of the present invention.
Figure 33B:
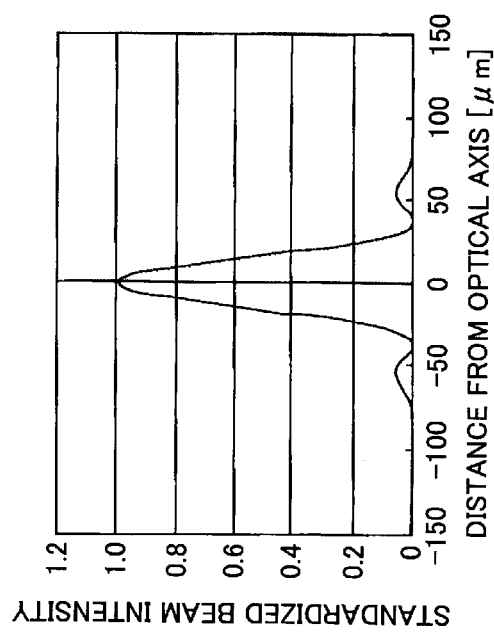
FIG. 33B is a beam intensity profile at the focal position in the phase type optical element shown in FIG. 33A.

Next, referring to FIGS. 33A through 33C, a simulated result is described when the phase type optical element 2 is used. In the simulation, the wavelength is 632.8 nm.

FIG. 33A is a diagram showing a plan view and a cut-away side view of the phase type optical element 2 in the second embodiment of the present invention. In FIG. 33A, a phase distribution (phase modulation region and non-modulation regions) of the phase type optical element 2 is shown. In FIG. 33A, a step part having the height "h1" of a ring shape (the phase modulation region) gives a phase of π to a wavelength (laser beam). That is, in the plan view of FIG. 33A, the white part gives a phase of "0" and the hatching part gives the phase of π. In FIG. 33A, the center of the phase type optical element 2 is the same as the center of the aperture 1. FIG. 33B is a beam intensity profile at the focal position in the phase type optical element 2 shown in FIG. 33A. In FIG. 33B, the beam intensity is standardized so that the peak intensity of the main lobe laser beams is "1". FIG. 33C is a graph showing a relationship between the distance from the lens surface of the lens 3 and the beam spot diameter in the phase type optical element 2 shown in FIG. 33A. In FIGS. 33B and 33C, the simulated results are shown. As shown in FIG. 33B, from the simulated result, the side/main intensity ratio at the focal position is 5.8%. In addition, as shown in FIG. 33C, from the simulated result, the beam spot diameter at the focal position is 51.8 μm and the depth margin is 12.9 mm when the beam spot diameter is allowed to 105% of the minimum beam spot diameter.

In a case where the simulated results shown in FIGS. 32A and 32B are compared with those shown in FIGS. 33B and 33C, when the phase type optical element 2 is used, the depth margin can be widened from 8.9 mm to 12.9 mm without making the beam spot diameter large (from 56.4 μm to 51.8 μm). The depth margin can be widened by increasing the peak intensity of the side lobe laser beams (1.6% to 5.8%).

Next, widening the depth margin by increasing the peak intensity of the side lobe laser beams is described.

At the focal position of the lens 3, the phase of the first-order side lobe laser beam is inverted from the phase of the main lobe laser beam, and the phase of the first-order side lobe laser beam is greatly inverted from the phase of the main lobe laser beam at the boundary between them from a paraxial theory such as Fresnel diffraction. At the boundary between the main lobe laser beam and the first-order side lobe laser beam, a condition is satisfied in which the main lobe laser beam and the first-order side lobe laser beam negate each other (the intensity is the same and the phases are inverted), and a position where the intensity becomes "0" exists. In this condition, at a position apart from the boundary in the outside direction, since both the main lobe laser beam and the side lobe laser beam become divergent laser beams, the plane wavefront (phase) at the focal position gradually becomes a divergent spherical wavefront (phase). Consequently, the inverted phase of the side lobe laser beam at the position apart from the boundary gradually becomes gentle. The condition that the beam intensity becomes "0" by negating both the laser beams is caused by the inverted phases and the same intensity in the main lobe laser beam and the side lobe laser beam. At the position apart from the boundary, the condition which negates the two laser beams is not satisfied; therefore, the intensity gradually becomes high from "0". Consequently, the "0" beam intensity at the boundary is changed to "not 0" at the position apart from the boundary.

Therefore, when the peak intensity of the side lobe laser beam at the focal position is increased by using the phase type optical element 2, a range where the two laser beams negate each other becomes wide, and the increasing ratio of the beam intensity at the position apart from the boundary between the main lobe laser beam and the side lobe laser beam becomes low. Consequently, widening the main lobe laser beam is restrained compared with at the time when the beam intensity of the side lobe laser beam is low, and the depth margin is widened.

FIG. 48 is a diagram showing beam intensity profiles at a position of 57 mm (non-focal position) from the lens surface of the lens 3 in a simulation according to the second embodiment of the present invention. In FIG. 48, (a) shows a case where the phase type optical element 2 is not used, and (b) shows a case where the phase type optical element 2 is used.

As shown in FIG. 48(b), when the phase type optical element 2 is used, the beam intensity profile is restrained from being degraded at the non-focal position; consequently, the depth margin is widened. In FIG. 48(a), the peak intensity positions of the side lobe laser beams may not be clearly confirmed; however, the peak intensity positions of the side lobe laser beams can be estimated from at non-focal positions. From the estimation, the peak intensity of the side lobe laser beams is 14.9% of the peak intensity of the main lobe laser beams. In FIG. 48(b), the peak intensity of the side lobe laser beams is 8.1% of the peak intensity of the main lobe laser beams. That is, the peak intensity of the side lobe laser beams when the phase type optical element 2 is used is less than that when the phase type optical element 2 is not used at the non-focal position.

As described above, by using the phase type optical element 2, when the peak intensity of the side lobe laser beams at the focal position is made greater than at non-using the phase type optical element 2, and the peak intensity of the side lobe laser beams at a non-focal position (arbitrary position other than the focal position) is made less than at non-using the phase type optical element 2; the depth margin can be widened.

In FIG. 33A, the phase modulation region in the phase distribution of the phase type optical element 2 is ring-shaped; however, the phase modulation region is not limited to be ring-shaped. It is sufficient that the phase distribution can increase the peak intensity of the side lobe laser beams at the focal position. In a desirable phase distribution of the phase type optical element 2, a phase modulation region having a symmetric shape is formed at least at a part in the phase distribution as the center of the phase type optical element 2 is the reference. The symmetry includes point symmetry (including rotational symmetry) and line symmetry for a center line. Therefore, one of the phase modulation regions in the phase distributions shown in FIG. 22 is preferable.

In FIG. 33A, the phase type optical element 2 has the phase distribution having two-step regions (the phase modulation region and the non-modulation regions). However, the phase distribution is not limited to the two-step (two-height) phase distribution. When three or more steps are used in the phase distribution, the degree of freedom in designing can be increased, and the depth margin can be widened. However, when the number of the steps is increased, the manufacturing processes may be complicated. When the phase distribution is formed of the two-step, it is preferable that the phase distribution be formed of "0" and π. When the phase distribution is formed of four-step regions, it is preferable that the phase distribution be formed of "0", π/2, π, and π/4 phases.

[Diffraction Lens]

Next, a diffraction lens is described. The diffraction lens can be unified with a phase type optical element.

Figure 34:
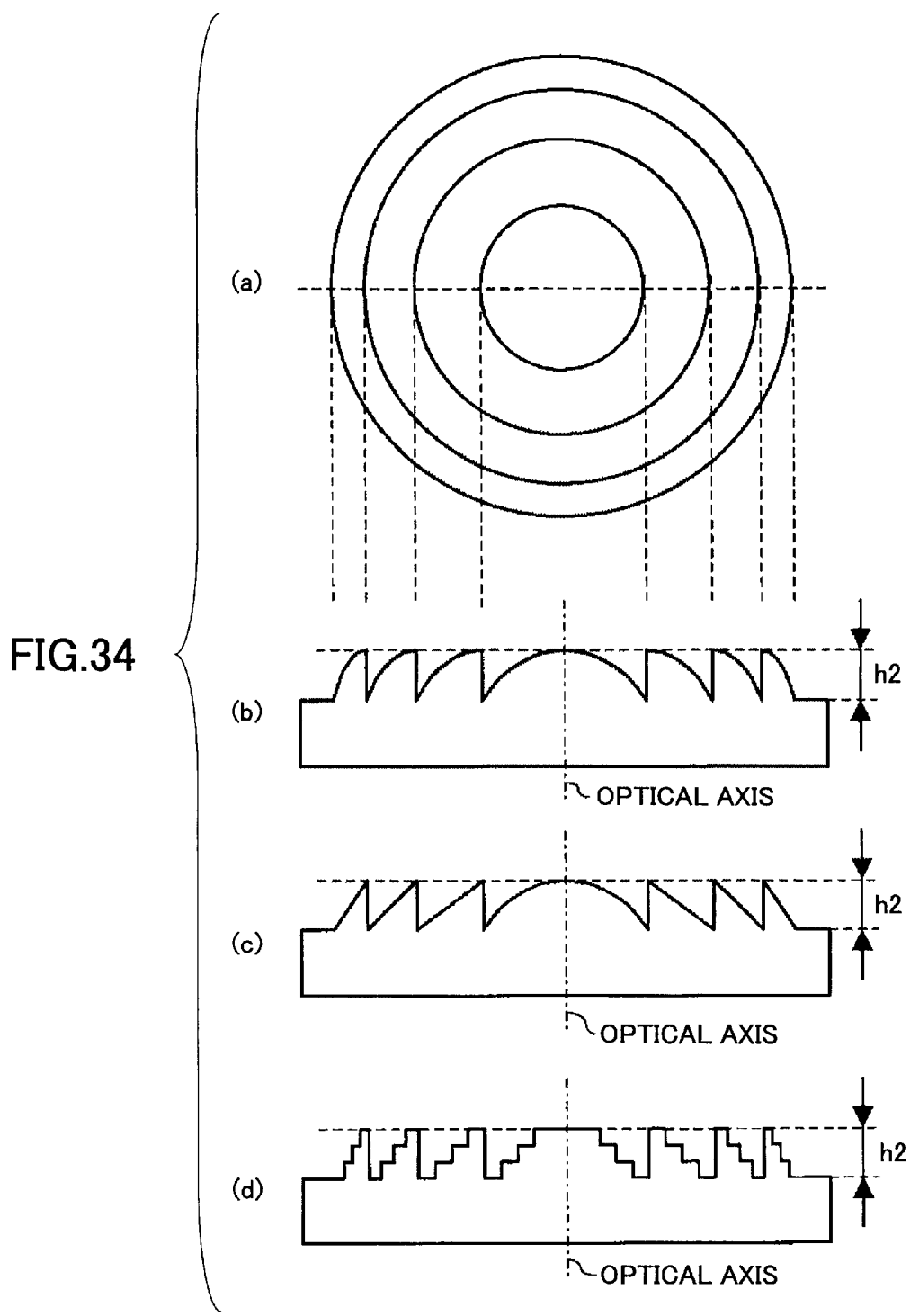
FIG. 34 is a diagram showing a structure of a diffraction lens having power according to the second embodiment of the present invention.

FIG. 34 is a diagram showing a structure of a diffraction lens having power. In FIG. 34, (a) shows a plan view of the diffraction lens, (b) shows a first cut-away side view at the center part of the diffraction lens, (c) shows a second cut-away side view at the center part of the diffraction lens, and (d) shows a third cut-away side view at the center part of the diffraction lens. That is, in FIG. 34, different shapes of the diffraction lens are shown in (b) through (d).

In FIG. 34(b), the surface of a normal lens is formed to have a spherical surface and rings having corresponding curves with the height of "h2", in FIG. 34(c), the surface of a normal lens is formed to have a spherical surface and rings having corresponding straight lines with the height of "h2", and in FIG. 34(d), the surface of a normal lens is formed to have steps whose height is "h2" having small steps. The structures shown in FIGS. 34(b) through (d) have power, and by each of the structures shown in FIGS. 34(b) through 34(d), input laser beams can be condensed or diverge; that is, the diffraction lens has power.

Figure 35:
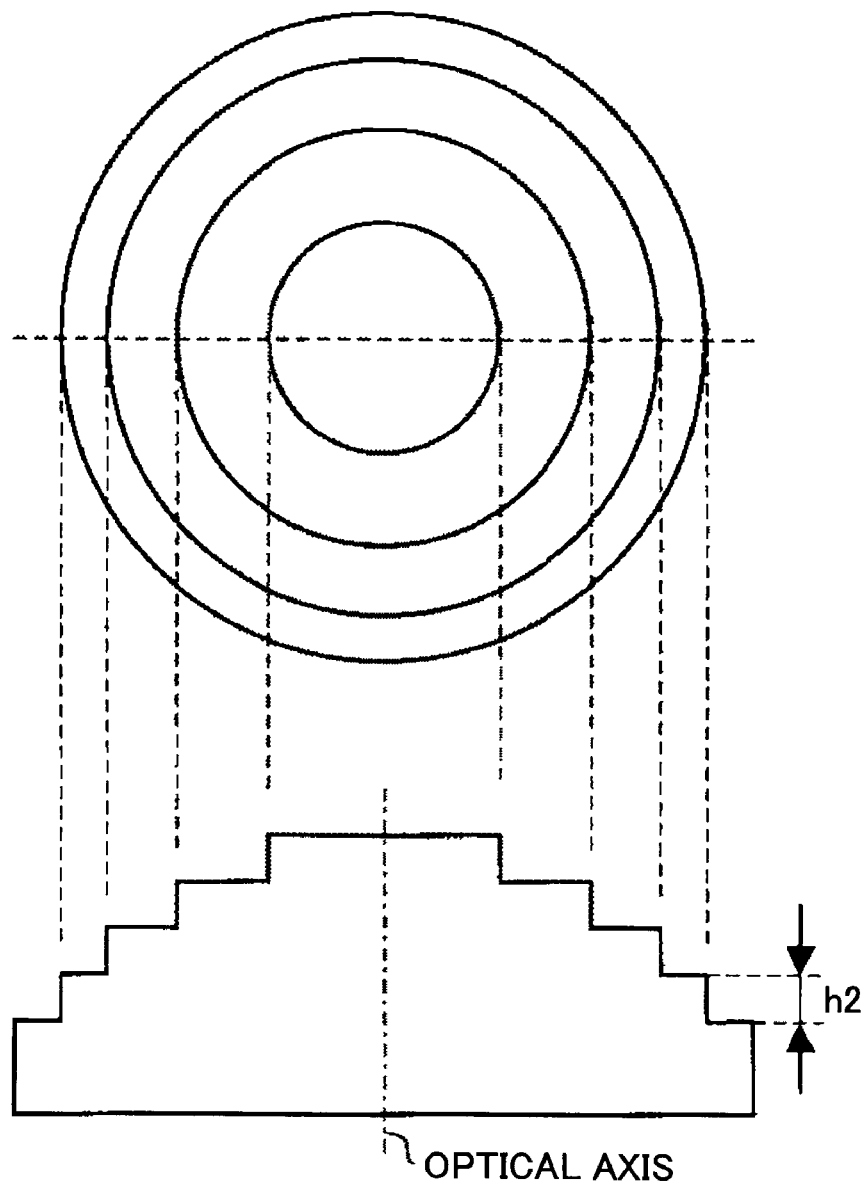
FIG. 35 is a diagram showing a structure of a diffraction lens having no power according to the second embodiment of the present invention.

FIG. 35 is a diagram showing a structure of a diffraction lens having no power. In FIG. 35, a plan view of the diffraction lens and a cut-away side view at the center part of the diffraction lens are shown. In the diffraction lens having non-power, the surface of each ring is orthogonal to the optical axis.

In FIGS. 34 and 35, the height "h2" is determined so that a phase difference becomes a value in which 2π is multiplied by an integer for a using wavelength.

When the above diffraction lens is used, a change of the focal position caused by a temperature change can be restrained. In an optical pickup device which is used in, for example, an optical disk apparatus, the diffraction lens is newly disposed to make one objective lens operate for plural wavelengths, or the diffraction lens is formed on an objective lens for making the objective lens operate for plural wavelengths.

Since a change of the focal position caused by a temperature change can be restrained by using a diffraction lens, when the diffraction lens is used in an image forming apparatus such as a digital copying apparatus and a laser printer, the beam spot diameter can be stable on the surface of a photoconductor body (image carrier) on which surface laser beams are scanned. Therefore, the size of a dot in an image can be stable and the quality of an output image can be high. However, the diffraction lens can only restrain a change of the focal position caused by a temperature change, and does not correct a change of the beam spot diameter caused by deformation and vibration of the apparatus using the diffraction lens. In order to decrease the change of the beam spot diameter caused by an influence other than the temperature change, it is preferable that the depth margin be widened by using the phase type optical element 2.

The phase type optical element 2 for widening the depth margin can be newly disposed in an optical system separately from the diffraction lens. However, when the phase type optical element 2 is disposed by having a distance from the diffraction lens, a high-order diffraction laser beam generated by the phase type optical element 2 may be kicked out by the diffraction lens, and the depth margin widening effect by the phase type optical element 2 may be lowered. In order to avoid lowering the depth margin widening effect, the size of the diffraction lens must be large. Therefore, it is preferable that the phase type optical element 2 be unified with the diffraction lens.

When a discontinuous region is formed at a part of the diffraction lens and a phase difference between the discontinuous region and a part surrounding the discontinuous region is different from 2π in a using wave length, a phase type optical element can be unified with the diffraction lens.

[Phase Type Optical Element 10E]

Figure 36:
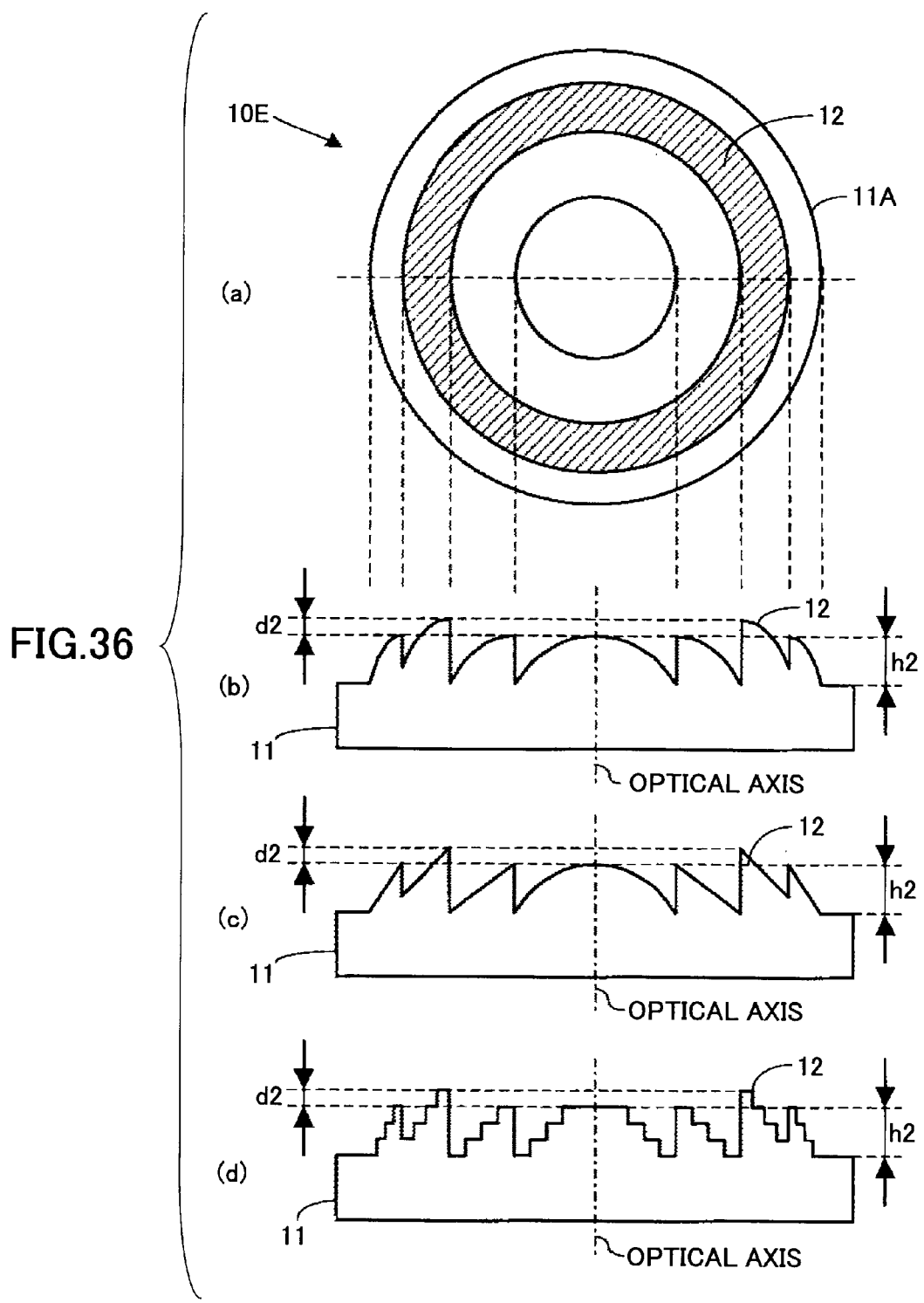
FIG. 36 is a diagram showing a structure of a phase type optical element unified with a diffraction lens according to the second embodiment of the present invention.

FIG. 36 is a diagram showing a structure of a phase type optical element 10E unified with a diffraction lens 11A according to the second embodiment of the present invention. In FIG. 36, (a) shows a plan view of the phase type optical element 10E, (b) shows a first cut-away side view at the center part of the phase type optical element 10E, (c) shows a second cut-away side view at the center part of the phase type optical element 10E, and (d) shows a third cut-away side view at the center part of the phase type optical element 10E. That is, in FIG. 36, different shapes of the phase type optical element 10E are shown in (b) through (d).

In FIG. 36, the diffraction lens 11A has a structure similar to that shown in FIG. 34; however, a second ring (step) 12 from the center has a height of "h2"+"d2". That is, the second ring (step) 12 is higher than the other rings (steps) by "d2". The second ring (step) 12 is shown by hatching in FIG. 36(a). The height "d2" is determined so that a phase difference for the using wavelength does not become a value in which 2π is multiplied by an integer. With this, the second ring (step) 12 becomes the discontinuous region and can give a phase difference to the using wavelength. That is, the phase type optical element 11E can be realized in which the second ring (step) 12 having a phase difference function (depth margin widening function) is given to the diffraction lens 11A. That is, the phase type optical element 10E unified with the diffraction lens 11A is realized.

Generally, a die having a shape of the diffraction lens 11A is formed and the diffraction lens 11A is manufactured by supplying a resin into the die. When the phase type optical element 10E unified with the diffraction lens 11A has the structure shown in FIG. 36, the phase type optical element 10E can be manufactured by an existing high reliable method using a die. Therefore, the phase type optical element 10E having high reliability can be realized. Since one die is formed for manufacturing the phase type optical element 10E unified with the diffraction lens 11A, cost for the die is not increased.

In FIG. 36, the second ring (step) 12 is made to be the discontinuous region (phase difference giving region) by changing the height of the second ring (step) 12 from that of the other rings (steps). However, the second ring (step) 12 can be the discontinuous region by coating a material only on the second ring (step) 12 or changing the refractive index of only the second ring (step) 12 without changing the height of the second ring (step) from that of the other rings (steps).

In FIG. 36, the phase type optical element 10E unified with the diffraction lens 11A having the second ring (step) 12 which gives the phase difference is realized. That is, a phase distribution having two phases is realized by one second ring (step) 12. In addition to the phase distribution having the two phases, a phase distribution having three or more phases can be realized by adding one or more rings (steps) which have a different height. When one or more rings (steps) are added, the degree of freedom in designing is increased and the depth margin can be further widened.

[Phase Type Optical Element 10F]

Figure 37:
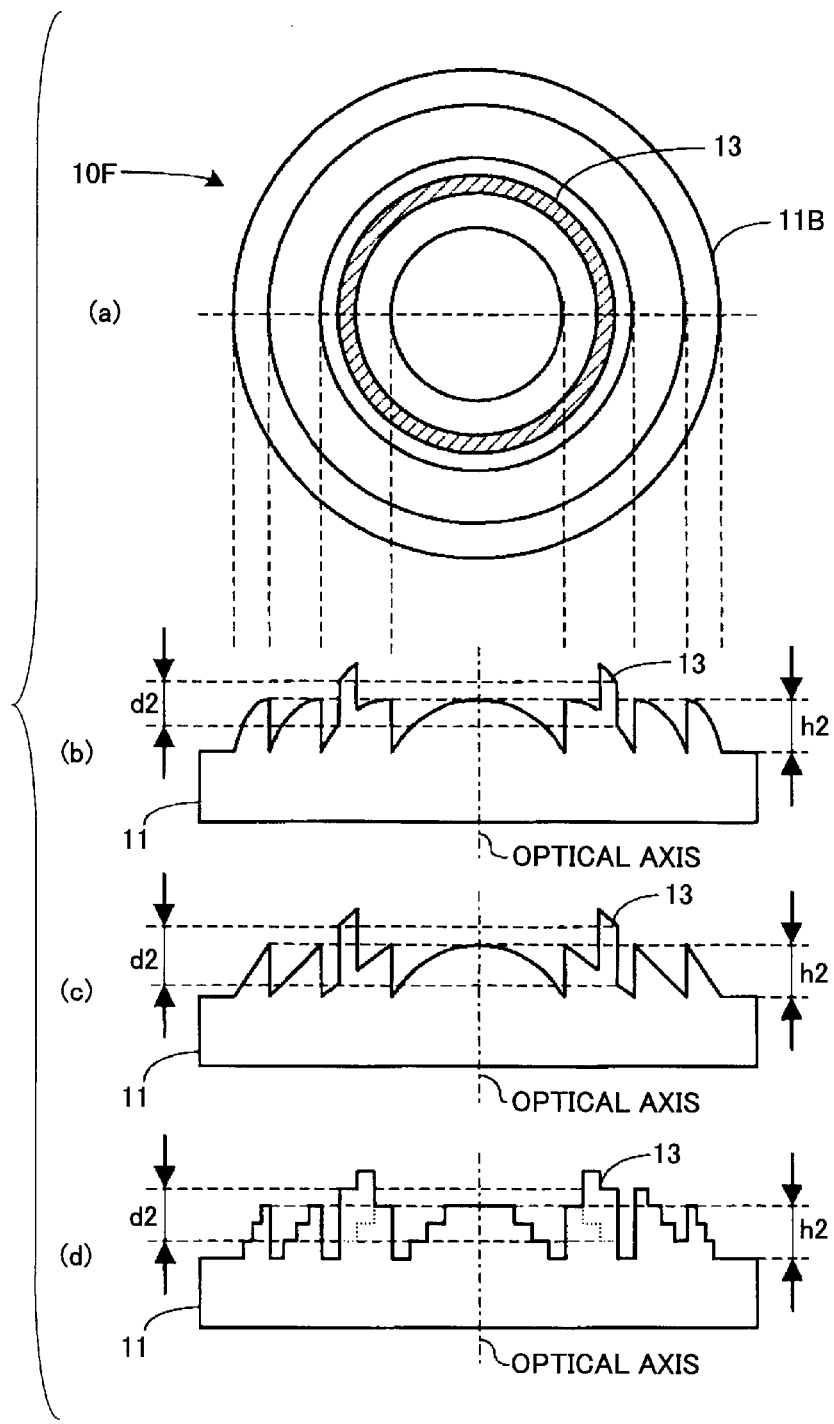
FIG. 37 is a diagram showing a structure of a phase type optical element unified with a diffraction lens according to the second embodiment of the present invention.

FIG. 37 is a diagram showing a structure of a phase type optical element 10F unified with a diffraction lens 11B according to the second embodiment of the present invention. In FIG. 37, (a) shows a plan view of the phase type optical element 10F, (b) shows a first cut-away side view at the center part of the phase type optical element 10F, (c) shows a second cut-away side view at the center part of the phase type optical element 10F, and (d) shows a third cut-away side view at the center part of the phase type optical element 10F. That is, in FIG. 37, different shapes of the phase type optical element 10F are shown in (b) through (d).

In FIG. 37, the diffraction lens 11B has a structure similar to that shown in FIG. 34; however, the diffraction lens 11B has a discontinuous region 13 in a first ring (step) from the center. The discontinuous region 13 is shown by hatching in FIG. 37(a). In the phase type optical element 10E shown in FIG. 36, the part of the second ring must be at the same position as that of the discontinuous region 12 of the diffraction lens 11A. However, in the phase type optical element 10F shown in FIG. 37, the discontinuous region 13 does not need to be the same position as that of the first ring of the diffraction lens 11B. That is, the first ring includes the discontinuous region 13. Therefore, the degree of freedom in designing can be increased in the phase type optical element 10F.

In FIG. 37, the discontinuous region 13 is formed in the first ring from the center in (b) and (c); however, the discontinuous region 13 can be formed across plural rings. In addition, the shape of the tip surface of the discontinuous region 13 is oblique; however, the shape can be orthogonal to the optical axis.

As shown in FIG. 37(d), the discontinuous region 13 can be formed of a step. The discontinuous region 13 can be formed of plural steps across the steps. As described above, in the phase type optical element 10F shown in FIG. 37, the discontinuous region 13 does not need to be exactly the same position as that of the first step of the diffraction lens 11B. That is, the first step includes the discontinuous region 13. Therefore, the degree of freedom in designing can be increased in the phase type optical element 10F.

In the phase type optical elements 10E and 10F shown in corresponding FIGS. 36 and 37, the manufacturing process can be simple when the phase distribution is formed of two heights. The phase difference between the discontinuous region 12 (13) and the surrounding part of the discontinuous region is preferable to be a value in which n is multiplied by an odd number for a using wavelength. With this, the depth margin can be widened.

Figure 38:
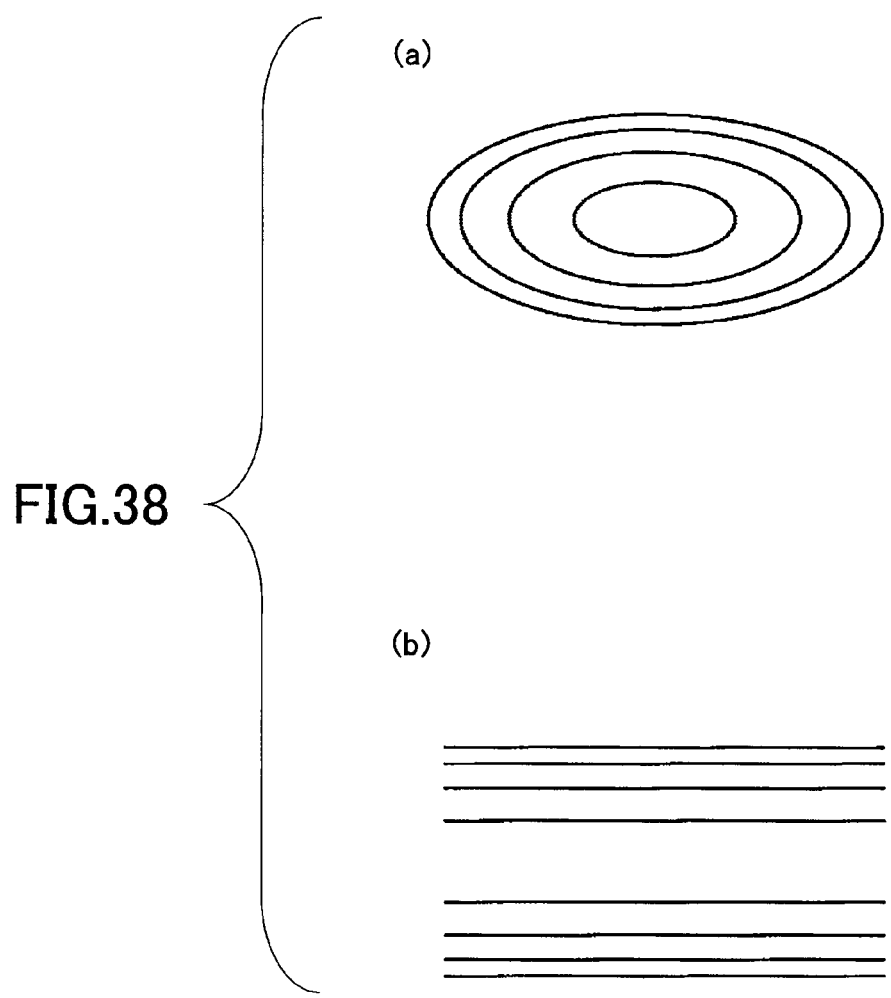
FIG. 38 is a diagram showing shapes of rings (steps) in the diffraction lens shown in FIGS. 36 and 37.

In the phase type optical elements 10E and 10F shown in corresponding FIGS. 36 and 37, the rings (steps) of the diffraction lens 11A (11B) are concentric circles in the plan view. However, as shown in FIG. 38, the diffraction lens 11A (11B) can have an elliptic shape or a line shape for forming the phase distribution. The elliptic shape or the line shape is useful in an optical system in which optical magnifications are different between the two directions orthogonal to each other. FIG. 38 is a diagram showing shapes of the rings (steps) in the diffraction lens 11A or 11B. In FIG. 38, (a) shows the elliptic shape and (b) shows the line shape.

As the diffraction lens 11A (11B), the diffraction lens shown in FIG. 35 can be used instead of using that shown in FIG. 34. In addition, the discontinuous region 12 (13) can have any one of the shapes shown in FIG. 22 which are shown as the shapes of the phase distribution of the phase type optical element.

Next, a structure is described in which a phase type optical element having a step shape is unified with a phase type optical element for widening the depth margin.

The phase type optical element having the step shape is different from those shown in FIG. 36 or 37 and does not have the ring structure, or has a phase difference which is not $2\pi$ for a using wavelength. The phase type optical element having the step shape is used for, for example, correcting (spherical) aberration. When the aberration is corrected, a change (enlarging) of the beam spot diameter can be restricted. In addition, the phase type optical element having the step shape is used in an optical pickup system in which a single objective lens is compatibly used in plural wavelengths of, for example, blue, red, and colors other than the blue and red. In addition, usually, the phase type optical element having the step shape can be considered to hardly have optical power.

Figure 39B:
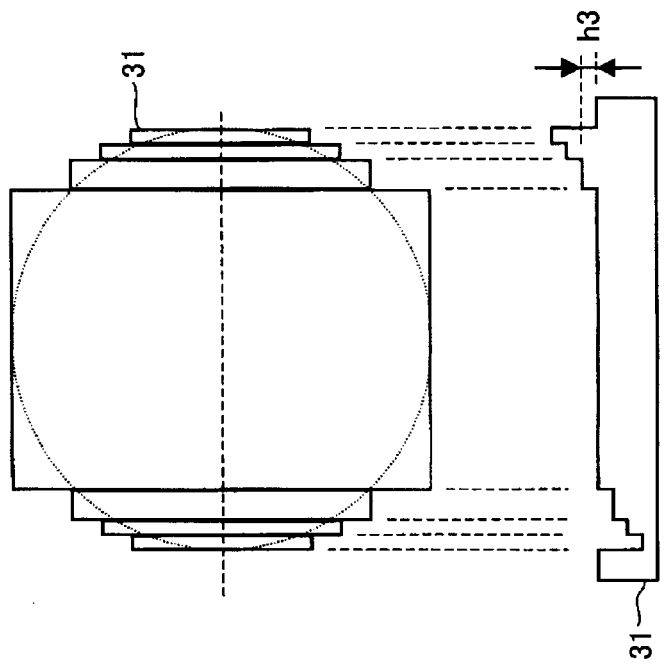
FIG. 39B is a diagram showing a phase type optical element which has a step shape for correcting coma aberration according to the second embodiment of the present invention.
Figure 39A:
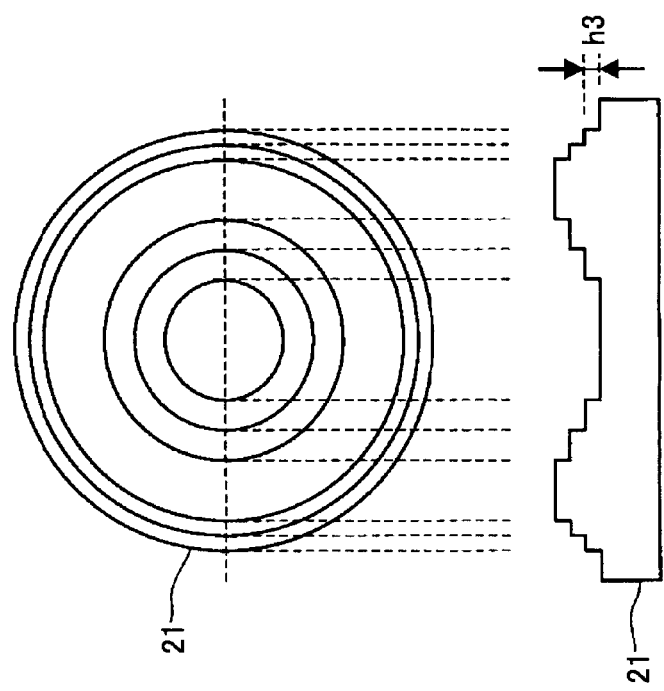
FIG. 39A is a diagram showing a phase type optical element which has a step shape for correcting spherical aberration according to the second embodiment of the present invention.

FIG. 39A is a diagram showing a phase type optical element 21 which has a step shape for correcting spherical aberration. FIG. 39B is a diagram showing a phase type optical element 31 which has a step shape for correcting coma aberration. In FIGS. 39A and 39B, the height of the surface of each step is "h3", and the height "h3" is determined by the aberration amount to be corrected and the number of steps corresponds to a non-$2\pi$ phase for a using wavelength.

The phase type optical elements 21 and 31 which have the step shape prevent the beam spot diameter from being enlarged when initially delivering an apparatus having the phase type optical elements 21 and 31 to a customer from a factory. However, after delivering the apparatus to the customer, a change of the beam spot diameter caused by a positional shift of an optical element due to deformation and vibration of the apparatus cannot be prevented. Therefore, when the phase type optical element for widening the depth margin according to the present embodiment is used, the change of the beam spot diameter can be decreased after delivering the apparatus.

FIG. 40A is a diagram showing a phase type optical element 20 formed by unifying the phase type optical element 21 having the step shape with the discontinuous region 22 according to the second embodiment of the present invention. FIG. 40B is a diagram showing a phase type optical element 30 formed by unifying the phase type optical element 31 which has the step shape with a discontinuous region 32 according to the second embodiment of the present invention. The phase type optical elements 20 and 30 have the same effect as that of the phase type optical elements 10E shown in FIG. 36 and the phase type optical elements 10F shown in FIG. 37.

In FIG. 40A, in the discontinuous region 22 shown by hatching, the difference "d4" from the height of the surrounding surface is greater than the unit step height "h4". In FIG. 40B, in the discontinuous regions 32 shown by hatching, the difference "d4" from the height of the surrounding surface or from the height raised a step from the surrounding surface is greater than the unit step height "h4".

When the discontinuous region 22 or 32 is provided, the phase type optical elements 20 and 30 can be realized in which the depth margin widening function is added to the corresponding phase type optical element 21 or 31. In this, when the difference "d4" is less than the unit step height "h4", the discontinuous regions 22 and 32 function as correcting the spherical aberration, and when the difference "d4" is greater than the unit step height "h4", the discontinuous regions 22 and 32 function as widening the depth margin. In addition, an existing manufacturing process having high reliability for manufacturing a diffraction lens can be used to manufacture the phase type optical elements 20 and 30. Therefore, the highly reliable phase type optical elements 20 and 30 can be manufactured.

In FIG. 40A, the phase type optical element 20 for widening the depth margin is realized by the phase distribution having the single ring-shaped discontinuous region 22. However, two or more ring-shaped discontinuous regions can be provided. When plural ring-shaped discontinuous regions are provided, the degree of freedom in designing is increased and the depth margin can be widened.

FIG. 41A is a diagram showing a phase type optical element 20' in which a discontinuous region 23 is newly provided at a part of the step and difference "d5" from the height of the surrounding surface is not $2\pi$ for a using wavelength. FIG. 41B is a diagram showing a phase type optical element 30' in which discontinuous regions 33 are newly provided at parts of the corresponding steps and difference "d5" from the height of the surrounding surface is not $2\pi$ for the using wavelength. In FIG. 40A, the height of the all step surfaces of the discontinuous region 22 must be equal. However, in FIG. 41A, the height of a part of the all step surfaces of the discontinuous region 23 is equal. Therefore, in FIG. 41A, the degree of freedom in designing can be increased and the depth margin can be widened. In addition, in FIG. 40B, the height of the all step surfaces of each of the discontinuous regions 32 must be equal. However, in FIG. 41B, the height of a part of the all step surfaces of each of the discontinuous regions 33 is equal. Therefore, in FIG. 41B, the degree of freedom in designing can be increased and the depth margin can be widened.

As a phase distribution for widening the depth margin, it is easiest that the phase distribution be formed of two steps in the manufacturing process. At this time, it is preferable that the phase difference between the discontinuous region and the surrounding surface be a value in which n is multiplied by an odd number. With this, the depth margin can be widened.

In the present embodiment, the phase distribution is formed by controlling the height of the discontinuous region. However, the phase distribution can be formed by controlling the refractive index of the discontinuous region. In addition, the discontinuous region can be formed by two-dimensionally controlling a transmission factor of a part of the discontinuous region. In this case, the light use efficiency may be lowered; however, the depth margin can be widened.

[Light Source Unit]

Next, cases are described in which the phase type optical element(s) of the present embodiment is used in a light source unit. Since the phase type optical element in the present embodiment can be formed on one surface of an optical element, a lens or an optical component can be disposed (formed) on the other surface of the optical element.

Figure 42A:
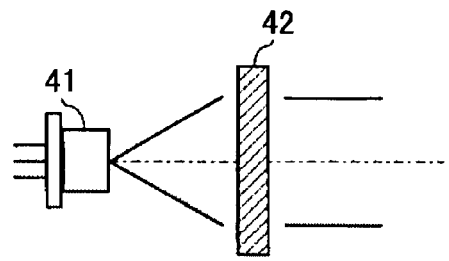
FIG. 42A is a schematic diagram showing a first light source unit using a phase type optical element according to the second embodiment of the present invention.

FIG. 42A is a schematic diagram showing a first light source unit using a phase type optical element according to the second embodiment of the present invention. The first light source unit shown in FIG. 42A includes a semiconductor laser 41 (light source) and a phase type optical element 42 having power. Since the power can be given on one surface of an optical element, when a lens is formed on one surface of a phase type optical element, the phase type optical element 42 can have the power of the lens.

Figure 42B:
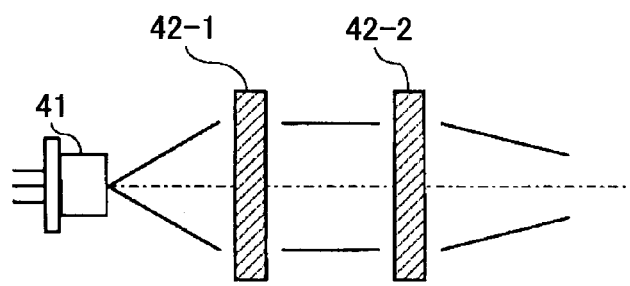
FIG. 42B is a schematic diagram showing a second light source unit using two phase type optical elements according to the second embodiment of the present invention.

FIG. 42B is a schematic diagram showing a second light source unit using two phase type optical elements according to the second embodiment of the present invention. The second light source unit shown in FIG. 42B includes the semiconductor laser 41, a first phase type optical element 42-1, and a second phase type optical element 42-2. The second phase type optical element 42-2 can be disposed separately from the first phase type optical element 42-1 or can be formed on one surface of the first phase type optical element 42-1.

By the above structure, a light source unit can be realized in which a change of a beam spot diameter caused by a temperature change is decreased and the depth margin is widened. In addition, a light source unit can be realized in which enlarging a beam spot diameter is decreased before delivering an apparatus using the light source unit and the depth margin is widened.

Figure 43:
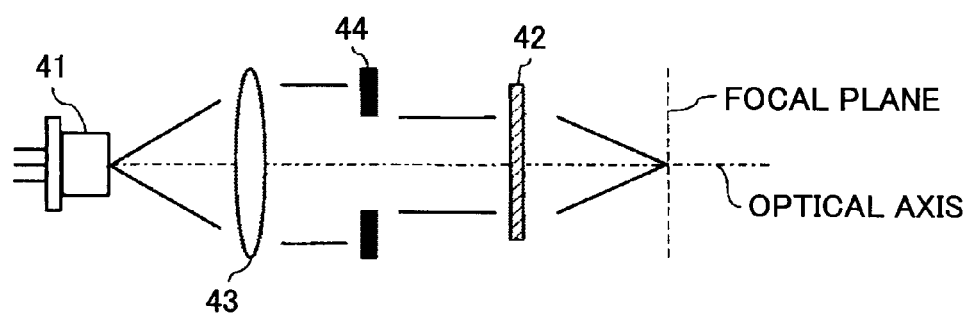
FIG. 43 is a schematic diagram showing a third light source unit using a phase type optical element according to the second embodiment of the present invention.

Next, referring to FIG. 43, a third light source unit using a phase type optical element according to the second embodiment of the present invention is described. FIG. 43 is a schematic diagram showing the third light source unit using a phase type optical element according to the second embodiment of the present invention. The third light source unit includes the semiconductor laser 41, a lens 43, an aperture 44, and the phase type optical element 42. The semiconductor laser 41 is a light source, the lens 43 converts laser beams emitted from the semiconductor laser 41 into parallel laser beams. The aperture 44 transmits a part of the parallel laser beams.

When the aperture 44 cuts off a part of the parallel laser beams (this case includes that an effective diameter of the lens 43 cuts off a part of the parallel laser beams instead of using the aperture 44), a diffraction image (far field pattern) of the aperture 44 includes side lobe laser beams. When the aperture 44 has a circle shape, a beam intensity profile similar to that shown in FIG. 32A is obtained as the far field pattern (in this case, the distance from the optical axis is ignored). When a condenser lens is used, the far field pattern is obtained at the focal position of the condenser lens. The peak intensity of the first-order side lobe laser beams is approximately 1.6% of the peak intensity of the main lobe laser beams when a circle-shaped aperture is used and is approximately 4.7% of the peak intensity of the main lobe laser beams when a rectangle-shaped aperture is used. As shown in FIG. 43, in a case where the phase type optical element 42 is disposed, when the ratio of the peak intensity of the first-order side lobe laser beams to the peak intensity of the main lobe laser beams at the focal position in the beam intensity profile (side/main intensity ratio) is made greater than the diffraction image (far field pattern) of the aperture 44, the depth margin can be widened.

[Laser Beam Scanning Device]

Figure 44:
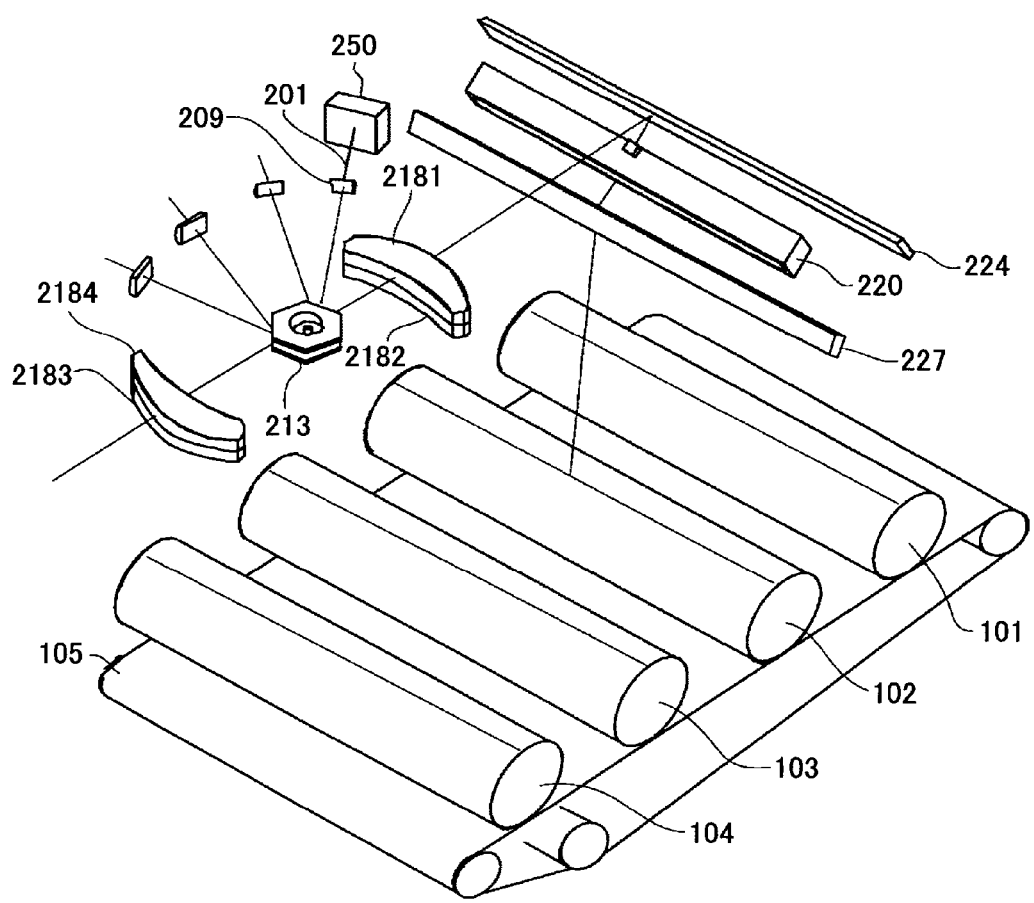
FIG. 44 is a perspective view of a part of a laser beam scanning device which is used in a full color image forming apparatus according to the second embodiment of the present invention.
Figure 45:
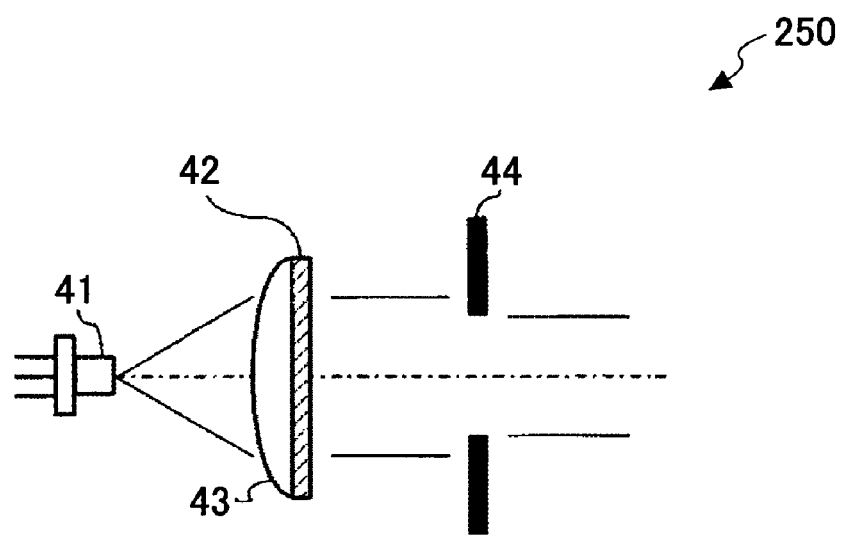
FIG. 45 is a schematic diagram showing a light source unit shown in FIG. 44.
Figure 46:
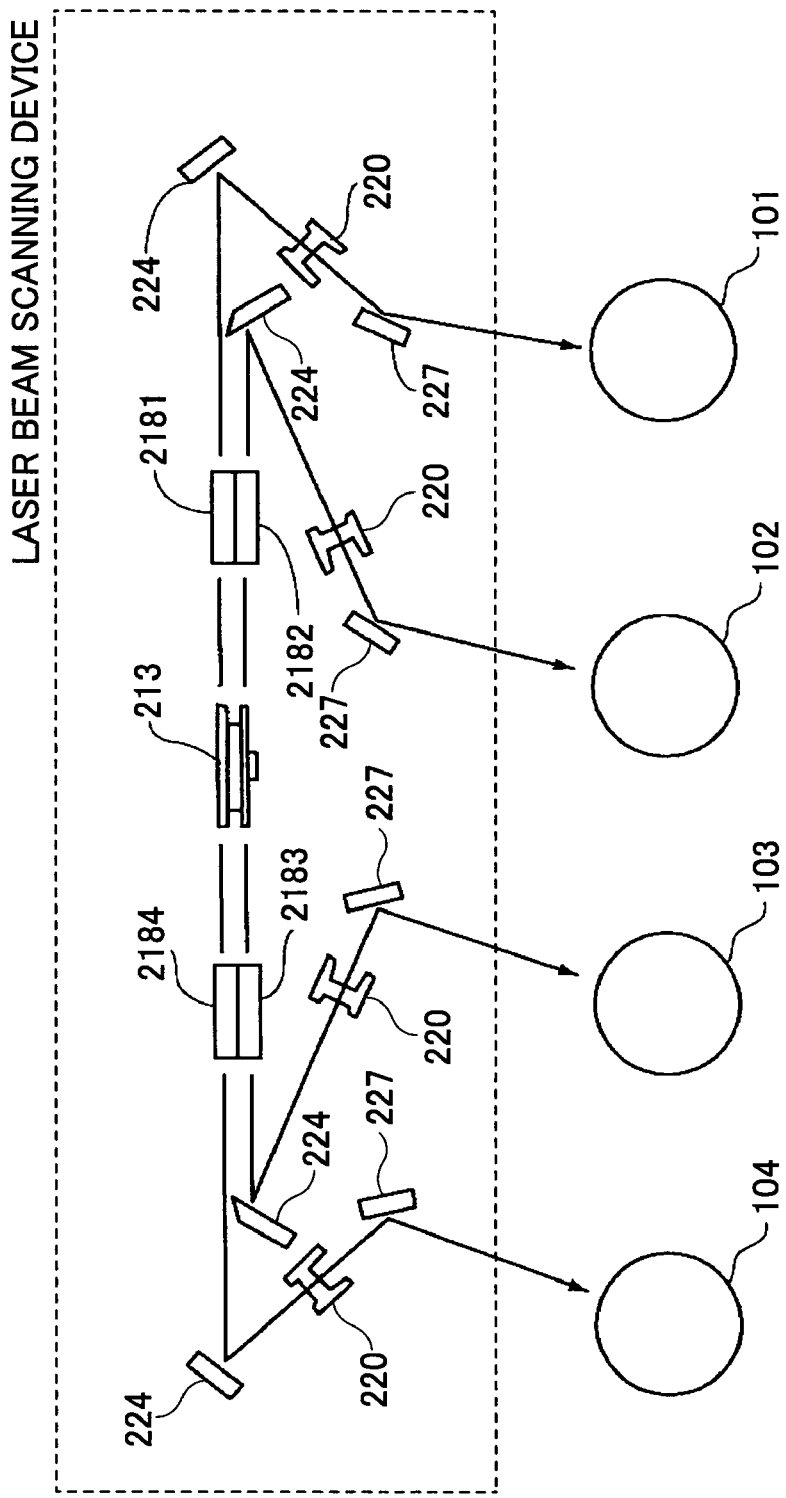
FIG. 46 is a schematic diagram showing a part of the laser beam scanning device shown in FIG. 44.

Next, referring to FIGS. 44 through 46, a laser beam scanning device according to the second embodiment of the present invention is described. The laser beam scanning device uses the light source unit using the phase type optical element of the present embodiment. The laser beam scanning device is used in an image forming apparatus, for example, a digital copying apparatus and a laser printer.

FIG. 44 is a perspective view of a part of the laser beam scanning device which is used in a full color image forming apparatus according to the second embodiment of the present invention. FIG. 45 is a schematic diagram showing a light source unit 250 shown in FIG. 44. FIG. 46 is a schematic diagram showing a part of the laser beam scanning device shown in FIG. 44.

In FIG. 44, the laser beam scanning device includes the light source unit 250, a polygon mirror 213 for deflecting laser beams irradiated from the light source unit 250, fθ lenses 2181 through 2184 for forming an image on corresponding photoconductor drums 101 through 104 from the laser beams deflected by the polygon mirror 213. The fθ lenses 2181 and 2182 are disposed to face the fθ lenses 2183 and 2184. In addition, in FIG. 44, in order to make the description simple, a toroidal lens 220 and folding mirrors 224 and 227 for one color are only shown.

In FIG. 44, the four photoconductor drums 101 through 104 are arrayed along the moving direction of a transfer belt 105, toner images of four colors are sequentially transferred to a sheet, and a color image is formed on the sheet. The polygon mirror 213 deflects the laser beams for four colors.

As shown in FIG. 45, the light source unit 250 includes the semiconductor laser 41, the phase type optical element 42, the lens 43, and the aperture 44. The phase type optical element 42 applies a depth margin widening function to the laser beams emitted from the semiconductor laser 41. In addition, the laser beams are made to be parallel laser beams by the lens 43. As shown in FIG. 45, the lens 43 having positive power is unified with the phase type optical element 42 having non-power and the lens surface faces the semiconductor laser 41 (light source). Since the light use efficiency (diffraction efficiency) is increased when the parallel laser beams are input to the phase type optical element 42, the lens 43 is disposed to face the light source. Modified examples of disposition of the lens 43 and the phase type optical element 42 including the disposition of FIG. 45 are shown in Table 1. Modified examples are not limited to those shown in Table 1. The modified example 1 is most preferable when aberration be corrected.

TABLE 1

| | LIGHT SOURCE SIDE | APERTURE SIDE |
| --- | --- | --- |
| DISPOSITION IN FIG. 45 | LENS 43 (POSITIVE POWER) | PHASE TYPE OPTICAL ELEMENT 42 (NON-POWER) |
| MODIFIED EXAMPLE 1 | LENS 43 (POSITIVE POWER) | PHASE TYPE OPTICAL ELEMENT 42 (POSITIVE POWER) |
| MODIFIED EXAMPLE 2 | PHASE TYPE OPTICAL ELEMENT 42 (POSITIVE POWER) | LENS 43 (POSITIVE POWER) |
| MODIFIED EXAMPLE 3 | ABSENCE OF LENS 43 | PHASE TYPE OPTICAL ELEMENT 42 (POSITIVE POWER) |
| MODIFIED EXAMPLE 4 | PHASE TYPE OPTICAL ELEMENT 42 (NON-POWER) | PHASE TYPE OPTICAL ELEMENT 42 (POSITIVE POWER) |

In FIG. 44, the only one light source unit 250 is shown. However, actually, four light source units 250 are provided to correspond to the photoconductor drums 101 through 104. The parallel laser beams transmitted through the lens 43 and the phase type optical element 42 are cut to form laser beams having a desirable width by the aperture 44 (refer to 201 shown in FIG. 44), the laser beams converge only in the sub scanning direction by a cylindrical lens 209, and the laser beams form a long line image in the main scanning direction at the deflecting reflection surface position of the polygon mirror 213. The phase type optical element 42 can be also used as the cylindrical lens 209. In this case, the cylindrical lens 209 is not needed.

Each of the fθ lenses 2181 through 2184 has a non-arc-shaped surface so that a laser beam spot moves at a constant velocity in the main scanning direction on the corresponding surfaces of the photoconductor drums 101 through 104 corresponding to the rotation of the polygon mirror 213. A tangle error of the deflection surface of the polygon mirror 213 is corrected by the cylindrical lens 209, each of the fθ lenses 2181 through 2184, and the toroidal lens 220. The laser beams transmitted through each of the fθ lenses 2181 through 2184 are reflected by the folding mirror 224, are input to the toroidal lens 220, are reflected by the folding mirror 227, and form a spot image on each of the photoconductor drums 101 through 104. That is, a latent image of, for example, yellow, magenta, cyan, and black is formed on the surface of the corresponding photoconductor drums 101 through 104.

The fθ lenses 2181 and 2182 are disposed at one side of the polygon mirror 213 and the fθ lenses 2183 and 2184 are disposed at the other side of the polygon mirror 213. The fθ lenses 2181 and 2182 are stacked in the direction corresponding to the sub scanning direction and also the fθ lenses 2183 and 2184 are stacked in the direction corresponding to the sub scanning direction.

The folding mirrors 224 and 227 are disposed so that an optical path length from the polygon mirror 213 to each of the photoconductor drums 101 through 104 is the same and the input position and the input angle of the laser beams onto the surface of each of the photoconductor drums 101 through 104 arrayed having the same interval between them are the same.

When the phase type optical element of the present embodiment is used in the laser beam scanning device, a change of the beam spot diameter on the surface to be scanned can be small.

In the present embodiment, it is preferable that the phase type optical element be disposed before polygon mirror 213. With this, at all positions of the surfaces to be scanned, the depth margin can be widened without enlarging the beam spot diameter.

[Image Forming Apparatus]

Figure 47:
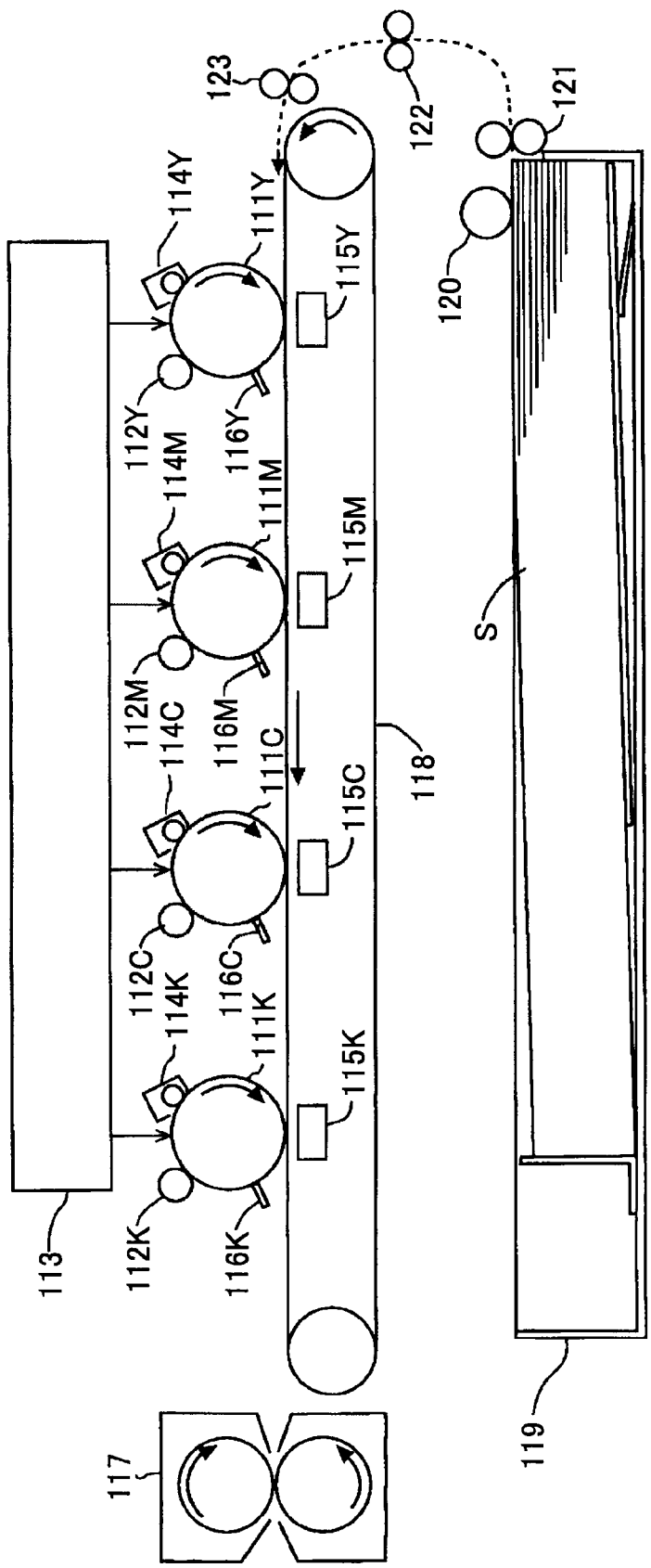
FIG. 47 is a schematic diagram showing a part of the image forming apparatus according to the second embodiment of the present invention.

Next, referring to FIG. 47, an image forming apparatus according to the second embodiment of the present invention is described. FIG. 47 is a schematic diagram showing a part of the image forming apparatus according to the second embodiment of the present invention. The image forming apparatus is a color image forming apparatus using the laser beam scanning device of the present embodiment. That is, the laser beam scanning device uses the light source unit using the phase type optical element.

In the image forming apparatus, a reference number of an element is different from that shown in FIGS. 44 and 46. For example, in the laser beam scanning device shown in FIGS. 44 and 46, the photoconductor drum 101 is used; however, in the image forming apparatus, a photoconductor drum 111K is used. Further, when a suffix is not attached to a reference number of an element, the reference number represents the set of elements. For example, the photoconductor drum 111 represents photoconductor drums 111Y, 111M, 111C, and 111K.

In FIG. 47, the photoconductor drums 111Y, 111M, 111C, and 111K are disposed along a transfer belt 118 and are rotated in the arrow direction. Chargers 112Y, 112M, 112C, and 112K are disposed to contact the corresponding photoconductor drums 111Y, 111M, 111C, and 111K. In FIG. 47, as the charger 112, a contact type charging roller is used; however, a charging brush or a non-contact type corona charger can be used instead of the contact type charging roller. In addition, as shown in FIG. 47, a laser beam scanning device 113; developers 114Y, 114M, 114C, and 114K; transfer chargers (transfer rollers or transfer brushes) 115Y, 115M, 115C, and 115K; cleaning units 116Y, 116M, 116C, and 116K are disposed in the image forming apparatus. Further, a fixing unit 117, a paper feeding cassette 119 for feeding a sheet S (recording medium), a paper feeding roller 120, paper separation rollers 121, carrying rollers 122, and registration rollers 123 are disposed in the image forming apparatus.

On the photoconductor drum 111, laser beams modulated by the laser beam scanning device 113 corresponding to image information are exposed and an electrostatic latent image is formed. The four laser beam scanning devices 113 can be disposed corresponding to the four photoconductor drums 111; however, in the image forming apparatus shown in FIG. 47, one laser beam scanning device 113 irradiates the laser beams corresponding to four colors. That is, four optical systems corresponding to the four photoconductor drums 111y, 111M, 111C, and 111K and one polygon mirror are provided, and the laser beams are divided into four laser beams corresponding to four colors by the polygon mirror and are irradiated onto the corresponding photoconductor drums 111.

The electrostatic latent image formed on the photoconductor drum 111 is developed by the developer 114 and a toner image is formed. At timing of the development, the sheet S is fed from the paper feeding cassette 119 by the paper feeding roller 120 and the paper separation rollers 121, and is carried to the registration rollers 123 via the carrying rollers 122.

The sheet S is carried on the transfer belt 118 by the registration rollers 123 to a transfer position at timing when the toner image is carried to the transfer position. The transfer charger 115 disposed to face the photoconductor drum 111 by sandwiching the transfer belt 118 applies a transfer bias voltage and the toner images on the corresponding photoconductor drums 111Y, 111M, 111C, and 111K are sequentially transferred to the sheet S. The four-color superposed toner image is fixed by the fixing unit 117 by being applied heat and pressure and the fixed color image is output to a paper output tray (not shown). After transferring the toner images on the sheet S, the remaining toner and paper powders on the photoconductor drum 111 are removed by a blade or a brush of the cleaning unit 116.

The image forming apparatus shown FIG. 47 has four modes of a single color mode, a two-color mode, a three-color mode, and a full color mode. In the single color mode, one color image of yellow (Y), magenta (M), cyan (C), or black (K) is formed; in the two-color mode, a two-color image is formed by superposing any two images of yellow (Y), magenta (M), cyan (C), and black (K); in the three-color mode, a three-color image is formed by superposing any three images of yellow (Y), magenta (M), cyan (C), and black (K); and in the full color mode, a full color image is formed by superposing the four images of yellow (Y), magenta (M), cyan (C), and black (K).

In the image forming apparatus shown in FIG. 47, a multi-color image is formed on the sheet S by using processes of charging the surface of the photoconductor drum 111, exposing the laser beams on the photoconductor drum 111 and forming an electrostatic latent image on the photoconductor drum 111, developing the electrostatic latent image and forming a toner image, and transferring the toner image onto the sheet S on the transfer belt 118. However, instead of directly transferring the toner image on the sheet S from the photoconductor drum 111, an intermediate transfer belt can be used. When the intermediate transfer belt is used, each color toner image is transferred on the intermediate transfer belt and a full color toner image is formed on the intermediate transfer belt by superposing four-color toner images. Then the superposed four-color toner image is transferred onto the sheet S from the intermediate transfer belt.

As described above, according to the second embodiment of the present invention, since the image forming apparatus includes the laser beam scanning device using the phase type optical element, a change of the beam spot diameter on the photoconductor drum 111 can be restrained. Therefore, a high quality image in which the beam spot diameters are almost equal to each other can be obtained. When the beam spot diameter on the photoconductor drum 111 is stable, one of the plural process control conditions can be stable. Therefore, the number of times of the process control can be decreased and power saving can be realized.

In addition, the phase type optical element and the light source unit including the phase type optical element in the second embodiment of the present invention can be applies to an optical system using laser beams, for example, an optical pickup device in an optical disk apparatus, a laser processing device, and a laser measuring device.

As described above, in the second embodiment of the present invention, the surface of the phase type optical element is divided into plural regions, and one of the plural divided regions is the discontinuous region which gives a phase difference to input laser beams.

In addition, the discontinuous region is formed in one of the plural divided regions or across the plural divided regions.

In addition, the plural divided regions are formed of steps and the discontinuous region is a surface of a step.

In addition, the plural divided regions are formed of steps and the discontinuous region is a part of a surface of a step.

In addition, according to the second embodiment of the present invention, the light source unit includes a light source for emitting laser beams, a lens for making the laser beams emitted from the light source parallel laser beams, an aperture for transmitting a part of the parallel laser beams, and a phase type optical element. The phase distribution in the phase type optical element is determined so that the side/main intensity ratio when the phase type optical element is disposed is greater than that when the phase type optical element is not disposed.

Third Embodiment

Next, referring to the drawings, a third embodiment of the present invention is described.

In the third embodiment, the reference number of an element is basically different from that in the first and the second embodiments. In some cases, the same reference number as that in the first and second embodiments is used in the third embodiment, and within the third embodiment, the same reference number is used for the same element. In addition, when a suffix is not attached to a reference number of an element, the reference number represents the set of elements.

[Laser Beam Scanning Device]

Figure 49:
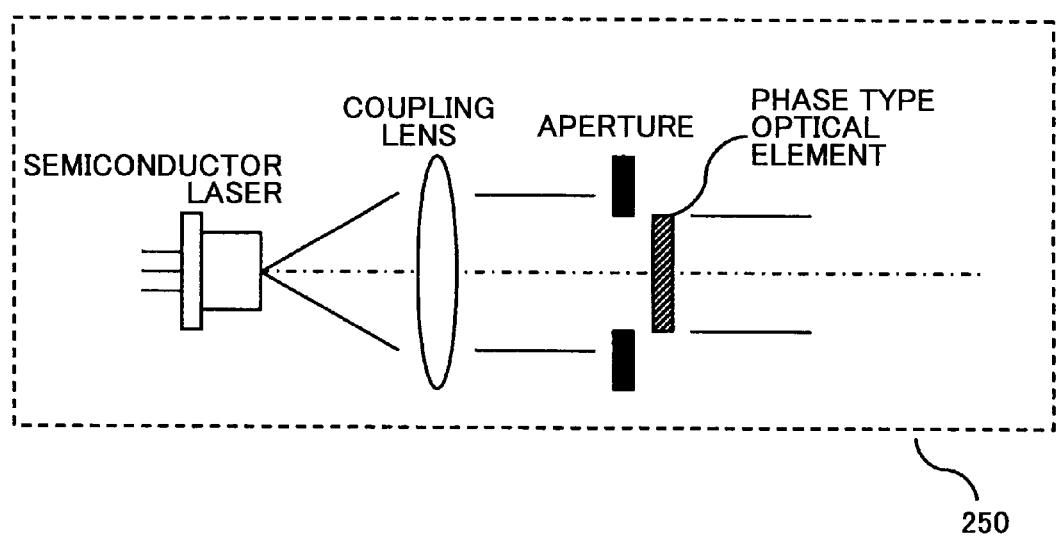
FIG. 49 is a schematic diagram of a light source unit shown in FIG. 44.

Referring to FIGS. 44, 46 shown in the second embodiment, and FIG. 49, a laser beam scanning device is described. The structure of the laser beam scanning device shown in FIGS. 44 and 46 has been described before; therefore, the same description is omitted. FIG. 49 is a schematic diagram of a light source unit 250 shown in FIG. 44. However, the structure of the light source unit 250 shown in FIG. 49 is slightly different from that shown in FIG. 44. As shown in FIG. 49, the light source unit 250 includes a semiconductor laser, a coupling lens, an aperture, and a phase type optical element (depth widening element). In the light source unit 250, laser beams emitted from the semiconductor laser are made to be almost parallel laser beams by the coupling lens. The aperture cuts off a part of the laser beams transmitted through the coupling lens to form laser beams having a desired width. Then the laser beams are input to the phase type optical element which widens the depth margin of a beam spot on a surface to be scanned.

As shown in FIG. 46, for example, the toroidal lens 220 is disposed at a position nearer to the photoconductor drum 101 than the folding mirror 224. When the height of the laser beam scanning device is desired to be lower than that shown in FIG. 46, the toroidal lens 220 physically interferes with the folding mirror 224, the fθ lens 2181 physically interferes with the toroidal lens 220, and the toroidal lens 220 may block an optical path of the laser beams. Therefore, it is difficult to lower the height of the laser beam scanning device.

When it is designed so that the toroidal lens 220 is disposed near the fθ lens 2181, the height of the laser beam scanning device can be lowered. However, the lateral magnifications of the toroidal lens 220 and the fθ lens 2181 become large in the sub scanning direction. In such an optical system, optical performance is degraded at assembling the optical system and at an environmental change, and the optical performance is unstable.

As described above, when the toroidal lens 220 and the fθ lens 2181 are disposed before the folding mirror 224, the height of the laser beam scanning device can be lowered; however, the optical performance may be degraded.

When the toroidal lens 220 and the fθ lens 2181 are disposed before the folding mirror 224 and it is designed so that the lateral magnifications of the toroidal lens 220 and the fθ lens 2181 become small in the sub scanning direction, the degradation of the optical performance may be decreased. However, one of the toroidal lens 220 and the fθ lens 2181 must be disposed at a position apart from the polygon mirror 213; therefore, it is difficult to dispose both the toroidal lens 220 and the fθ lens 2181 before the folding mirror 224.

Therefore, in the third embodiment of the present invention, a phase type optical element (depth widening element) is disposed in the light source unit 250. With this, the depth margin of the beam spot can be widened near the surface to be scanned and the degradation of the optical performance at assembling the laser beam scanning device and at an environmental change is decreased; specifically, enlarging the beam spot diameter is restrained. In addition, since all the scanning lenses (described below) are disposed before a folding mirror, a laser beam scanning device having a low height can be realized.

Figure 50:
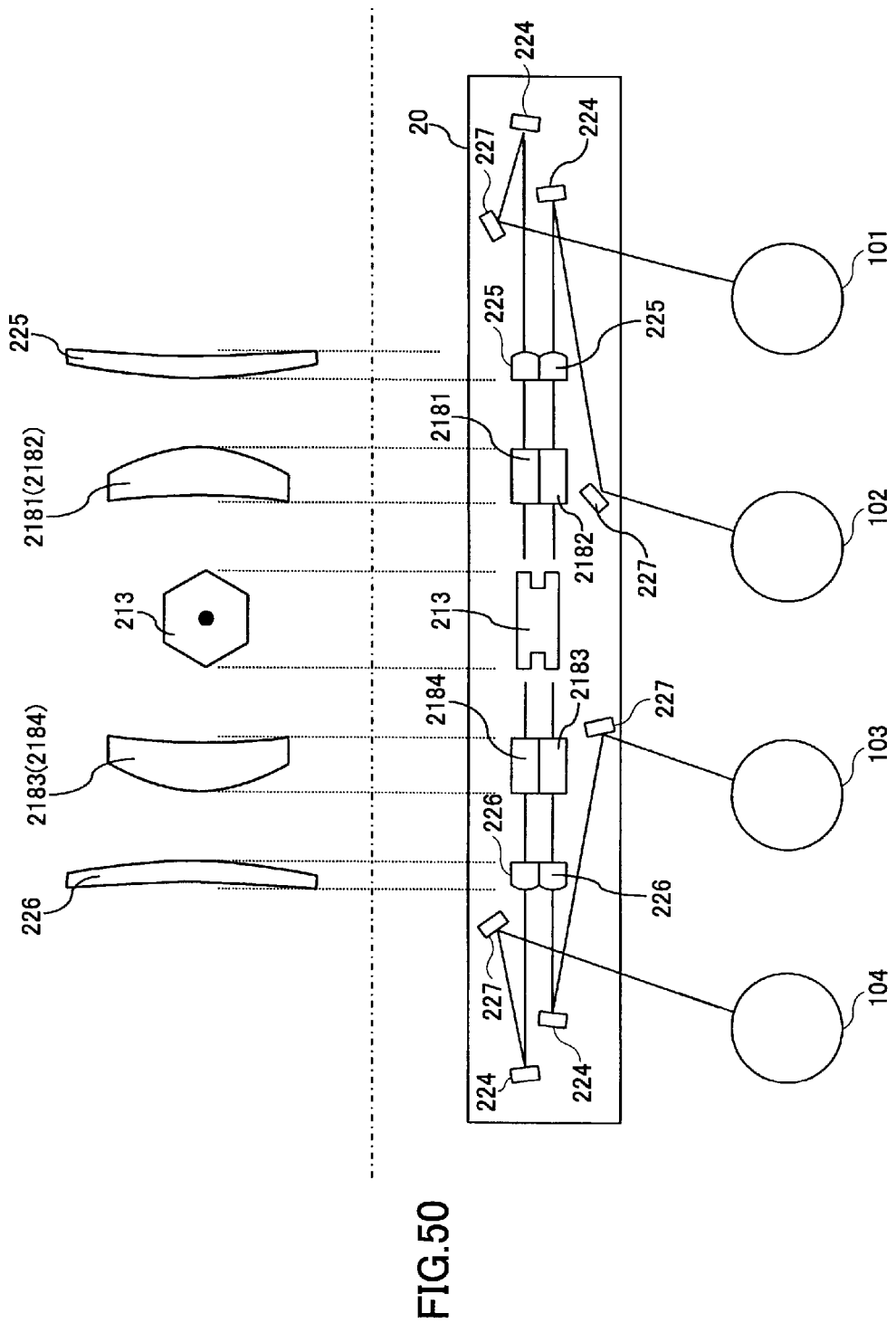
FIG. 50 is a diagram showing a laser beam scanning device according to a third embodiment of the present invention.

FIG. 50 is a diagram showing a laser beam scanning device 20 according to the third embodiment of the present invention. In FIG. 50, (a) shows a plan view of a part of the laser beam scanning device 20, and (b) shows a cut-away side view of the laser beam scanning device 20. In FIG. 50(*b*), the photoconductor drums 101 through 104 are also shown.

Referring to FIG. 50, the laser beam scanning device 20 is described. As shown in FIG. 50, in the laser beam scanning device 20, all scanning lenses are disposed before a first folding mirror (described below in detail). The laser beam scanning device 20 includes a polygon mirror 213, fθ lenses (first scanning lenses) 2181 through 2184, second scanning lenses 225 and 226, first folding mirrors 224, and second folding mirrors 227.

In addition, the laser beam scanning device 20 further includes a light source unit (not shown) which includes a light source (for example, a semiconductor laser) and a phase type optical element (depth widening element) for each of the optical paths. The phase type optical element widens the depth margin of a beam spot of the laser beams emitted from the light source on the surface to be scanned by modulating the phase of the laser beams.

In the following, one optical path is described as a representative. In the optical path from the polygon mirror 213 to the photoconductor drum 102, the polygon mirror 213 deflects the laser beams irradiated from the light source unit. The fθ lens 2182 forms an image on the surface of the photoconductor drum 102 from the laser beams deflected from the polygon mirror 213 via the second scanning lens 225, the first folding mirror 224, and the second folding mirror 227. As shown in FIG. 50, the first scanning lens (the fθ lens 2182) and the second scanning lens 225 are disposed between the polygon mirror 213 and the first folding mirror 224. With this, since the scanning lenses (the first scanning lens (the fθ lens 2182) and the second scanning lens 225) are not disposed behind the first folding mirror 224 in the laser beam scanning device 20, the height of the laser beam scanning device 20 can be lowered.

When a scanning lens has a lateral magnification of greater than "1" in the sub scanning direction, that is, the scanning lens is an optical component in a magnifying optical system, all the scanning lenses can be disposed before a folding mirror. Therefore, it is preferable that the first scanning lenses 2181 through 2184 and the second scanning lenses 225 and 226 be optical components in the magnifying optical system. In order to further lower the height of the laser beam scanning device 20, it is preferable that the lateral magnification in the sub scanning direction of the scanning lens be greater than "2". However, when the lateral magnification in the sub scanning direction of the scanning lens is too large, the optical performance at assembling the laser beam scanning device 20 and at an environmental change is degraded. When the lateral magnification in the sub scanning direction of the scanning lens is "6", the laser beam scanning device can have enough space for the optical components, in order not to degrade the optical performance, it is preferable that the lateral magnification of the scanning lens in the sub scanning direction be "2" to "6".

In addition, when at least one of the first and second folding mirrors 224 and 227 is formed of a cylindrical lens having a curvature in the sub scanning direction, the lateral magnification in the sub scanning direction of the scanning lens can be lowered while having a space in the laser beam scanning device 20 for the optical components. Therefore, the first and second folding mirrors 224 and 227 can be replaced by the cylindrical lenses.

In a laser beam scanning device, a deflection angle range is determined by a deflector such as a polygon mirror and a micro mirror, and it is difficult to widen the deflecting angle range. Therefore, when it is desired to scan a wider range, the length from the deflector to the surface to be scanned must be long. However, when the length from the deflector to the surface to be scanned is long, the optical performance at assembling the laser beam scanning device and at an environmental change is degraded, and the optical performance of the laser beam scanning device becomes unstable.

As a laser beam scanning device for a copying apparatus and a printer, a laser beam scanning device for a A4 size sheet (210 mm×297 mm) which can scan the width of approximately 210 mm and a laser beam scanning device for a A3 size sheet (297 mm×420 mm) which can scan the width of approximately 297 mm are frequently used. The deflection angle range is almost equal in both the devices for A4 size sheet and A3 size sheet; however, the length from the deflector to the surface to be scanned in the device for the A3 size sheet is longer than that in the device for the A4 size sheet. Therefore, the optical performance at assembling the laser beam scanning device and at an environmental change is further degraded in the device for the A3 size sheet compared with the device for the A4 size sheet when all the scanning lenses 2181 through 2184 and 225 and 226 are disposed before the corresponding first folding mirrors 224.

However, when the length from the deflector to the surface to be scanned is long, since the first and second folding mirrors 224 and 227 can be easily arranged in the laser beam scanning device 20, the height of the laser beam scanning device can be lowered. Therefore, the height of the laser beam scanning device for the A3 size sheet can be lower than that for the A4 size sheet.

Therefore, in the present embodiment, a phase type optical element is disposed in a laser beam scanning device for an A3 or more size sheet and all scanning lenses are disposed before a folding mirror in one optical path.

However, in the present embodiment, in a laser beam scanning device for the A4 size sheet, when all scanning lenses are disposed before a folding mirror in one optical path, the effect is almost equal to that in the device for the A3 size sheet.

In addition, in the laser beam scanning device for the A4 size sheet, since the length from the deflector to the surface to be scanned is relatively short, the degradation of the optical performance at assembling and at an environmental change caused by disposing all the scanning lenses before the folding mirror in one optical path is relatively small. Therefore, when a beam spot diameter is made small and a phase type optical element which restricts the degradation of the optical performance at assembling and at an environmental change is disposed in a laser beam scanning device, an image forming apparatus using the laser beam scanning device can output a high-fine image.

In the above, two scanning lenses (for example, the first scanning lens 2182 and the second scanning lens 225) are used in one optical path. However, the number of the scanning lenses to be disposed before a folding mirror is not limited to two, and the number of the scanning lenses can be one, or three or more. When only one scanning lens is disposed before the folding mirror, the height of the laser beam scanning device can be lowest and the cost is also lowest. However, when wavefront is desired to be corrected and the beam spot diameter is desired to be small, it is preferable that two scanning lenses be used in one optical path.

As a light source of the laser beam scanning device, generally, a semiconductor laser is used. However, the divergent angle of the laser beams emitted from the semiconductor laser has dispersion. The dispersion of the divergent angles causes a change of an effective NA (resolution) and the beam spot diameter is dispersed and is enlarged on the surface to be scanned. When the laser beam scanning device having the semiconductor laser is used in an image forming apparatus, the size of dots is dispersed and the beam spot diameter is enlarged on an output image and degradation of image quality such as uneven density may be generated. In order to avoid the above, an aperture is disposed to control the width of the laser beams emitted from the semiconductor laser.

When the laser beams are transmitted through the aperture, a diffracted laser beam is generated. In addition, when the laser beams are transmitted through a phase type optical element which modulates the phase of the laser beams, a diffracted laser beam is generated. Widening the depth margin of the beam spot is realized by the phase type optical element by controlling the generation of the diffracted laser beams. Therefore, when the aperture and the phase type optical element are used at the same time, the phase type optical element is designed by considering both the diffracted laser beams. Consequently, a relative positional relationship between the aperture and the depth widening element becomes very important, and a high precise positional relationship between the aperture and the phase type optical element is required. Therefore, it is preferable that the phase type optical element be formed unified with the aperture. With this, positional displacement between the aperture and the phase type optical element with the passage of time can be restrained and lowering the depth margin widening effect can be restrained.

[Phase Type Optical Element]

The phase type optical element according to the third embodiment of the present invention is described in detail. It is preferable that the phase type optical element be disposed at a position between the deflector and the light source. With this, the depth margin of all laser beams to be transmitted on the surface to be scanned can be widened. Generally, the phase type optical element is disposed in a light source unit.

In order to widen the depth margin of the beam spot on the surface to be scanned, methods described in Patent Documents 1 though 5 can be used. However, it is more preferable that a phase type optical element (described below) in the present embodiment be used.

That is, when any one of the methods in Patent Documents 1 through 5 is used to form a phase type optical element and the phase type optical element is used in a laser beam scanning device, the depth widening effect can be obtained. However, the following side effects are generated and bad influence may be generated on the laser beam scanning device.

In Patent Documents 1 and 2, since the center of the laser beams is blocked, the light amount on the surface to be scanned is insufficient, and a clear image may not be formed. It is considerable that a high-power laser is used; however, when the high-power laser is used, a heating value may be increased, and housing may be partially deformed. Consequently, the dot diameter is enlarged on the surface to be scanned and out of color registration is increased when an image is output.

In addition, in Patent Documents 3 and 4, a region where the depth margin can be increased (region where Bessel beams are generated) is formed at a position near the phase type optical element (axicon prism or a binary optical element equivalent to the axicon prism) and arrangement of optical components may not be easy. Therefore, when the phase type optical element is used in a laser beam scanning device, an additional optical system such as an optical relay must be disposed due to difficulty of the arrangement of the optical components, the optical system must be large, and the cost is largely increased. In addition, high-precise alignment of optical components is required for the optical axis.

In addition, in the Bessel beam, since high-order side lobe laser beams of second-order or more having high intensity are generated, when the laser beam scanning device is used in an image forming apparatus, scumming may be generated on the output image.

In addition, in Patent Document 5, laser beams emitted from a semiconductor laser has a Gaussian distribution, when Gaussian beams are transmitted through an aperture, the intensity of the Gaussian beams at four corners is lower than that at the center. When the intensity at the four corners is desired to be higher than that at the center by using a phase type optical element or a phase distribution conversion element, the laser beams at the center must be moved to the four corners. When the laser beams at the center are moved to the four corners, high-order side lobe laser beams are likely to be generated. When the laser beam scanning device is used in an image forming apparatus, scumming may be generated on the output image. When the Gaussian beams at a position only near the center are used, the generation of the high-order side lobe laser beams may be avoided. However, since the using light amount is decreased, the light use efficiency is decreased.

In the present embodiment, the above problems are solved.

In the phase type optical element of the present embodiment, a first ratio of the peak intensity of the side lobe laser beams to the peak intensity of the main lobe laser beams in a beam intensity profile at the focal position of a lens (on the surface to be scanned) when the phase type optical element is disposed is greater than a second ratio of the peak intensity of the side lobe laser beams to the peak intensity of the main lobe laser beams in a beam intensity profile at the focal position of a lens (on the surface to be scanned) when it is assumed that the phase type optical element is not disposed. That is, the phase type optical element is designed so that the peak intensity of the side lobe laser beams in the beam intensity profile at the focal position is slightly high in a degree for not damaging an optical device, and the phase type optical element gives a suitable phase distribution to input laser beams and restrains the beam spot diameter from being enlarged when the laser beams scan at a position apart from the focal position.

Since the phase type optical element modulates only the phase distribution of the input laser beams and has a high transmission factor, the light use efficiency is high. In addition, since the depth widening effect is generated at a position near the condensing position of the laser beams by a lens, a relay optical system is not required. Further, high-order side lobe laser beams of second-order or more can be made small by designing the phase type optical element.

In order to give the phase distribution to the laser beams, for example, a three-dimensional concave-convex surface is formed on a transparent plate in a using wavelength range. The phase type optical element gives the phase distribution to the laser beams by transmitting the laser beams through the phase type optical element. The three-dimensional concave-convex surface can be formed, for example, by using a diamond turning process in which single crystals of diamond are used as a bit, a semiconductor manufacturing process, or a fine transferring process. The concave-convex surface can be formed as a continuous surface or a cell-formed surface. In the cell-formed surface, cells having a square of 0.5 μm to 10 μm sides can be used.

Next, the phase type optical element in the present embodiment is described in detail.

Figure 51:
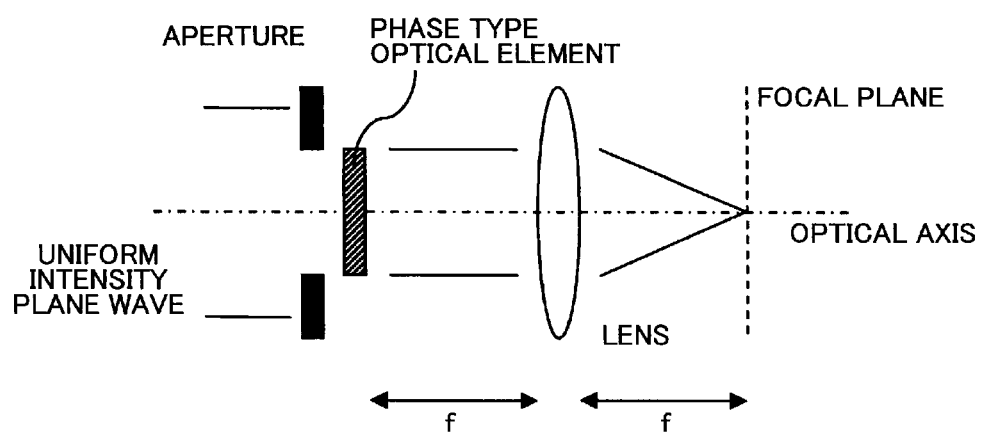
FIG. 51 is a schematic diagram showing an optical system using a phase type optical element according to the third embodiment of the present invention.

FIG. 51 is a schematic diagram showing an optical system using a phase type optical element according to the third embodiment of the present invention. In the optical system, an input plane wave having uniform intensity is cut into laser beams having a desirable width by an aperture. Then a desirable phase distribution is given to the laser beams by a phase type optical element attached to the aperture (that is, the distance between them is "0"), and the laser beams are condensed at the focal position of a (perfect) lens to form an image by the lens whose focal distance is "f". The aperture including the phase type optical element is disposed at the front side focal position of the lens. The aperture has an opening part of a circle shape whose diameter is 930 μm, the focal distance "f" of the lens is 50 mm, and the wavelength of the plane wave is 632.8 nm.

In the following, in order to make the description simple, the input wave is assumed to have uniform intensity; however, an actual intensity distribution of the laser beams emitted from, for example, a semiconductor laser has a Gaussian distribution. However, since the depth margin widening method in the present embodiment forms a beam intensity profile of the laser beams at the focal position of the lens by only controlling the phase distribution, the following description can be used in a case of the Gaussian distribution.

In the third embodiment of the present invention, as the phase type optical element, the simulated results in the first through the sixth simulations and the comparison example simulation in the first embodiment of the present invention are used. Therefore, the same description is omitted.

In addition to the simulations described above, a simulation in the present embodiment is described.

Figure 52A:
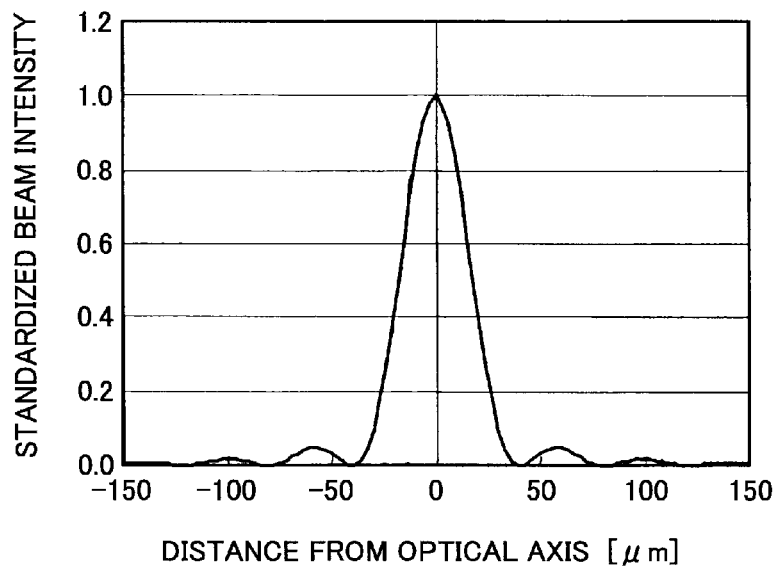
FIG. 52A is a beam intensity profile at the focal position in the simulation according to the third embodiment of the present invention.
Figure 52B:
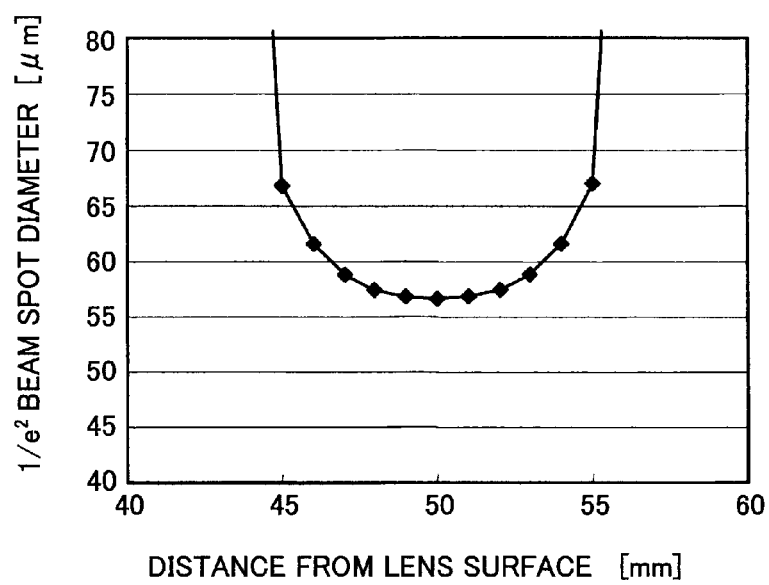
FIG. 52B is a graph showing a relationship between the distance from the lens surface in the optical axis direction and the beam spot diameter in the simulation according to the third embodiment of the present invention.

Referring to FIGS. 52A and 52B, the simulation in the third embodiment of the present invention is described. In the simulation, the shape of the opening part of the aperture is a square of 784.3 μm sides and the phase type optical element is not used. In the present embodiment, the shape of the opening part of the aperture is not limited to the square, and a rectangle can be used as the opening part of the aperture.

FIG. 52A is a beam intensity profile at the focal position in the simulation. In FIG. 52A, the simulated result is shown, the vertical axis shows the standardized beam intensity so that the maximum value (the peak intensity of the main lobe laser beam) is "1", and the horizontal axis shows the distance (μm) from the optical axis on the focal plane. FIG. 52B is a graph showing a relationship between the distance from the lens surface in the optical axis direction and the beam spot diameter in the simulation.

As shown in FIG. 52A, from the simulated result, the ratio of the peak intensity of the side lobe laser beams to the peak intensity of the main lobe laser beams (side/main intensity ratio) is 4.7% in the beam intensity profile at the focal position. In FIG. 52B, the simulated result is shown. In the present embodiment, the beam spot diameter is defined as a diameter of a region where the intensity has $1/e^2$ or more when the center beam intensity is "1". From the simulated result, the minimum beam spot diameter at the focal position is 56.7 μm and the depth margin is 6.5 mm when 105% of the minimum beam spot diameter is allowable.

When the above simulation is compared with the simulation shown in FIGS. 2A and 2B in which the opening part of the aperture has a circle shape, the beam spot diameter is almost equal to each other (56.7 μm and 56.4 μm in FIG. 2B); however, the depth margin of the above simulation is 6.5 mm and the depth margin shown in FIG. 2B is 8.9 mm. That is, the depth margin of the circle-shaped aperture is approximately 1.4 times as large as that of the square-shaped aperture. Therefore, the circle-shaped aperture is most suitable.

In addition, the side/main intensity ratio of the square-shaped aperture is 4.7% and that of the circle-shaped aperture is 1.6%; that is, the side/main intensity ratio of the square-shaped aperture is greater than that of the circle-shaped aperture. Therefore, when the square shaped aperture is used, since the increment of the side lobe laser beams by using the phase type optical element is decreased, the increment of the depth margin is decreased. Consequently, the circle-shaped aperture is preferable.

In an aperture which is used in a laser beam scanning device of an image forming apparatus, generally, the widths of the aperture are different between the main scanning direction and the sub scanning direction; therefore, an ellipse-shaped aperture can be used.

In the light beam scanning device using the phase type optical element of the present embodiment, as described above, when the minimum beam spot diameter in the sub scanning direction is defined as "w", the scanning width on the surface to be scanned is defined as "L", the lateral magnification of the scanning lens in the sub scanning direction is defined as "β" (>0), and the using wavelength is defined as "λ", the values of "w", "β", "λ" and "L" are determined to satisfy Formula (3).

$$0.46 < w^2/(\lambda L \beta) \times 100 < 1.3 \qquad \text{Formula (3)}$$

The value "$w^2/\lambda$" is proportional to the depth margin. When the depth margin is wide, the degradation of the optical performance of the laser beam scanning device at assembling and at an environmental change is small. In addition, when the width of the deflection angle of the deflector (polygon mirror 213) is assumed to be constant, the distance from the deflector to the surface to be scanned is short when the scanning width "L" is short; therefore, the degradation of the optical performance of the laser beam scanning device at assembling and at an environmental change is small. Further, when the lateral magnification "β" is small, the degradation of the optical performance of the laser beam scanning device at assembling and at an environmental change is small. Therefore, when the value of "$w^2/(\lambda L \beta) \times 100$" is large, the degradation of the optical performance of the laser beam scanning device at assembling and at an environmental change is small. The value of "$w^2/(\lambda L \beta) \times 100$" is called Evaluation Value (A).

Generally, in the laser beam scanning device for the A3 (297 mm×420 mm) size sheet (L=297 mm), in many cases, two scanning lenses are used, λ=655 nm or 780 nm, w=50 μm or more, and β=0.9 or more. The value of "$w^2/(\lambda L \beta) \times 100$" is approximately 1.3 (w=50 μm, λ=655 nm, β=0.96, and L=297 mm).

When the shape of the opening part of the aperture is rectangular, a resin scanning lens is used, and Evaluation Value (A) is less than 1.3; the degradation of the optical performance at assembling and at an environment change becomes too large, an image having normal quality cannot be output from an image forming apparatus. In order to dispose all scanning lenses before a folding mirror in an optical path, the lateral magnification β must be large, and Evaluation Value (A) becomes small and a laser beam scanning device becomes weak for a change such as an environmental change.

When the beam spot diameter "w" is made large, Evaluation Value (A) becomes large and a laser beam scanning device strong against a change can be obtained; however, when the beam spot diameter "w" is made large, the size of dots in an output image becomes large and output image quality may be degraded. Therefore, a laser beam scanning device is designed so that Evaluation Value (A) satisfies Formula (3) by using a phase type optical element. With this, the laser beam scanning device can be miniaturized (thinned) and the degradation of the output image quality (enlarging the size of dots) can be restrained.

It is preferable that the depth margin by using a phase type optical element be a value to approximately twice as many as the value when the phase type optical element is not used. Therefore, Formula (3) can be modified to the following.

$$0.65 < w^2/(\lambda L \beta) \times 100 < 1.3$$

However, as described above, when a circle-shaped aperture is used, since the depth margin can be widened by 1.4 times as many as that of the rectangular shape aperture, Formula (3) can be used.

$$0.46 < w^2/(\lambda L \beta) \times 100 < 1.3 \qquad \text{Formula (3)}$$

In the laser beam scanning device 20 shown in FIG. 50, for example, the optical path from the polygon mirror 213 to the photoconductor drum 101 crosses its own optical path and the optical path for the photoconductor drum 102 on the way. With this, the laser beam scanning device 20 can be thinned.

FIG. 53 is a diagram showing a laser beam scanning device 20A according to the third embodiment of the present invention. In the laser beam scanning device 20A shown in FIG. 53, one scanning lens is used in one optical path. As shown in FIG. 53, for example, in one optical path, the scanning lens (fθ lens) 2182 is disposed before the folding mirror 224, and the optical path from the polygon mirror 213 to the photoconductor drum 102 crosses its own optical path and the optical path for the photoconductor drum 101 on the way. With this, the laser beam scanning device 20A can be made thinner.

[Image Forming Apparatus]

Figure 54:
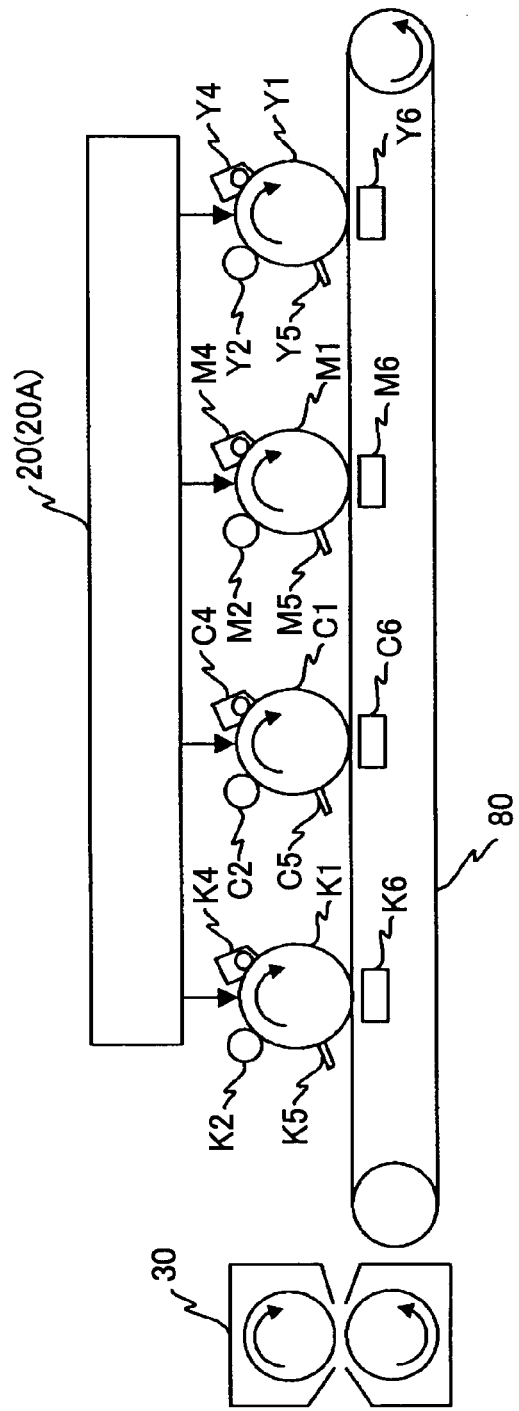
FIG. 54 is a schematic diagram showing a part of an image forming apparatus according to the third embodiment of the present invention.

FIG. 54 is a schematic diagram showing a part of an image forming apparatus according to the third embodiment of the present invention. In FIG. 54, the basic structure of the image forming apparatus is the same as that shown in FIG. 24 in the first embodiment of the present invention. Therefore, a detailed description of the image forming apparatus shown in FIG. 54 is omitted. In the image forming apparatus shown in FIG. 54, the laser beam scanning device 20 (20A) is used instead of using the laser beam scanning device 900 shown in FIG. 24. Since the height of the laser beam scanning device 20 (20A) is thinner than that of the laser beam scanning device 900 shown in FIG. 24, the image forming apparatus in the third embodiment of the present invention can be miniaturized while having the depth margin widening function without enlarging the beam spot diameter.

As described above, in the third embodiment of the present invention, it is preferable that the scanning lens be an optical component in a magnifying optical system in which the lateral magnification of the scanning lens in the sub scanning direction is greater than "1".

In addition, it is preferable that the width capable of being scanned on the surface to be scanned is 297 mm or more.

In addition, the laser beam scanning device further includes an aperture and the phase type optical element is unified with the aperture.

In addition, the phase type optical element has a phase distribution so that a first ratio of the peak intensity of side lobe laser beams to the peak intensity of main lobe laser beams in a beam intensity profile at a focal position of the laser beam condensing element is greater than a second ratio of the peak intensity of side lobe laser beams to the peak intensity of main lobe laser beams in the beam intensity profile at the focal position of the laser beam condensing element when it is assumed that the phase type optical element is not disposed.

In addition, the phase type optical element has a phase distribution in which a symmetric phase distribution is included in a part of the phase distribution as the center of the phase type optical element is the reference.

In addition, a non-focal position different from the focal position of the laser beam condensing element on an optical axis of the laser beam condensing element exists, at the non-focal position, a ratio of the peak intensity of the side lobe laser beams to the peak intensity of the main lobe laser beams in the beam intensity profile is less than a ratio of the peak intensity of the side lobe laser beams to the peak intensity of the main lobe laser beams in the beam intensity profile when it is assumed that the phase type optical element is not disposed.

In addition, a non-focal position different from the focal position of the laser beam condensing element on an optical axis of the laser beam condensing element exists, at the non-focal position, a ratio of the peak intensity of the main lobe laser beams in the beam intensity profile at the non-focal position to the peak intensity of the main lobe laser beams in the beam intensity profile at the focal position is greater than a ratio of the peak intensity of the main lobe laser beams in the beam intensity profile at the non-focal position to the peak intensity of the main lobe laser beams in the beam intensity profile at the focal position when it is assumed that the phase type optical element is not disposed.

In addition, the shape of the aperture is circular or elliptic.

Further, the present invention is not limited to the specifically disclosed embodiments, and variations and modifications may be made without departing from the scope of the present invention.

The present invention is based on Japanese Priority Patent Application No. 2006-198984, filed on Jul. 21, 2006, Japanese Priority Patent Application No. 2006-251451, filed on Sep. 15, 2006, and Japanese Priority Patent Application No. 2006-252736, filed on Sep. 19, 2006, with the Japanese Patent Office, the entire contents of which are hereby incorporated herein by reference.

What is claimed is:

1. A light source unit which is used together with a laser beam condensing element for condensing laser beams, comprising:
a light source which emits the laser beams;
a phase type optical element which includes a first region that modulates a phase distribution of the laser beams emitted from the light source and includes at least one second region where a portion of the laser beams emitted from the light source are transmitted through an entirety of the phase type optical element without the laser beams being modulated; and
an aperture having an opening which controls a width of the laser beams input to the phase type optical element or output from the phase type optical element;
wherein the phase type optical element has a phase distribution so that a first ratio of a peak intensity of side lobe laser beams to a peak intensity of main lobe laser beams in a beam intensity profile at a focal position of the laser beam condensing element is greater than a second ratio of the peak intensity of side lobe laser beams to the peak intensity of main lobe laser beams in a beam intensity profile at the focal position of the laser beam condensing element when the phase type optical element is not disposed and an area of the first region is less than or equal to half of an area of the opening of the aperture.

2. The light source unit as claimed in claim 1, wherein
a non-focal position different from the focal position of the laser beam condensing element on an optical axis of the laser beam condensing element exists;
at the non-focal position, a ratio of the peak intensity of the side lobe laser beams to the peak intensity of the main lobe laser beams in a beam intensity profile is less than a ratio of the peak intensity of the side lobe laser beams to the peak intensity of the main lobe laser beams in a beam intensity profile when the phase type optical element is not disposed.

3. The light source unit as claimed in claim 1, wherein
a non-focal position different from the focal position of the laser beam condensing element on an optical axis of the laser beam condensing element exists;
at the non-focal position, a ratio of the peak intensity of the main lobe laser beams in a beam intensity profile at the non-focal position to the peak intensity of the main lobe laser beams in a beam intensity profile at the focal position is greater than a ratio of the peak intensity of the main lobe laser beams in a beam intensity profile at the non-focal position to the peak intensity of the main lobe laser beams in a beam intensity profile at the focal position when the phase type optical element is not disposed.

4. The light source unit as claimed in claim 1, wherein the phase distribution of the phase type optical element includes a symmetric phase distribution at least at a part thereof.

5. The light source unit as claimed in claim 1, wherein the phase type optical element is formed unified with the aperture.

6. The light source unit as claimed in claim 1, wherein the opening part of the aperture has a circular shape or an elliptic shape.

7. A laser beam scanning device in which laser beams scan a surface to be scanned, comprising:
the light source unit as claimed in claim 1;
a deflection unit which deflects the laser beams irradiated from the light source unit; and
a scanning optical system which condenses the laser beams deflected by the deflection unit onto the surface to be scanned;
wherein the opening part of the aperture in the light source unit has widths different from each other in the directions corresponding to the main scanning direction and the sub scanning direction; and
the phase type optical element has cross-sectional shapes different from each other in the directions corresponding to the main scanning direction the sub scanning direction for the center of the phase type optical element.

8. A laser beam scanning device which scans a surface to be scanned by using laser beams; comprising:
the light source unit as claimed in claim 1;
a deflection unit which deflects the laser beams irradiated from the light source unit; and
a scanning lens which forms an image on the surface to be scanned by using the laser beams deflected by the deflection unit;
wherein the phase type optical element is disposed at a position nearer to the light source unit than the deflection unit.

9. An image forming apparatus, comprising:
the light source unit as claimed in claim 1;
a deflection unit which deflects the laser beams irradiated from the light source unit;
at least one image carrier on a surface of which an image is formed;
a scanning lens which forms an electrostatic latent image on the surface of the image carrier by using the laser beams deflected by the deflection unit;
a developing unit which develops the electrostatic latent image formed on the surface of the image carrier to form a toner image;
a transfer unit which transfer the toner image onto a sheet;
a fixing unit which fixes the toner image on the sheet; and
an output unit which outputs the fixed toner image;
wherein a color image is output by providing a necessary number of above units for forming the color image.

10. The light source unit as claimed in claim 1, wherein the opening of the aperture is circular.

11. The light source unit as claimed in claim 1, wherein each of the light source, the phase type optical element, and the aperture are centered along a single optical axis.

* * * * *